(12) United States Patent
Miller

(10) Patent No.: US 7,173,966 B2
(45) Date of Patent: Feb. 6, 2007

(54) COMPENSATION FOR NON-LINEAR DISTORTION IN A MODEM RECEIVER

(75) Inventor: William J. Miller, Sunnyvale, CA (US)

(73) Assignee: Broadband Physics, Inc., San Jose, CA (US)

( * ) Notice: Subject to any disclaimer, the term of this patent is extended or adjusted under 35 U.S.C. 154(b) by 0 days.

(21) Appl. No.: 10/842,623

(22) Filed: May 10, 2004

(65) Prior Publication Data

US 2004/0240588 A1 Dec. 2, 2004

Related U.S. Application Data

(63) Continuation-in-part of application No. 09/943,697, filed on Aug. 31, 2001, now Pat. No. 6,735,264.

(51) Int. Cl.
*H03H 7/30* (2006.01)

(52) U.S. Cl. ...................................... 375/229; 375/232

(58) Field of Classification Search ........ 375/229–236, 375/316
See application file for complete search history.

(56) References Cited

U.S. PATENT DOCUMENTS

| 3,597,541 A | 8/1971 | Proakis ........................ 178/88 |
| 4,438,511 A | 3/1984 | Baran ........................... 370/19 |
| 4,493,082 A | 1/1985 | Cumberton et al. .......... 371/43 |
| 4,596,898 A | 6/1986 | Pemmaraju .............. 178/22.16 |
| 4,654,480 A | 3/1987 | Weiss .......................... 380/48 |
| 4,679,227 A | 7/1987 | Hughes-Hartogs ........... 379/98 |
| 4,707,666 A | 11/1987 | Pfeifer et al. ................ 329/110 |
| 4,713,829 A | 12/1987 | Eyuboglu ..................... 375/37 |
| 4,731,816 A | 3/1988 | Hughes-Hartogs ........... 379/98 |
| 4,800,518 A | 1/1989 | Miller ........................ 364/819 |
| 4,807,230 A | 2/1989 | Srinivasagopalan et al. .. 371/46 |
| 4,811,394 A | 3/1989 | Ragavan et al. .............. 380/21 |
| 4,817,146 A | 3/1989 | Szczutkowski et al. ....... 380/48 |
| 4,882,726 A | 11/1989 | Lang et al. ................... 370/24 |

(Continued)

FOREIGN PATENT DOCUMENTS

WO    WO94/22236    9/1994

OTHER PUBLICATIONS

The Analog Voice Privacy System; R. V. Cox, et al.; IEEE Publications 1986; pp. 341-344.

(Continued)

*Primary Examiner*—Chieh M. Fan
*Assistant Examiner*—Jason M. Perilla
(74) *Attorney, Agent, or Firm*—Weingarten, Schurgin, Gagnebin & Lebovici LLP

(57) ABSTRACT

A method and modem receiver for receiving serial data from a transmission link, for recovering data from the received data, and for synchronizing the receiver timing to that of the transmitter are disclosed. A receiver equalizer includes a filter and quantizer in the forward path and a feedback circuit connecting the quantizer output to the filter input. A measuring circuit is used to initialize the feedback circuit. The receiver filter, provided as a QMF wavelet filter bank, is implemented in one embodiment with a form of polyphase filtering followed by four M/2-point FFTs. The quantizer recovers data symbols and provides a quantization error feedback signal. The measuring circuit provides an approximation of phase and amplitude of isolated wavelets.

41 Claims, 34 Drawing Sheets

U.S. PATENT DOCUMENTS

| | | | | |
|---|---|---|---|---|
| 4,891,806 A | 1/1990 | Farias et al. | ............. | 370/110.1 |
| 4,907,271 A | 3/1990 | Gilham | ......................... | 380/25 |
| 4,914,699 A | 4/1990 | Dunn et al. | ................... | 380/34 |
| 4,920,565 A | 4/1990 | Strawczynski et al. | ........ | 380/6 |
| 4,924,516 A | 5/1990 | Bremer et al. | ................. | 380/46 |
| 4,979,188 A | 12/1990 | Kotzin et al. | .................. | 375/34 |
| 4,985,919 A | 1/1991 | Naruse et al. | .................. | 380/18 |
| 5,022,053 A | 6/1991 | Chung et al. | ................... | 375/39 |
| 5,031,214 A | 7/1991 | Dziewit et al. | ............... | 380/23 |
| 5,052,024 A | 9/1991 | Moran, III et al. | ............. | 375/7 |
| 5,054,034 A | 10/1991 | Hughes-Hartogs | ............. | 375/8 |
| 5,056,117 A | 10/1991 | Gitlin et al. | ................ | 375/102 |
| 5,111,504 A | 5/1992 | Esserman et al. | ............. | 380/21 |
| 5,113,412 A | 5/1992 | Goldstein | .................... | 375/39 |
| 5,150,401 A | 9/1992 | Ashby, III et al. | ............ | 380/29 |
| 5,162,812 A | 11/1992 | Aman et al. | ................... | 375/34 |
| 5,179,542 A | 1/1993 | Reese et al. | ................. | 367/135 |
| 5,204,874 A | 4/1993 | Falconer et al. | ................ | 375/1 |
| 5,235,615 A | 8/1993 | Omura | ........................... | 375/1 |
| 5,365,550 A | 11/1994 | Roberson | ....................... | 375/1 |
| 5,367,516 A | 11/1994 | Miller | ......................... | 370/19 |
| 5,396,519 A | 3/1995 | Betts et al. | .................. | 375/296 |
| 5,418,798 A | 5/1995 | Wei | .............................. | 371/43 |
| 5,479,447 A | 12/1995 | Chow et al. | ................. | 375/260 |
| 5,541,955 A | 7/1996 | Jacobsmeyer | ................ | 375/222 |
| 5,548,615 A | 8/1996 | Wei | ............................. | 375/281 |
| 5,654,765 A * | 8/1997 | Kim | ............................. | 348/614 |
| 5,682,404 A | 10/1997 | Miller | ......................... | 375/222 |
| 5,710,792 A * | 1/1998 | Fukawa et al. | ............. | 375/229 |
| 5,721,694 A | 2/1998 | Graupe | ........................ | 364/574 |
| 5,812,601 A | 9/1998 | Schramm | .................... | 375/262 |
| 5,859,877 A | 1/1999 | Betts et al. | .................. | 375/298 |
| 5,864,800 A | 1/1999 | Imai et al. | .................. | 704/229 |
| 5,995,539 A | 11/1999 | Miller | ......................... | 375/222 |
| 6,178,201 B1 | 1/2001 | Hillery | ........................ | 375/232 |
| 6,222,592 B1 | 4/2001 | Patel | ........................... | 348/614 |
| 6,263,017 B1 | 7/2001 | Miller | ......................... | 375/222 |
| 6,337,878 B1 | 1/2002 | Endres et al. | ................ | 375/229 |
| 6,396,872 B1 | 5/2002 | Sugiyama | ................... | 375/232 |
| 6,421,378 B1 | 7/2002 | Fukuoka et al. | ............. | 375/229 |
| 6,438,179 B1 | 8/2002 | Hwang | ........................ | 375/322 |
| 6,477,214 B1 | 11/2002 | Fowler et al. | ............... | 375/350 |
| 6,480,559 B1 | 11/2002 | Dabak | ......................... | 375/368 |
| 6,587,500 B1 | 7/2003 | Persson et al. | ............. | 375/142 |
| 6,668,014 B1 | 12/2003 | Endres et al. | ................ | 375/232 |
| 6,850,563 B1 * | 2/2005 | Hulyalkar et al. | ........... | 375/233 |
| 2002/0181572 A1* | 12/2002 | Meehan et al. | ............. | 375/229 |
| 2002/0181615 A1 | 12/2002 | Kuzminskiy et al. | ....... | 375/316 |
| 2003/0002602 A1 | 1/2003 | Kwon et al. | ................. | 375/340 |
| 2003/0053534 A1 | 3/2003 | Sivadas et al. | ............. | 375/229 |

OTHER PUBLICATIONS

The Perfect-Reconstruction QMF Bank: New Architectures, Solutions, and Optimization Strategies; P. P. Vaidyanathan and Phuong-Quan Hoang; IEEE Publications 1987; pp. 2169-2172.

Wavelets and Signal Processing; O. Rioul and M. Vetterli; IEEE SP Magazine; Oct. 1991; pp. 14-38.

The Digital All-Pass Filter: A Versatile Signal Processing Building Block; Regalia, et al.; IEEE Publications; Jan. 1988; pp. 19-22.

Improved Technique for Design of Perfect Reconstruction FIR QMF Banks with Lossless Polyphase Matrices; P. P. Vaidyanathan, et al.; IEEE Publications 1989; pp. 1042-1056.

Perfect Reconstruction FIR Filter Banks: Some Properties and Factorizations; M. Vetterli, et al.; IEEE Publications 1989; pp. 1057-1071.

Lattice Structures for Optimal Design and Robust Implementation of Two-Channel Perfect-Reconstruction QMF Banks; P. P. Vaidyanathan, et al.; IEEE Publications 1988; pp. 81-94.

Mark J. Smith et al., "Exact Reconstruction Techniques for Tree-Structured Subband Coders", IEEE 1986.

A. Croisier et al., "Perfect Channel Splitting by Use of Interpolation/Decimation/Tree Decomposition Techniques", Proceeding of the International Conference on Information and Sciences, XP 000669888.

Allen Salmasi, et al., "On the System Design Aspects of Code Division Multiple Access (CDMA) Applied to Digital Cellular and Personal Communications Networks", IEEE 1991.

* cited by examiner

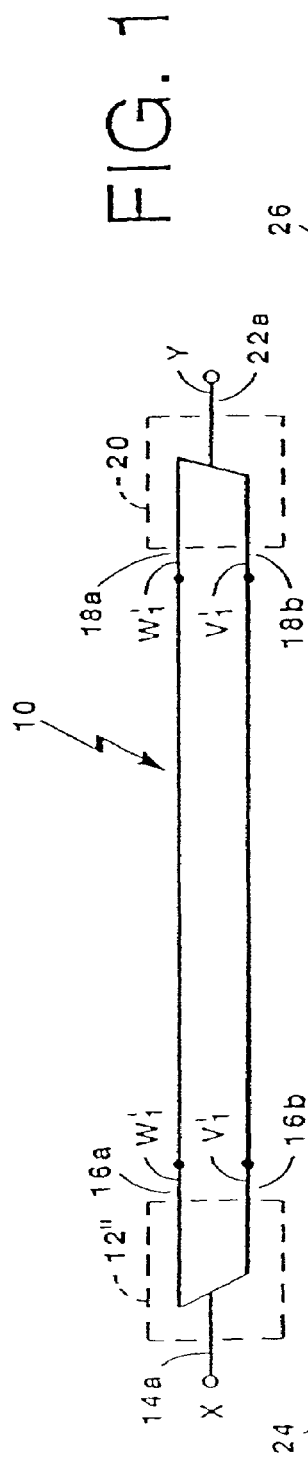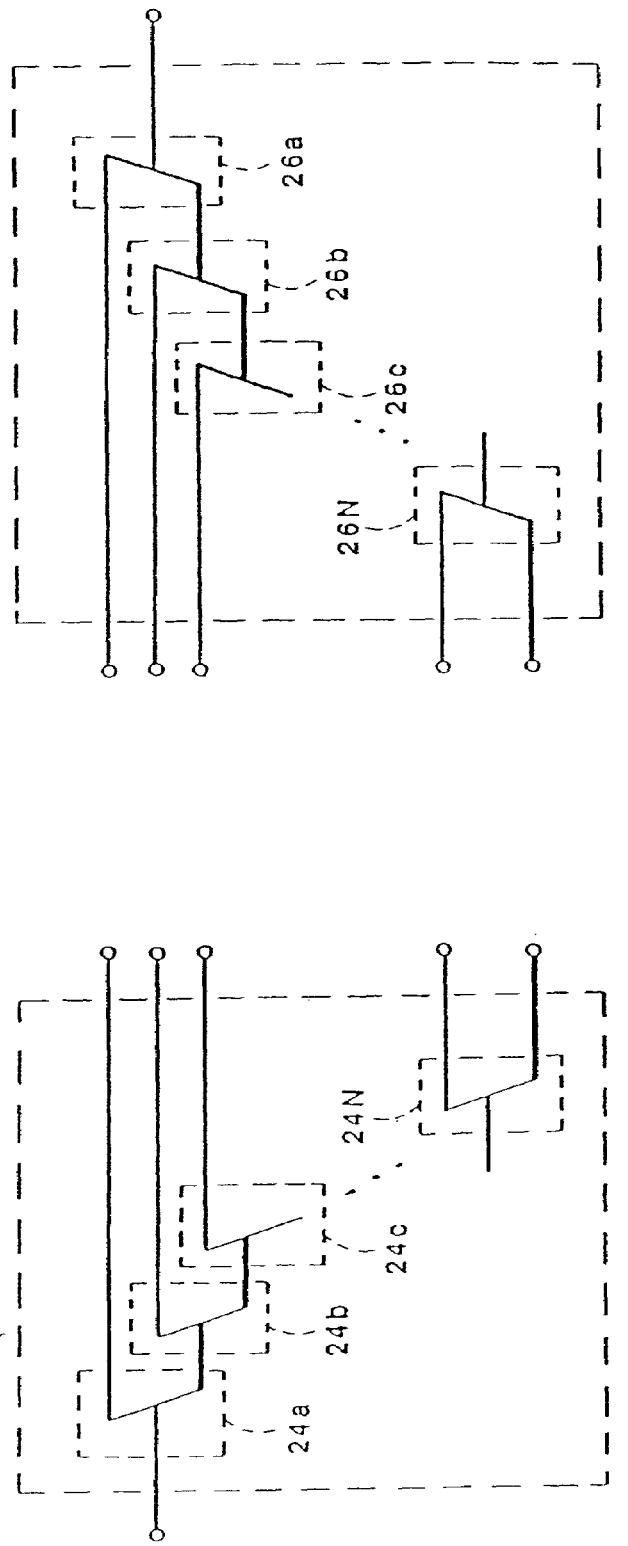
FIG. 1
FIG. 1A
FIG. 1B

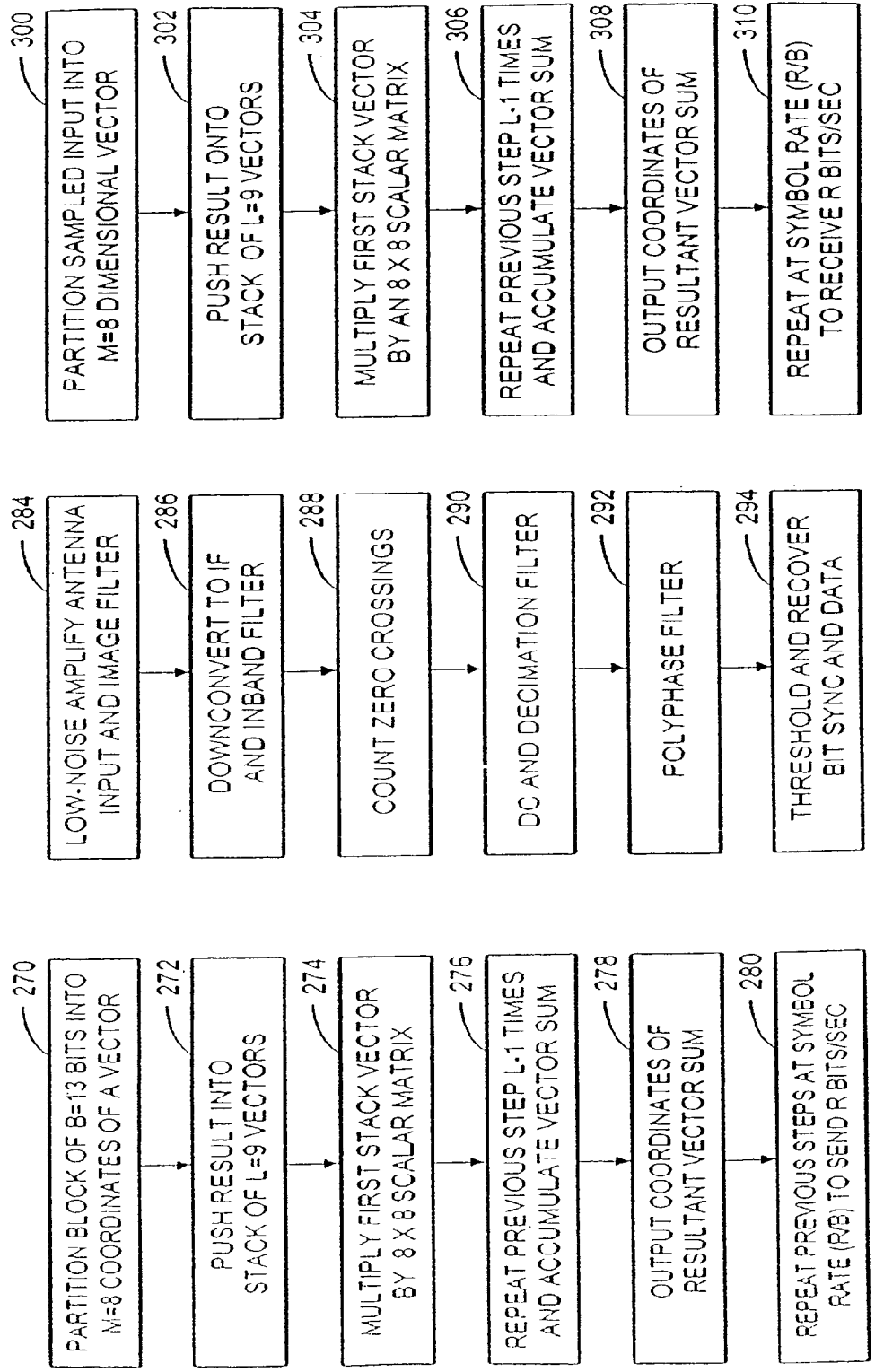

COMPENSATION FOR NON-LINEAR DISTORTION IN A MODEM RECEIVER

CROSS REFERENCE TO RELATED APPLICATIONS

This application is a continuation-in-part of U.S. patent application Ser. No. 09/943,697 filed Aug. 31, 2001, now U.S. Pat. No. 6,735,264, entitled COMPENSATION FOR A NON-LINEAR DISTORTION IN A MODEM RECEIVER.

STATEMENT REGARDING FEDERALLY SPONSORED RESEARCH OR DEVELOPMENT

N/A

BACKGROUND OF THE INVENTION

As is known in the art, a modulator-demodulator (modem) is an electronic device that modulates transmitted signals and demodulates received signals. The modem generally provides an interface between digital devices and an analog communications system to thus make possible analog transmission of digital information between two terminals or stations. Such transmissions may be over a transmission link such as a telephone line, cellular communication link, satellite link, and cable TV, each of which being generally band-limited. That is, the information may be transmitted across the transmission link only over a predetermined range of frequencies having a maximum bit error rate.

As is also known, a modem is used to provide wireless transmission between transmitting and receiving stations. Such wireless communication can be employed in a variety of applications: VHF, IS-54 (cellular), IS-95 (cellular), SPADE (satellite), GSM (cellular), HDTV, and SAT-TV, each using one of the following linear modulation techniques: QAM; QPSK; Pi/4 DPSK; GMSK. As with the transmission line application, the bandwidth of each is limited within an acceptable bit error rate.

While most modems are capable of providing compensation for Guassian noise, impulse noise is not well managed. Most modems also require higher powered amplification means since, in all cases, amplitude distortion is unacceptable. In broadcast environments, it is well understood that FM transmission provides superior impulse noise handling. Also in FM transmission schemes, the transmitted signal may be amplified with almost 100% efficiency since the information carrying portion of the signal is identified by the zero-crossings of the signal. Thus, amplitude distortion is ignored.

Despite these apparent advantages, only a few isolated examples exist of nonlinear frequency modulation used within modems. Frequency shift keying, providing a 300 bits per second data rate, essentially utilized two frequencies, each for representing a separate data bit. The next major development in modems was the use of phase modulation, beginning with two phase modulation, then four, then eight. A combination of amplitude and phase modulation was later developed, also referred to as quadrature amplitude modulation or QAM.

A subsequent development was Guassian minimum shift keying, or GMSK. At first glance, such coding resembles four phase modulation, though in order to avoid amplitude modulation, a special low pass filter referred to as a Guassian filter was applied to the data going into the phase modulator. Since some have regarded the Guassian filter as akin to an integrator, an argument could be made that such a modulation scheme results in frequency modulation, since GMSK can be demodulated with an FM discriminator. Yet, GMSK applies linear functions of the data to in-phase and quadrature carriers to produce a linear modulation; whereas, true FM is mathematically equivalent to the application of trigonometric functions of the filtered signal to an in-phase and quadrature carrier. FM is a non-linear modulation, which was perceived as inefficient for data transmission since the transmitted frequency spectrum is not a simple translation of the baseband spectrum as in AM modems. A further perceived problem with FM for a modem is that it only accepts real signals into its voltage controlled oscillator. That is, in the equivalent in-phase and quadrature carrier method for FM, both paths send the same data resulting in a double sideband spectrum of a single carrier, which was regarded as redundant and therefore inefficient compared to the double-sideband spectra of the dual in-phase and quadrature carriers of QAM modems. Also, single-sideband (SSB) transmission was considered undesirable for modems because there is no simple way to efficiently demodulate an AM-SSB signal without a carrier reference. FM was dismissed as an analog technique totally unrelated to data transfer except with regard to FSK.

In an ordinary modem, binary data is normally passed through a baseband raised-cosine filter which limits the bandwidth of the baseband signal so that when one multiplies the baseband signal by a carrier, control over the passband signal bandwidth is provided without intersymbol interference. The output of an ordinary modem includes signals having discrete phases such that data included therein can be identified by discerning the phase of each bit. For instance, whenever a signal has a +90° phase shift it is interpreted as 0 and when the phase shift is −90° it represents 1, etc. Thus, in an ordinary modem employing a carrier, the phase and/or amplitude of the carrier signal are determined by the current symbol being transmitted. The carrier assumes only selected values of phase and amplitude for most of the duration of each symbol and graphical plots of all the selected phase-amplitude pairs are called the constellation points of the modem. Ordinary modems require that there be distinct points in the constellation for each possible value of the transmitted symbol. Furthermore, bit errors occur in the receiver if the points are mis-assigned due to intersymbol interference or due to noise on the link.

In many applications the computational requirements of the modem introduce a delay which is detrimental to the operation of the system. For example, digital voice transmission and multiple access networks are sensitive to delay in the modem. Furthermore, the rate at which a modem may transmit and receive data per unit of bandwidth is called the modem bandwidth efficiency. In the discipline of Digital Information Theory this efficiency is known to be maximized when the transmitted signal has the maximum entropy or randomness. The maximum entropy transmission is band-limited Guassian noise, and among other properties Guassian noise will not dwell at a distinct phase-amplitude pair as in a constellation. Thus it is desirable to provide a modem having a passband carrier which minimizes the internal processing time and also maximizes the bandwidth efficiency without sacrificing bit error rate.

A method of communicating a sequential series of symbols over a transmission link comprises the steps of multirate polyphase filtering the symbols, using the filtered output to modulate a carrier, transmitting the modulated carrier across the transmission link, receiving the modulated signal, applying the inverse of the transmitter polyphase filter to the received signal, and thresholding and re-assembling the output of the inverse filter to recover the transmitted symbols.

Data is transmitted from a first modem to a second modem across a wireless transmission link by forming input data frames from the input data, multiplying the input frames by a rotation matrix, frequency modulating and transmitting the rotation matrix output, receiving and frequency demodulating the transmitted data, multiplying the demodulated signal by a second rotation matrix, and re-assembling the de-rotated data to recover the original data.

A modem for communicating symbols across a transmission link includes a transmit portion and a receive portion, wherein the transmit portion comprises a partitioning element for dividing the input into parallel data channels, a baseband transmit rotation section for polyphase transforming the channeled data into parallel signal channels, a re-arrangement of the parallel signal channels into sequential serial samples, a carrier modulator for providing a modulated signal, and a transmitter for transmitting the modulated signal. The receive portion comprises a receiver for receiving the transmitted, modulated signal, a demodulator for demodulating the received signal into parallel signal channels, a receive rotation section for polyphase transforming the demodulated, received signal into parallel data channels, and an assembling element for combining the parallel data channels into a serial data signal.

The polyphase filtration of these methods and this modem enables FM modulation of the transmitted symbols since only a real component of the original symbols is generated. FM, whether achieved using frequency modulation or phase modulation of the input signal, provides enhanced immunity to non-Guassian noise, provides high bandwidth efficiency, utilizes non-coherent IF and thus requires no carrier recovery, is of lower cost than conventional modems in part due to the absence of A/D converters, provides low co-interference due to the FM capture effect, and is compatible with analog signals, owing to the use of commuting operators. More power efficient, but potentially less linear amplifiers such as Class B and Class C can be employed since zero crossings are used to determine data content; carrier recovery is not required. Modems employing modulation schemes such as QAM cannot employ such non-linear amplification. Further, satellite modems employing the presently disclosed method and modem save on TWT backoff power and thus are more energy efficient since intermodulation is not a problem, while personal computers achieve higher data rates without sacrificing bit error rate.

Polyphase filtration is implemented in a first embodiment by a wavelet filter (e.g. Quadrature Mirror Filter) pair. The partitioning element partitions the serial data among plural, parallel data channels prior to linear-phase FIR vector filtration, the filter coefficients being square matrices, whereby the input data are transformed into parallel signal channels. The transformation is by way of a convolutional rotation of the input data vector. Each coordinate of the output signal is confined to a frequency sub-band which slightly overlaps its neighbor. Pre-emphasis in the transmit portion, prior to the rotation in a first embodiment, places most of the information in the lower baseband frequencies. This is due to the noise probability density function of an FM discriminator that is proportional to the square of the frequency. De-emphasis in the receiver results in an addition to the overall gain equation. This equation, in one embodiment, includes contributions by the FM transmitter gain, the de-emphasis gain, and a noise reduction gain. The pulse amplitude levels representing the partitioned data bits within each sub-band need not necessarily correspond to an integer number of bits, as long as all of the levels in all the subbands correspond to an integer value.

The receiver portion provides the de-rotation filter for performing a reverse transformation to recover the original data. In one embodiment, the reverse transformation commutes with the modulation transformation. In a further embodiment, the coefficients of the de-rotation filter in the receiver are adaptively selected for equalization to correct for transmission path distortion, since the analyzer is a fractional-rate FIR filter. Thus, a near-perfect reconstruction filter is employed. A threshold operator takes the nearest integer coordinate values as the most likely symbol.

In a further embodiment, the commuting rotation and de-rotation filters are derived from the elementary matrices which describe a geometric rotation of a vector. Their function is to transform an input data vector within a data coordinate system into a signal vector within a signal coordinate system such that the sequentially serialized coordinates of the signal vector would form the digital samples of a bandlimited analog signal. Yet another approach to the matrices is mathematical transformation by way of discrete wavelet transformations.

In each of the transmitter portion and receiver portion, the rotation operator is ideally a computationally efficient multirate wavelet filter bank. Logarithmic amplification of the baseband signal prior to introduction into the FM transmitter modulator results in an improvement in the modulation gain out of the receiver. Further, as a by-product of the logarithmic amplification prior to the transmitter and de-amplification after the receiver, noise introduced in the transmit channel is attenuated.

Dispersive impairments in the link may create a relative phase shift between sub-bands. In that case, the "orthogonality" of the wavelets is lost and cross terms appear as self-interference in the recovered symbols.

BRIEF SUMMARY OF THE INVENTION

In the presently disclosed invention, a modem receiver enables equalization and synchronization to the respective transmitter. A multiband receiver equalizer uses data in each sub-band from a QMF filter bank to continuously track the phase and amplitude of each sub-band without the use of pilot tones. The modem uses this information for both data recovery by the equalizer and as the phase detector input to a phase-locked loop used for transmitter timing synchronization.

The equalizer is comprised of a filter and quantizer in the forward path, a feedback circuit connecting the quantizer output to the filter input, and a measuring circuit used to initialize the feedback circuit.

The receiver multirate QMF filter bank may be implemented with a form of polyphase filtering followed by four M/2-point FFTs. The FFT outputs successive sub-bands, one per sample. The receiver filter is then capable of removing the effects of cross-correlations resulting from the transmitter, the transmission medium, or both.

Multipath echo compensation using the disclosed receiver circuitry is also discussed, as is the derivation of preferred wavelet functions utilized in the presently disclosed modem.

BRIEF DESCRIPTION OF THE SEVERAL VIEWS OF THE DRAWING

The foregoing features of this invention as well as the invention itself may be more fully understood from the following detailed description of the drawings in which:

FIG. 1 is a diagrammatical representation of a signal decomposition-recomposition system;

FIG. 1A is a diagrammatical representation of a cascade analyzer;

FIG. 1B is a diagrammatical representation of a cascade synthesizer;

FIG. 14 is a flow diagram of sub-steps invoked by the method of FIGS. 12 and 13;

FIG. 15 is a flow diagram of a method for receiving data using the FM modem of FIG. 11;

FIG. 16 is a flow diagram of sub-steps invoked by the method of FIG. 15;

DETAILED DESCRIPTION OF THE INVENTION

Figure 1D:
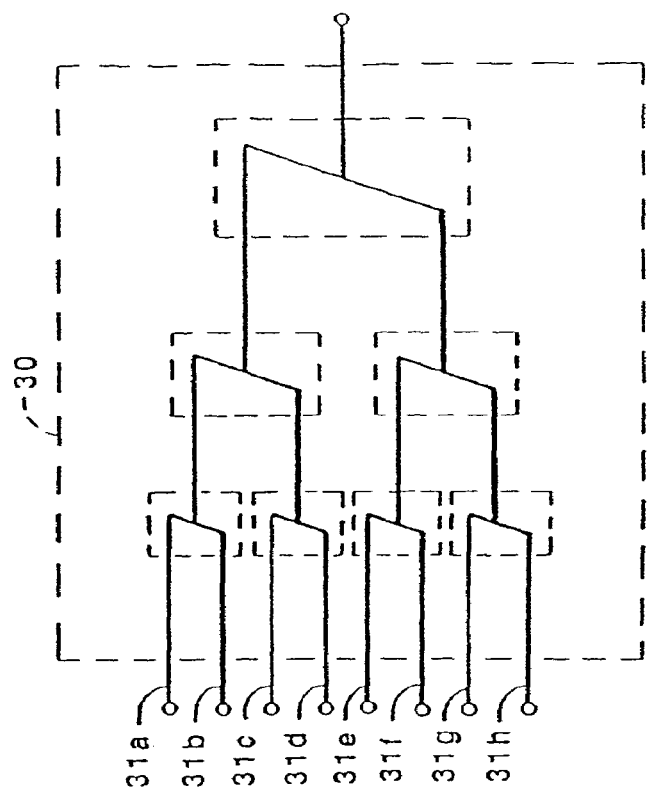
FIG. 1D is a diagrammatical representation of a tree synthesizer.

Referring now to FIG. 1 a signal decomposition-recomposition system 10 includes an analyzer 12 having an input port 14a and a pair of output ports 16a, 16b. Each of the output ports 16a, 16b are coupled to a corresponding pair of input ports 18a, 18b of a synthesizer 20.

An analog input signal X fed to the analyzer input port 14a is decomposed into a pair of signals W' and V' each of which is fed to a corresponding one of the output ports 16a, 16b. Similarly, a pair of input signals W', V' fed to the synthesizer input ports 18a, 18b are reconstructed in to an output signal Y at a synthesizer output port 22a. The decomposition and reconstruction processes performed by the analyzer 12 and the synthesizer 20 as well as the signals V' and W' will be described further hereinbelow. Suffice it here to say that the input signal X is decomposed into the signals V' and W' such that the signals V' and W' may later be combined to exactly reconstruct the input signal X.

It should be noted that the sub-analyzer and sub-synthesizer building blocks operate digitally, however, for clarity in the description, the signal conditioning circuits required to convert between analog signals and digital signals in the system have been omitted. Such signal conditioning circuits will be described in conjunction with FIG. 4 below. Briefly, however, and as will be described in conjunction with FIG. 4, when an input signal to a system building block, e.g. a sub-analyzer or sub-synthesizer, corresponds to an analog signal, the signal should first be fed through a filter having filter characteristics selected to provide Nyquist filtering. The appropriately filtered signal may then be sampled by an analog-to-digital converter (ADC). Similarly, if the output from a system building block is to be an analog signal, the signal should be fed to a digital-to-analog converter (DAC) and fed to a second filter likewise selected having filter characteristics selected to provide Nyquist filtering.

The sub-synthesizer 20 performs the inverse operation of the sub-analyzer 12, and vice versa. That is, if the signals W' and V' from a sub-analyzer are applied as input signals to the sub-synthesizer input ports 18a, 18b, the output signal Y will be identical to the sequence of input samples, X, except for a predetermined time delay. In a preferred embodiment, the time delay corresponds to one sample time.

Likewise, applying the signals V', W' to the respective synthesizer input ports 18a, 18b and then applying the resultant output signal Y to the analyzer input port 14a should provide at the respective analyzer output ports 16a, 16b the original input signals V' and W'.

As described above, the analyzer 12 and synthesizer 20 provide signal decomposition and reconstruction functions. As will be described below, the sub-analyzer and sub-synthesizer may be used as building blocks and may be coupled to provide more complex circuits which may themselves be coupled to provide a variety of signal transmitting and receiving systems. Furthermore, the analyzer 12 and synthesizer 20 as well as other system building blocks to be described hereinbelow may be efficiently implemented in hardware, software or by a combination of hardware and software.

The analyzers and synthesizers to be described herein operate on an ordered sequence of numbers, which may be, but are not limited to, samples from an analog to digital converter (ADC). For example, samples may be expressed as X(0), X(1), X(2), and X(3) where X(0) is the most recent sample. Each of the binary numbers X(0) through X(3) has a particular value within a predetermined range of values. An 8-bit ADC, for example, may provide a range of decimal values between −128 to +127.

The sequence of samples X(0) through X(3) may be considered as the coordinates of a vector [X] in a 4-dimensional space. A linear transformation may be made from the coordinate system of X to another coordinate system in the same 4-dimensional space. Thus, the vector X may be transformed to a vector Y by a "rotation" matrix C. In matrix notation this may be expressed as:

$$[Y]=[C]*[X]$$

Using axes of the new coordinate system that are mutually orthogonal, the vector Y has components which correspond to the projections of X onto the new transformation axes. Such projections are provided by forming a vector dot product.

In a 4 dimension case for example, a set of Walsh codes, Code 1–Code 4, may be provided as:

Code 1=+1+1+1+1
Code 2=+1−1+1−1
Code 3=+1+1−1−1
Code 4=+1−1−1+1

The Walsh codes Code 1–Code 4 above represent an orthogonal coordinate axis in the 4-dimensions of this time ordered space. Codes 1–4 have a length corresponding to the square root of 4, (i.e. the dot product of code 1 with itself equals 4) and thus are not unit vectors.

The rotation matrix C may be expressed as:

$$[C] = \begin{matrix} C_1 = +1+1+1+1 \\ C_2 = +1-1+1-1 \\ C_3 = +1+1-1-1 \\ C_4 = +1-1-1+1 \end{matrix}$$

That is, the rows $C_1$–$C_4$ of the rotation matrix C correspond to the components of the Walsh code vectors such that matrix multiplication between the rotation matrix C and the vector X is equivalent to the dot product of a particular one of the vectors $C_1$–$C_4$ with the vector X. The components of the row vector X may be expressed as:

$$[X]=[X(0), X(1), X(2), X(3)]$$

A new state vector Y may be expressed as:

$$[Y]=[[C_1]*[X], [C_2]*[X], [C_3]*[X], [C_4]*[X]]$$

where * symbolizes a dot product operation between [X], and the Walsh vectors [$C_1$] through [$C_4$]. The new state vector [Y] completely describes the original state defined by [X] and may be computed on every group of 4 samples X(0)–X(3).

The linear rotation operation is exactly invertible, and thus:

$$[X]=[C^\wedge][Y]$$

where [$C^\wedge$] is the inverse of [C]. The matrix $C^\wedge$ may be found from the relation:

$$[C^\wedge]=1/L \ [C]$$

where L corresponds to the dimension of a row or column vector of the matrix $C^\wedge$.

In a two dimensional case, Walsh vectors may be expressed as $C_1$=[+1,+1] and $C_2$=[+1,−1]. Thus, analyzers may be defined having 2 outputs using the 2-dimensional vector above.

Walsh vectors of any dimension may be generated by the two dimensional vectors $C_1$, $C_2$. That is, substitution of a set of Walsh codes into a 2-dimensional generator matrix provides a new Walsh code having twice the dimension. Using this procedure an N-dimensional transformation needed to provide an analyzer, may be provided. Thus, because of the way that Walsh vectors are constructed from their two dimensional Walsh generators, higher dimension analyzers and synthesizers may be constructed from the 2-dimensional case.

With this matrix transformation method, matrix equations for providing a modem or a signal encryptor may be generated. The fundamental operation in the requisite computations is addition and subtraction of terms.

It should be noted that in the case of a cascade analyzer or synthesizer provided using the matrix method with a matrix having N dimensions, the lowest frequency channel is operated on by the matrix vector $C_1$ and each subsequent channel i is operated on by a corresponding matrix vector $C_i$ until the highest frequency channel is operated on by the matrix vector $C_N$. Thus, in the case of a 4 dimension matrix the lowest frequency channel is operated on by the matrix vector $C_1$ and the highest frequency channel is operated on by the matrix vector $C_4$. The case of a tree analyzer or synthesizer provided by the matrix method will be described in conjunction with FIGS. 1C and 1D below.

In another preferred method the equations which describe the sub-analyzer output signals V' and W' may be provided as:

$$V'=SHIFT*X(n-1)-BN*W' \qquad \text{Equation 1}$$

$$W'=2*X(n-1)-X(n)-X(n-2) \qquad \text{Equation 2}$$

In which:

V' corresponds to a scaling or filtering function of the sampled input signal X;

W' corresponds to a residual or derivative of the sampled input signal X;

X(n) corresponds to the most recent input sample;

X(n−1) and X(n−2) correspond to the two previous input samples;

SHIFT corresponds to a variable set equal to a positive power of 2 (such as 32, or 64, or . . . ); and BN corresponds to a positive integer having a value between 0 and SHIFT and is preferred to have a relatively small value.

As will be explained further below the scaling function V' and the residual W' defined by Equations 1 and 2 may be evaluated on alternate input samples of the input signal X, such that the value of the residual W' corresponds to twice the difference between the "center" sample, X(n−1), and the midpoint of a line connecting the two nearest neighbors of X(n−1) here, the two nearest neighbors being represented as X(n) and X(n−2). When Equations 1 and 2 are evaluated on alternate input samples, only the odd numbered (or alternatively only the even numbered) "center points" are selected for the calculation. Thus, the output rate of the sub-analyzer corresponds to one-half the input rate of the input signal X.

The residual W' may also be interpreted as a deceleration about the center point. Thus it is possible to define the residual W' as an acceleration and substitute −W' for W' in the Equations 1 and 2 above to provide an alternate and essentially equivalent expression for the residual W'.

Other implementations using more nearest neighbor points and which define the residual W' as a higher order or first order derivative of the function evaluated about the center point, may also be used.

The interpretation of the residual W'(N) described above indicates that the residual W'(N) responds only to changes in the slope around alternate samples. Thus one characteristic of the residual W' in the present invention is that the residual W' is provided having a value of zero when the slope about the center point is constant.

The conventionally defined residual W(n) is related to the effective residual W'(n) as defined in the present invention by $$W(n) = B*W'(n)$$

As a consequence of the definition for the residual W'(n) in the present invention, signal compression based on linear or non-linear quantization of the residual W'(n) (rather than the residual W(n) as defined in the conventional approach) may result in improved performance over compression schemes based upon conventional definitions of the residual W(N) such as:

$$W(N) = X(n-1) - V(N)$$

The sub-synthesizer operation may be described by equations 3 and 4 below:

$$Y(n-1) = Y(n-1)/\text{SHIFT} \qquad \text{Equation 3}$$

$$Y(n) = Y(n)/\text{SHIFT} \qquad \text{Equation 4}$$

in which:

SHIFT corresponds to a power of 2 and $$Y(n-1) = V' + BN*W';$$

$$Y(n) = 2*Y(1) - Y(-) - \text{SHIFT}*W'; \text{ and}$$

Y'(−) corresponds to a saved, previously calculated (i.e. recursive), value of Y'(n).

By defining the variable SHIFT, as above and taking advantage of the fact that multiplication and division by a power of two is equivalent to a right or left shift on a binary computer, practical implementations of these equations may be provided with relatively little and simple hardware and are therefore preferred.

Thus in the approach of the present invention, the residual W' has been defined to provide a particular characteristic and the sequence V' is selected to provide the remainder of the sequence.

Referring now to FIG. 1A, a so-called "cascade analyzer" 24 includes a plurality of here N sub-analyzers. The cascade analyzer 24 may be provided by feeding the signal V'$_1$ from an output port of a first sub-analyzer 24a into the input port of a second sub-analyzer 24b and feeding a signal V'$_2$ from the output port of the second sub-analyzer into the input port of a third analyzer (not shown) and so on. The process continuing until a sub-analyzer 24N provides a signal V'$_N$ having a predetermined sample rate.

For example, in a communication system it may be desirable to couple a plurality of say N sub-analyzers as described above where N is selected such that a signal V'$_N$ is selected such that the signal V'$_N$ is provided having a sample rate which is below twice the lower frequency cutoff of the communications link. Since each sub-analyzer halves the sample rate to its input, the various output signals, W'$_1$, W'$_2$ . . . W'$_N$ of the cascade analyzer are provided at differing rates.

Referring now to FIG. 1B a so-called "cascade synthesizer" 26 may be provided from a plurality of sub-synthesizer 26a–26N which may be of the type described above in conjunction with FIG. 1. The cascade synthesizer operates to provide the inverse operation of the cascade analyzer.

Figure 1C:
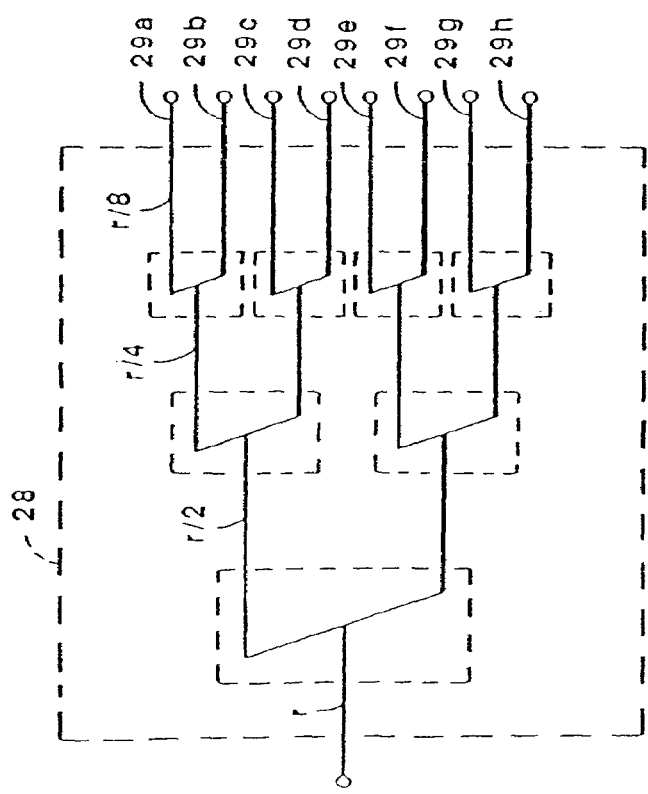
FIG. 1C is a diagrammatical representation of a tree analyzer.

Referring now to FIG. 1C a so-called "tree analyzer" 28 may be provided by appropriately coupling a plurality of sub-analyzers 29a–29g each of which may be of the type described above in conjunction with FIG. 1. Thus, in addition to a cascade emanating from the scale function V'(N), it is also possible to have residual cascades emanating from one or more residual sequences W'(N). That is, the residual sequences W'(N) may themselves be considered as inputs for a multi-resolution analysis. It is therefore, in that case, possible to provide both the scaling function sequence V' and the residual sequence W' having equal same sample rates. Here, the sample rate corresponding to one-eighth the original sample rate.

The tree analyzer 28 may be provided by analyzing each of the residual sequence outputs W' until all such sequences are brought down to one rate, which is normally below the Nyquist rate of the lower cutoff frequency of a transmission link with which the analyzer cooperates. The three level analyzer tree 28 is here provided having all of its output 29a–29h at ⅛ the sample rate, r, of the analog input signal, X. Each output sample may include many more bits per sample than the input sample, however, the numbers represented by those output samples will usually be small in magnitude and easily re-quantized by a quantizer (not shown).

Referring now to FIG. 1D a so-called "tree synthesizer" 30 may be provided from a plurality of sub-synthesizers 31a–31g, each of which may be of the type described above in conjunction with FIG. 1. The tree synthesizer 30 provides the inverse operation of the tree analyzer 28 (FIG. 1C).

It should be noted that in each of the applications to be described herein below in conjunction with FIGS. 2–8, the term analyzer as used throughout FIGS. 2–8 may be used to indicate a sub-analyzer, a cascade analyzer, or a tree analyzer element and likewise, the term synthesizer referred to in FIGS. 2–8 may be used to indicate a sub-synthesizer, a cascade synthesizer or a tree synthesizer element, each of which have been described above in conjunction with FIGS. 1–1D. Each of the analyzer and synthesizer elements may be provided according to the matrix transformation technique or alternatively each of the analyzer and synthesizer elements may be provided according to the three point equations of the forms of Equations 1 and 2 above, or alternatively still, each of the analyzer and synthesizer elements may be provided according to equations of the form:

$$W' = X(n) - X(n-2)$$

$$V' = X(n-1)$$

In the case where analyzers and synthesizers are provided as tree type analyzers and synthesizers the matrix vectors $C_i$ where i=1, 3, 5, etc. . . . operate on the channels in the bottom portions of the tree analyzer or synthesizer while the matrix vectors $C_i$ i=2, 4, 6, etc. . . . operate on channels in the top half of the tree analyzer or synthesizer. Thus, if the analyzer 28 having channels 29a–29h were provided by an 8 dimensional matrix having vectors $C_1$ through $C_8$ then channels 29h through 29e would be operated on, respectively, by matrix vectors $C_1$, $C_3$, $C_5$, and $C_7$ and channels 29d through 29a would be operated on, respectively, by matrix vectors $C_2$, $C_4$, $C_6$, and $C_8$.

Figure 2:
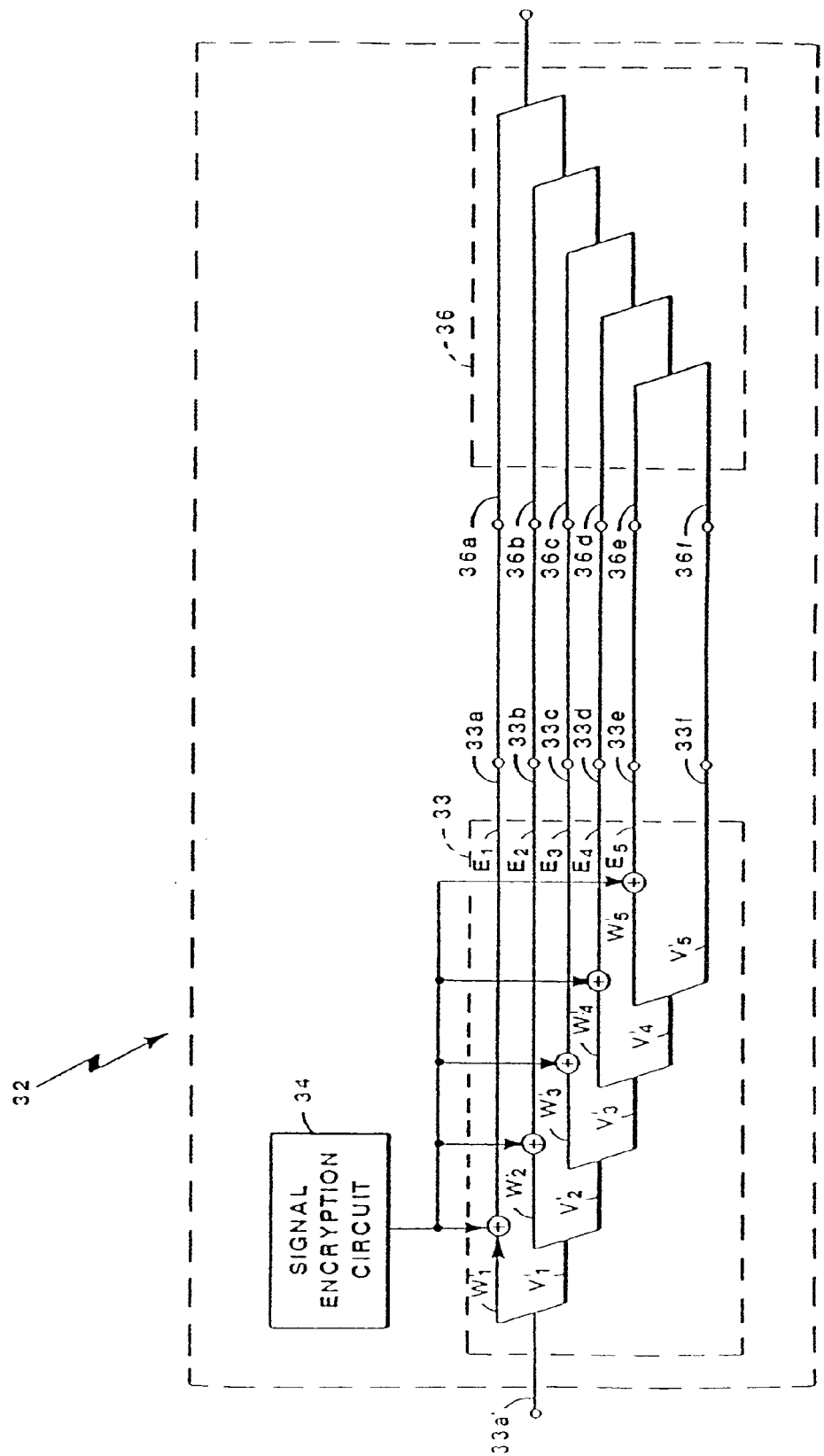
FIG. 2 is a block diagram of a signal encryptor.

Referring now to FIG. 2 a signal encryptor 32 includes an analyzer 33 having signal encryption circuit 34, which may be provided for example as a random number generator, coupled thereto. The analyzer 33 is provided by coupling a plurality, here five, sub-analyzers as shown. Each of the sub-analyzers may be of the type and thus operate in a similar manner as the sub-analyzer described above in conjunction with FIG. 1. Each of a plurality of analyzer output ports 33a–33f are coupled to a corresponding one of a like plurality of input ports 36a–36f of a synthesizer 36. Likewise, the synthesizer 36 is provided by coupling a plurality, here five, sub-synthesizers as shown. Each of the sub-synthesizers may be of the type and thus operate in a similar manner as the sub-synthesizer described above in conjunction with FIG. 1.

It should be noted that here five sub-analyzers and sub-synthesizers are coupled as shown, however, those of ordinary skill in the art will now appreciate that any number of sub-analyzers and sub-synthesizers may be used. It should also be noted, and as described above, that although cascade analyzers and synthesizers are here shown, tree-type analyzers and synthesizers may also be used. An input signal X may be decomposed, therefore into any number N of signals. In general, and as mentioned above in conjunction with FIG. 1, the decomposition procedure performed by the analyzer and thus the number of coupled sub-analyzers may be preferred to cease when the Nyquist frequency of the Nth signal $V_N$ is below the known lower cutoff frequency of the input signal X.

In general operational overview of the signal encryption circuit 32, the input signal X, which may be for example a voice signal, is fed to the analyzer input port 33a' and decomposed by the analyzer 33 in the manner described above in conjunction with FIG. 1. Here, the input signal X is decomposed into signals $V_1$, $V_2$, $V_3$, $V_4$, $V_5$, and $W_1$, $W_2$, $W_3$, $W_4$ and $W_5$ as shown. To encrypt, the random number generator 34, which may be provided for example as a digital random number generator, feeds an encryption signal to each of the signal paths of the residuals, $W'_1$–$W'_5$. The value of each of the residuals, $W'_1$–$W'_5$ are thus modified to correspond to signals $E_1$–$E_5$.

As shown here one method for encrypting the residuals $W'_1$–$W'_5$ is to provide a logical exclusive or (XOR) operation between the sign of the residuals $W'_1$–$W'_5$ and a logical variable having a value corresponding to a logical one (as shown). Alternatively, another method of encryption may be provided by adding several individual secret binary bit streams to one or all of the residuals W'. The residual signals W' are generally provided having a relatively low power level and thus the residual signals $W'_1$–$W'_5$ may appear simply as noise signals (i.e. "buried" in noise) by either or both of the above mentioned encryption techniques. Other methods of encrypting well known to those of ordinary skill in the art may also be used including permutation of channels and substitution of symbols. It should also be noted that alternatively each of the signals $V_1'$–$V_5'$ may be encrypted or a combination of the signals $W_K'$ and $V_K'$ may be encrypted.

It should also be noted that the signal encryptor 32 may be modified to include digital cipher feedback, which is common in the encryption art. To provide digital cipher feedback in the present invention, each of the 5 XOR outputs from the analyzer should be fed back to the inputs of 5 separate secret random number generators (not shown) in the manner of the data encryption standard (DES) for encryption.

It should also be noted that any means well known to those of ordinary skill in the art for providing random digital numbers including but not limited to the DES, with or without cipher feedback may be used. Furthermore, other methods of deriving and using the random numbers to modify the value of the residuals W' including but not limited to additive noise techniques and the like which do not use the XOR function may also be used.

The encrypted signals $E_1$–$E_5$ are subsequently coupled to corresponding ones of the analyzer output ports 33a–33f and then fed to the synthesizer input ports 36a–36e along with an unmodified signal V5 fed to input port 36f. The synthesizer 36 employs Equations 3 and 4 to reconstruct the signals $E_1$–$E_5$ fed thereto to provide a reconstructed output signal Y which may be transmitted on a communication channel (not shown) for example.

A receiver (not shown) receives the transmitted signal and analyzes the signal to recover the signals V5 and $E_1$–$E_5$. The receiver subsequently decrypts the signals $E_1$–$E_5$ to recover the signals $W_1$–$W_5$ and re-synthesizes to get the original signal X.

The synthesizer 36 reconstructs the signals $E_1$–$E_5$ such that the resultant reconstructed signal X' provided at the synthesizer output port should not occupy more than the Nyquist bandwidth. Thus it is possible to have the sampling frequency of the highest frequency encrypted stage correspond to twice the upper cutoff frequency of the transmission channel.

The reconstructed encrypted signal X' provided at the synthesizer output port will of course have a different (noise-like) power spectrum and a different average total power due to the additive noise introduced. The input signal power may be diminished to restrict the total channel power. Means for restricting the total channel power may include means for transmitting the power factor to the receiver by using the amplitude of pilot tones which may be used to synchronize the decryptor and an ADC. These pilot tones may be used to derive the ADC clock by a phase locked loop for example and may be provided as explicit narrow band tones or, alternately the pilot tones may be provided as a secret coded sequence added to the residual W' to hide the true value of the residual. The receiver would correlate the appropriate residual in order to establish time synchronization. Specific coded sequences (such as the GOLD codes and JPL ranging codes) having suitable correlation properties required for acquiring synchronization by this method are known in the art of spread spectrum communications.

Furthermore the encryptor recovers the signal out of the receiver substantially exactly like the original input signal except for the presence of noise from the channel and noise-like fluctuations due to imprecise timing synchronization of the ADC converters in the transmitter and receiver ends.

The signal encryptor may also include a means for line equalization (not shown). Such means are well known to those of ordinary skill in the art of modem design. Variations in line loss with frequency (tilt) and phase shift may be compensated by adaptive filtering and often includes a precursor burst of known energy to set the filter parameters and a means for periodically modifying the equalizer coefficients based on a measure of the quality of the received signal.

It should also be noted that if in the signal encryptor 32 the value of the input signal X is set to zero, then the signal encryptor output signal X' would correspond to random noise generated by the encrypting random number generator. Thus in this case the signal encryptor 32 acts as a broadband random number generator. Thus, the signal encryptor may be used as a generator to provide a signal on the line which may be used in the line equalization process.

Furthermore the analyzer may be used to measure the channel response of each channel. If the synthesizer, thus provides a test signal on each channel the analyzer may measure the response on each channel to determine the loss on each channel. Thus the analyzer and synthesizer may be used to provide a method of line equalization.

Figure 4:
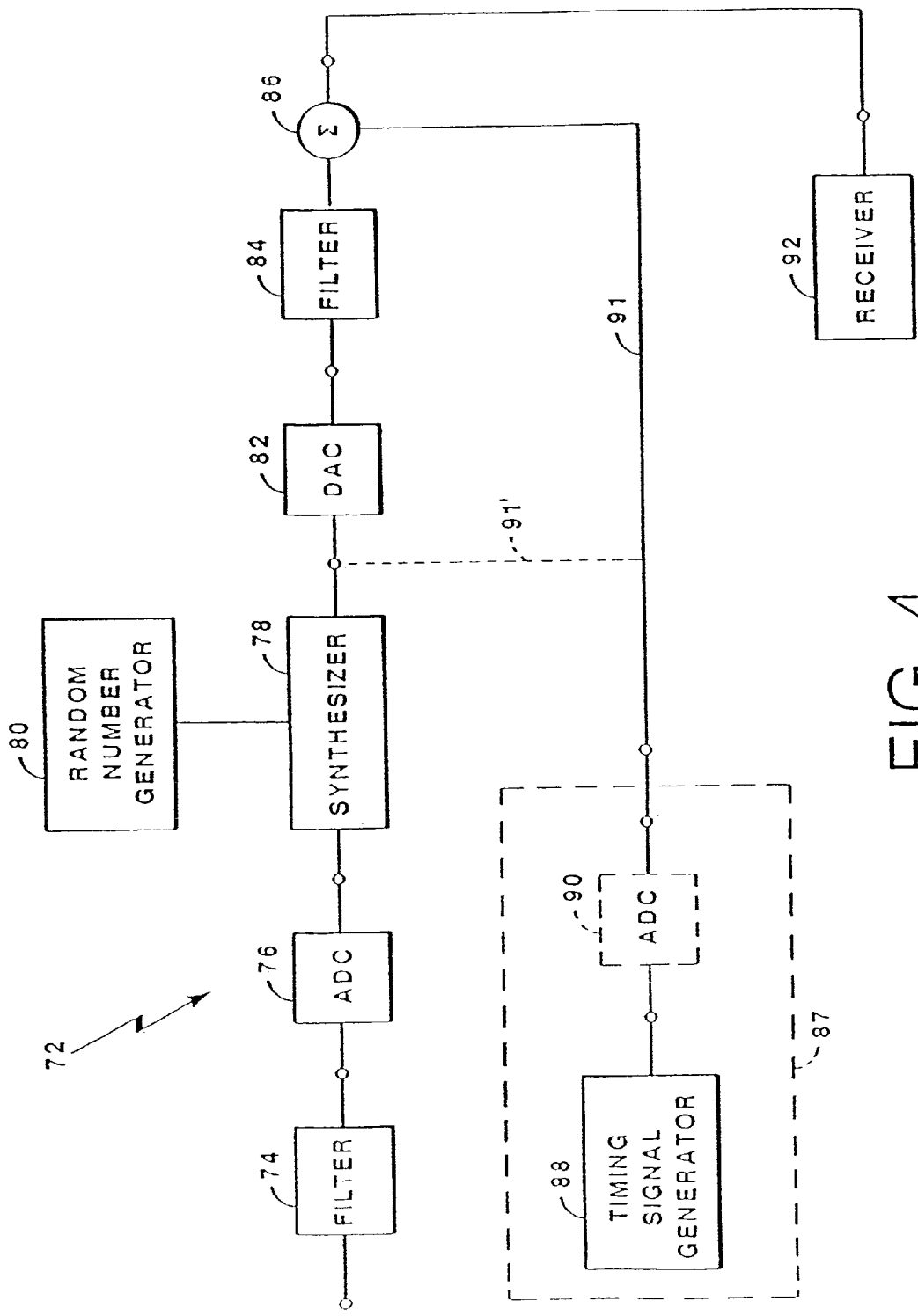
FIG. 4 is a block diagram of a signal encrypting transmitting and receiving system.

As will be described below in conjunction with FIG. 4, this concept may be further refined to only using a synthesizer at the sending end and only an analyzer at the receiving end.

The delay in a tree may correspond to $$\text{Delay} = 2^L - 1$$

where L is the number of levels in the tree. Thus the tree process in a five level tree introduces a relatively short delay of only 31 samples. Likewise, for a cascade system, it is believed that the delay in each signal path is provided by the above equation where L now corresponds to the number of stages in a particular path of the cascade. Since human hearing is sensitive to echoes from a hybrid coupler found in most transmission media, this short delay is a desirable feature.

Figure 3:
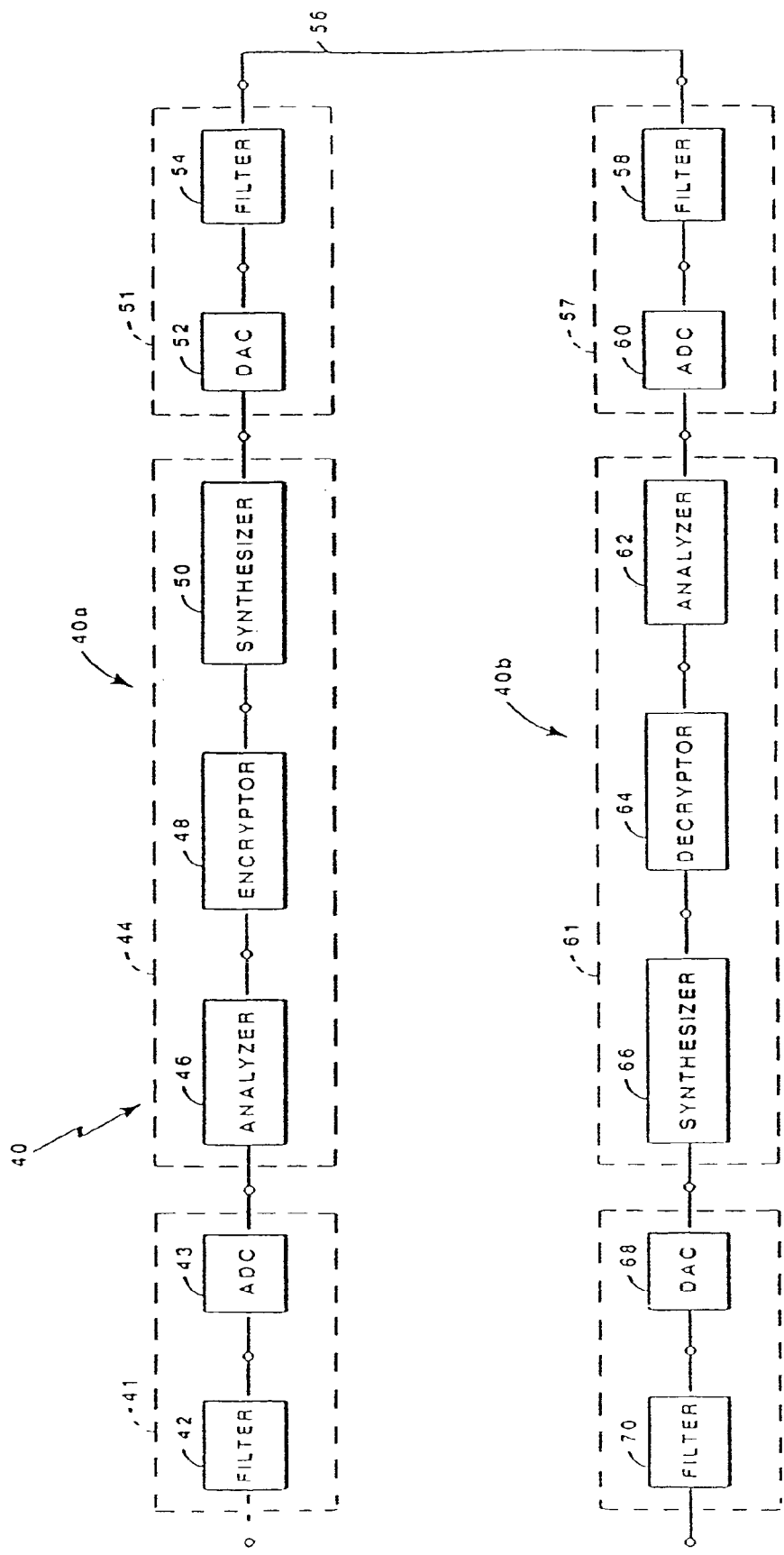
FIG. 3 is a block diagram of a transmitting and receiving system for the transmission and reception of secure signals.

Referring now to FIG. 3, a transmitting and receiving system 40 for the transmission and reception of secure signals includes a transmitting portion 40a and a receiving portion 40b. The transmitting portion 40a includes a signal conditioning circuit 41 including an input filter 42 having appropriately selected filter characteristics preferably selected to provide Nyquist filtering to an analog signal fed thereto. The filter 42 couples the analog signal to an analog-to digital converter (ADC) 43 which converts the received analog signal into a digital signal representative of the analog signal.

The analog signal fed to the ADC 43 input port may be fed through an amplifier or other preconditioning circuits (not shown) and then fed to the ADC 43. Preferably signal preconditioning circuits such as low noise amplifiers and buffer amplifiers are relatively wide-band amplifiers and are further characterized as having relatively low levels of phase dispersion over the bandwidth of the amplifier. That is, the amplifiers impart to the amplified output signal a substantially equal phase shift to the amplified output signals therefrom at least over the bandwidth of the transmitted signal. Further, the sampling rate of the ADC 43 is preferably greater than twice the Nyquist sampling frequency (i.e. greater than twice the frequency of the highest frequency component signal in the input spectrum).

The ADC 43 converts the signals provided from the filter 42 in accordance with the predetermined sampling rate to provide a stream of digital words. At the output of the ADC 43 such stream of digital words are fed to a signal encryption circuit 44.

The signal encryption circuit 44 includes an analyzer 46 which appropriately decomposes the signal fed thereto into a plurality of signals, an encryptor circuit 48 which encrypts the decomposed signals and a synthesizer 50 which combines the signals fed thereto into a reconstructed encrypted signal. The signal encryption circuit 44 may be of the type and operate in a manner similar to the signal encryption circuit 32 described above in conjunction with FIG. 2.

The encryptor circuit 44 may encrypt the signal by adding a secret number to the residue, W' with the value of the secret number known only to the sender and receiver. Such an addition may typically be done modulo 2. That is, by providing a logical exclusive-or (XOR) function bit by bit to the residual signal. Such addition may also be accomplished by simply adding modulo the actual word size of the data.

The encryptor 48 may be provided as a secret number generator which may be of a type that provides a different secret number based on the number of times it is requested to do so, or it may be of the type that the output depends only on its input. The latter type may often be self-synchronizing. The former type may suffer loss of sync between the encryptor and the decryptor if the receiver, for any reason, loses bit or word synchronization with the transmitter.

The encryptor 48 may provide permutation operations among the several channels or alternatively the encryptor 48 may provide substitution operations or alternatively still the signal encryptor may provide the logical or operation described above in conjunction with FIG. 2.

The signal encryption circuit 44 feeds the reconstructed encrypted signal to an input port of an output signal conditioning circuit 51 which includes a digital-to analog-converter (DAC) 52 which may be provided as a logarithmic ADC for example, which converts the encrypted bit stream fed thereto to an analog signal representative of the encrypted bit stream. The analog signal is subsequently fed to an output filter 54 having appropriately selected filter characteristics as described above. The filter 54 couples the signal fed thereto to a first end of a transmission channel 56, which may be provided for example as a telephone line. A second end of the transmission channel 56 is coupled to the receiving portion 40b of the transmitting and receiving system 40.

In general overview, the receiving portion 40b receives a secure signal fed thereto and decrypts the signal to provide a clear text signal at an output port. The receiving portion 40b of the transmitting and receiving system 40 receives the encrypted signal through an input signal conditioning circuit 57 at an input port of an input filter 58 having appropriately selected filter characteristics. The input filter 58 couples the signal to an ADC 60 which converts the analog signal to provide a stream of digital words in the same manner as described above. The filter 58 may be provided having a low pass filter frequency cutoff characteristic corresponding to one-half the sampling frequency of the ADC 60. The ADC 60 feeds the stream of digital words to a decryption circuit 61 which includes an analyzer 62 which decomposes the signal fed thereto into a plurality of signals and a decryptor circuit 64.

If the encryptor circuit 48 in the transmitting portion 40a of the system used a secret number to encrypt the signal, the decryptor circuit 64 subtracts the secret number, to recover the original data.

The decryptor-synthesizer combination 64, 66 performs the inverse operation of the encryptor-analyzer 48, 46 at the transmitter and feeds the decrypted and appropriately recomposed signal to a digital to analog converter (DAC) 68. The DAC 68 provides an analog signal corresponding to the bit stream fed thereto and feeds the analog signal to a receiver output filter having appropriately selected filter characteristics as described above.

If the analyzer and synthesizer are provided as the cascade type or the tree type, then as mentioned above, the number of levels may typically be determined by the lower limit of the input signal bandwidth. Thus a practical requirement for most applications may be to dispose a pre-filter (not shown) having a high-pass or band pass filter characteristic prior to the signal conditioning circuit 41.

In any case, whether such a filter is or is not provided, the system of sender and receiver may not recover a signal having a bandwidth which exceeds the bandwidth of the communications link 56. In applications where the communication link 56 is provided by electromagnetic or sonic energy, the bandwidth of the link generally has practical limits, for example a single television (TV) channel.

Referring now to FIG. 4 a signal encryption system 72 receives an analog signal at an input port and filters and converts the analog signal to a first stream of bits via a filter 74 and an ADC 76 in the same manner as described above in conjunction with FIG. 4. Here, the bit stream is fed from the ADC 76 to a signal encryptor 78. Here the signal encryptor 78 receives the signals directly on separate signal channels. A random number generator 80 is coupled to the signal encryptor 78 and feeds a stream of random bits to the signal encryptor 78. The random stream of bits modifies the first bit stream to thus provide an encrypted signal. The signal encryptor 78 combines the signals to thus provide a reconstructed encrypted signal at an output port.

The encrypted signal is subsequently fed from the signal encryptor 78 to an input port of a DAC 82 which converts the encrypted bit stream to an analog signal. The analog signal is coupled through a filter 84 which provides an appropriately filtered signal to a first input port of a signal combining circuit 86.

A timing circuit 87 includes a timing signal generator 88 for providing a timing signal. The timing circuit 87 may provide to a receiver 92 either an analog or a digital timing signal and thus an optional ADC 90 is here shown coupled between the timing signal generator 88 and the summing circuit 86. If the DAC 90 is included in the timing circuit 90 then the timing signal is fed through optional signal path 91' to the digital input port of the DAC 8d. If the ADC 90 is omitted then the timing signal is fed through signal path 91 to the summing circuit 86 as shown.

It should be noted and those of ordinary skill in the art will recognize that implicit in the recovery of information at the receiving end of an analog communications link using the analyzer and synthesizer building blocks operating according to the above equations is the need to synchronize the ADC in the transmitting portion of the system and the DAC at the receiving portion of the system such that the transmit and receive portions of the system agree on the exact time of sampling. Large inaccuracies in synchronization will result in gibberish out of the receiver. Small statistical jitter in the timing synchronization will have the same effect as noise on the link.

Timing and synchronization schemes are known to those of ordinary skill in the art. In one method for example, an oscillator locked to (i.e. derived from) the sampling rate of the sending portion may be sent over the link. The received oscillator signal may be used to derive (via phase locked loop techniques for example) the receiver's clock signals for sampling. As mentioned in the secure transmitting and receiving system 40 (FIG. 3) the timing information may be applied to the encryptor and decryptor respectively.

In those systems employing cascade-type or tree-type analyzers and synthesizers (FIGS. 1A–1D) two timing signals may be required because the inherent delay in the sending portion of the system effectively defines "words" rather than just signal bits that should be synchronized. Such word synchronization may be achieved by providing a second sender oscillator which may be locked to the first oscillator (alternatively, the first oscillator may be locked to second oscillator thus requiring only a word synchronization) and operating at a rate depending upon both the number of levels in the cascade and on the type of system being provided i.e. a signal encryptor, a signal compressor, or a modem. Such oscillator signals may occupy the same bandwidth as the system information, since they may be subtracted out by the known techniques for removing a signal of known frequency and constant amplitude. In practice these two oscillators should preferably provide signals having a particular frequency and a particular amplitude. In practice these two oscillators should preferably be locked to signals having frequencies corresponding to those frequencies which define the extreme upper and lower band edges of the frequency bandwidth of the system information (and the system information while still maintaining the requirement that will not exceed the band limits of the link.

One method for removing an interfering signal (namely, the received oscillator signal) from the accompanying system information signal is to form a feedback loop that subtracts out an amount of the known (as received) frequency until the resulting difference no longer contains any narrow band correlation to the known (received) oscillator. The operation of a phase locked loop includes multiplication of an input signal with a local oscillator (which, in turn, is locked to the received timing signal) and then integrating the result with a low-pass filter.

Another method for timing synchronization between the sending and receiving portions of the system will be described below in conjunction with FIG. 7.

Figure 5:
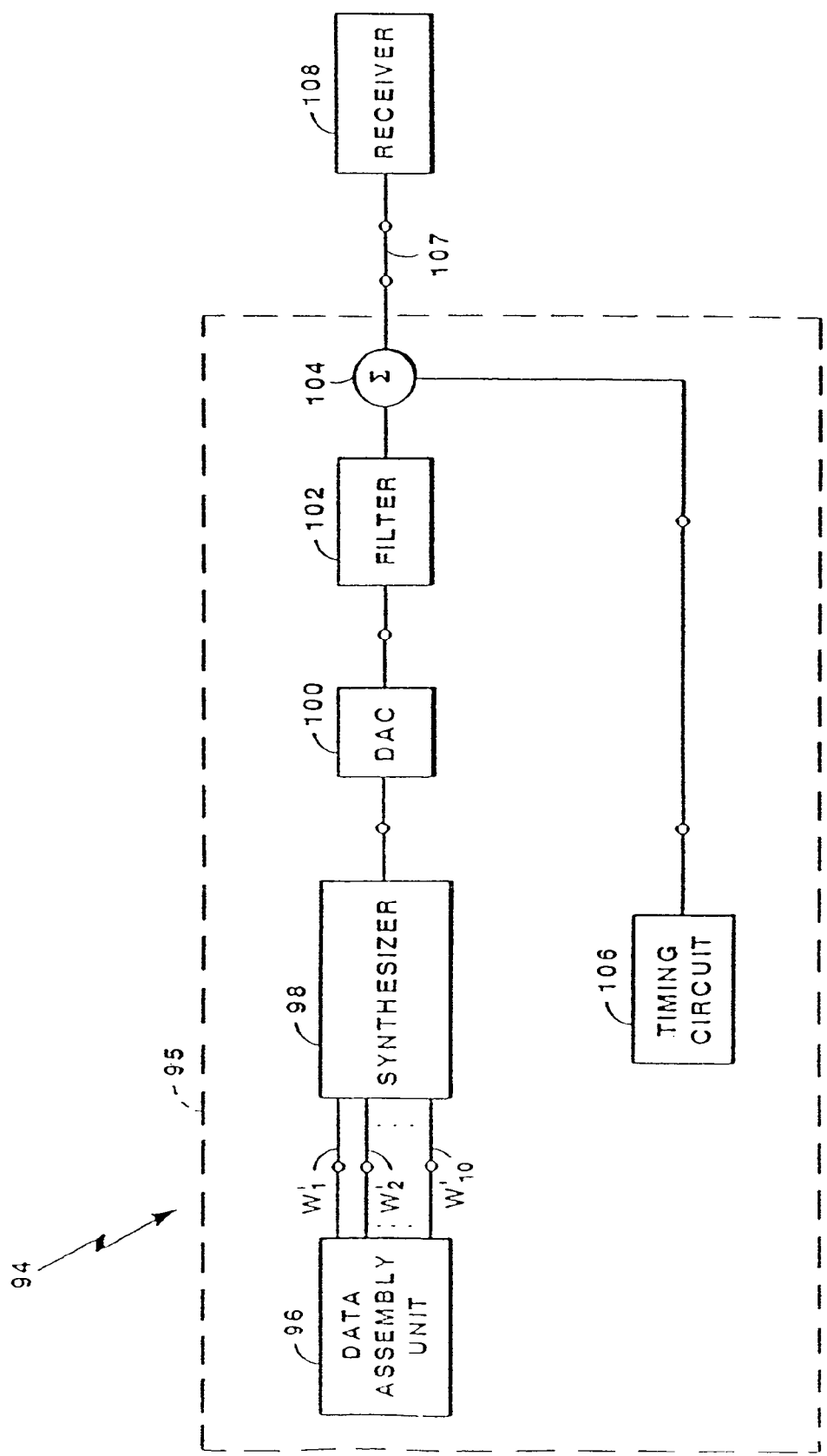
FIG. 5 is a block diagram of a modem.

Referring now to FIG. 5 a system for transmitting digital data over an analog medium 94 includes a modulator-demodulator (modem) 95 here only a modulator portion of the modem 95 being shown. The modem 95 includes a data assembly unit 96 for forming digital data into frames or bytes having a predetermined length appropriately selected for data transmission. The data assembly unit feeds the data to the input ports of a synthesizer 98 which forms the data into a bit stream in accordance with the technique of the sub-synthesizer 20 described above in conjunction with FIG. 1. That is, here digital data to be transmitted is applied to the residual inputs $W'_1 \ldots W'_N$ of the synthesizer. This data may be encrypted by a random number generator (not shown) which provides an encrypting sequence which may or may not be a secret sequence.

The synthesizer 98 feeds the bit stream into an input port of a DAC 100, which may be provided having a nonlinear response characteristic, which generates an analog signal corresponding to the bit stream fed thereto. In accordance with the Nyquist sampling theorem procedure, the digitized samples out of the sender should be converted via the DAC 100 to an analog signal representation of the digital signal fed thereto. The analog signal is subsequently filtered for anti-aliasing with a filter 102 having a low pass filter characteristic and preferably having a relatively steep filter skirt and a cutoff frequency corresponding to one-half the sampling rate frequency. The filtered signal is coupled to a first input port of a summing circuit 104. A timing circuit 106 feeds a timing signal into a second input port of the summing circuit. The summing circuit thus superimposes the two analog signals fed thereto. Alternatively, a timing signal may be transmitted via the input to the synthesizer 98.

The superimposed analog signal is transmitted over an analog transmission link 107 (e.g. a telephone line) to a receiver 108 where the timing signal may be used to provide timing data for the receiver such that the bit stream may be recovered from the analog signal. It is believed that a modem constructed in accordance with the present invention may operate at or near the maximum data rate theoretically possible for a transmission link based on signal to noise ratio of the link and Shannon's Law.

At the receiver 108, substantially all noise in the frequency range above one-half the receiver sampling rate frequency should be filtered with a filter having a low-pass filter characteristic and having a cutoff frequency above one-half the receiver sampling rate frequency. If the transmission link 107 is provided as a transmission line over which signals having a frequency between 400 Hz and 3200 Hz may be transmitted then the input signal may appropriately be sampled at a sampling rate typically of about 6400 bps.

A single tone having a frequency typically of about 3200 Hz may be provided by the timing circuit and added to the transmitted signal and phase-locked at the receiver as one means of synchronizing a receiver ADC clock. Since the tone may be provided having a known amplitude and frequency, it may be subtracted rather than filtered out at the receiver and thus there is no resultant loss of data.

Likewise a signal tone having a frequency typically of about 400 Hz may be used to provide a word synchronization for formulating the word comprising the input to all the cascade levels. Signals in the frequency range below 400 Hz may be used for signaling for line turnaround in a semi-full duplex modem, for sending reverse channel data and network information. Bits per cascade level may be increased until the maximum power per unit of data which may be transmitted and Shannon's limit are reached.

Furthermore error correcting codes such as M of N codes (M redundant bits out of N) and scrambling signals may be applied to the input data words as is known to those of ordinary skill in the modem art.

Figure 6:
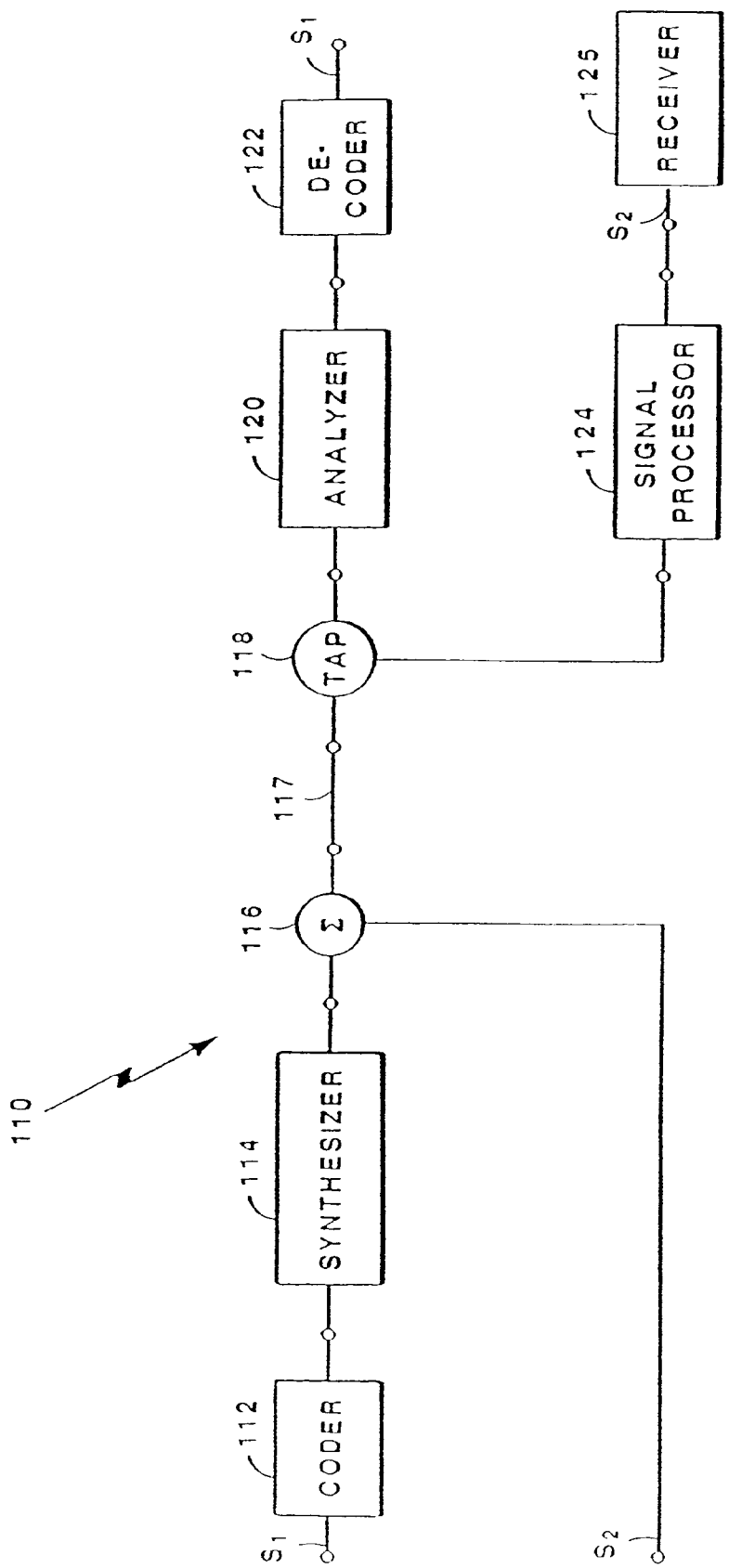
FIG. 6 is a block diagram of a coded modem.

Referring now to FIG. 6, a coded modem 110 using direct sequence coding, in which each data word modulates all the bits in a sequence of code bits, more than one signal may share the link simultaneously. A shared signal $S_2$ may be provided for example, as a voice signal, television (TV) signal or facsimile (FAX) signal or alternatively the shared signal $S_2$ may be provided from additional modems of the same type operating with orthogonal code sequences.

The coded modem 110 includes a coder 112 for providing the coding operation. The coded signal is fed to a synthesizer 114 which provides a relatively broadband signal having a noise-like frequency spectrum to an input port of a summing circuit 116. A sharing signal may be fed to a second input port of the summing circuit. The summing circuit couples the signals fed thereto to a first end of a transmission line 117.

At the demodulator portion, a signal tap 118 couples a portion of the signal transmitted over the transmission line 117 to an optional signal processor 124. The signal processor 124 feeds a processed signal to a receiver 125.

The codes of the coder 112 are selected to have good auto- and cross-correlation properties, and thus the modem data may be recovered even when the modem operates at low power relative to the shared signal.

To a sharing device, the receiver 125 which may be provided as a TV receiver for example, the modem signal may appear to be a small random background noise. However if the shared signal is coupled to the TV receiver 125 through the signal processor 124 containing the code sequences, C, then most or substantially all of the modem "interference" in the TV receiver 124 may be removed by known techniques for canceling correlated noise.

The modem 110 includes the coder 112 for providing a coding operation C, and a decoder 122 for providing a correlation operation, C^. In a correlation operation, data is recovered by digitally integrating the product of the received sequence with the stored code, C. A signal sharing the link will typically tend to integrate to near zero since the shared transmission is uncorrelated to the chosen code, C. The optional interference cancellation operation for the sharing signal is performed by the signal processor, 124.

Figure 9:
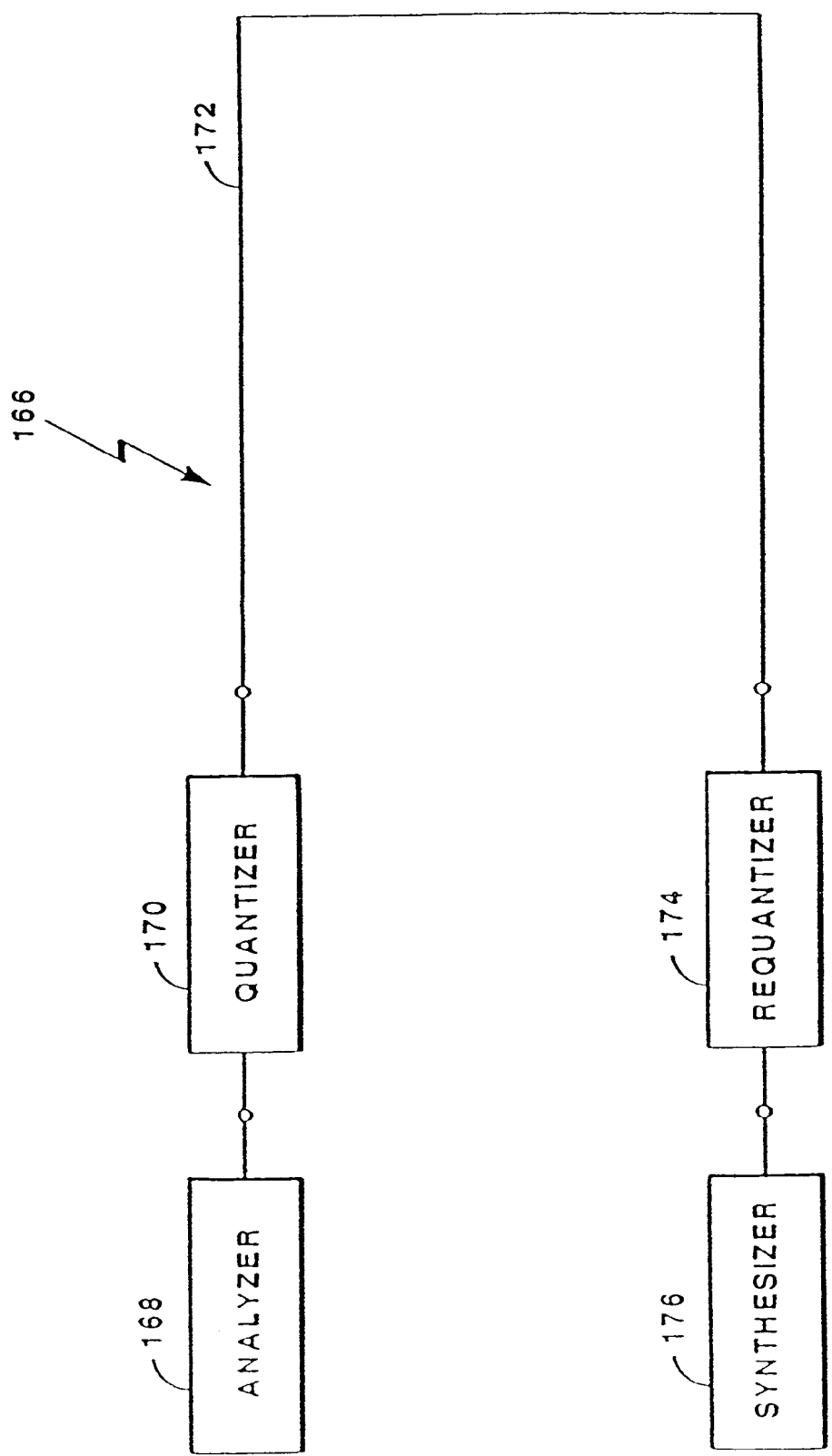
FIG. 9 is a block diagram of a signal compression system for transmitting and receiving signals over a digital link.

A method for timing synchronization between the sending portion and receiving portion of the system 110, is now described, however before describing the method it should be noted that although the method may be more clearly explained within the context of the coded modem, the method may also be applied, with minor variations, to other systems including the signal encryption systems described above in conjunction with FIGS. 2–4 above and signal compression systems to be described in conjunction with FIG. 9 below.

At least one of the signals, $W'_k$, is forced to be a sequence having known correlation properties. In a cascade synthesizer, since "word" synchronization is required, the chosen signal $W'_k$ may preferably correspond to the signal having lowest inband sample rate. It should be noted however, that in a direct sequence coded modem all the $W'_k$s are so coded.

There are many examples of suitable code sequences such as JPL, GOLD codes and Walsh codes. For illustration and not by way of limitation, the Walsh codes (also known as Hadamard codes) are described. The kernel for a Walsh code is provided as:

+1 +1
+1 −1

Higher order codes are found by substitution of a level into the kernel as shown

+1 +1 +1 +1
+1 −1 +1 −1
+1 +1 −1 −1
+1 −1 −1 +1 which may be compactly expressed as:

+1 +1 +1 +1=code 1
+1 −1 +1 −1=code 2
+1 +1 −1 −1=code 3
+1 −1 −1 +1=code 4

Many other codes, (such as the GOLD codes) are known that have "good" correlation properties. By correlation is meant multiplication and integration which in a two valued binary case (+1,−1) reduces to just the vector dot product of the sequences. A dot product between two identical codes provides a predetermined output (i.e. (Code 1) DOT (Code 1)=4 ) However, a dot product between 2 unlike codes would provide an output of zero (i.e. (code 1) DOT (codes 2, 3, 4,)=0) Similarly, this relationship also holds true for each of the other 3 codes. Thus, these are orthogonal codes.

Non-orthogonal codes having a large auto-correlation and a small cross-correlation may also be suitable, and some of such codes are known to be particularly good for fast acquisition of synchronization in a sliding correlator. An example of a sliding correlator may be made with code 3. If word sync is unknown (assume for this discussion that bit sync is known) then one of four possibilities may occur in the receiver's correlator: they are +1 +1 −1 −1 assumed timing of the receiver's word clock
+1 −1 −1 +1 received pattern possibility 1
−1 −1 +1 +1 possibility 2
−1 +1 +1 −1 possibility 3
+1 +1 −1 −1 possibility 4

Correlation, that is the dot product of the receiver's code with each of the 4 possible patterns reveals that the correlator will compute a dot product of 0, −4, 0, and +4 for each of the 4 possibilities, respectively. However, only the correct word synchronization (i.e. namely possibility 4) will have large positive (i.e. +4) correlation. By sliding the receiver's assumed clock, bit by bit relative to the incoming signal, and performing the correlation, the receiver may thus find word synchronization, hence the name "sliding correlation". Thus, it should also be noted that the maximum correlation will occur when both the word and bit synchronization are correct.

To accomplish the foregoing method of synchronization, the residual, W', of the lowest frequency stage in the sender's cascade may be arranged to have code 3 define its value (or at least the sign of W' would follow code 3). The preceding discussion illustrates some of the many ways receiver synchronization may be achieved. In some system applications such as encryption, the timing from the receiver may also drive other building blocks, such as a decryptor. In full duplex operation, a clock in the receiver may also be used for transmission from that end such that there is only one master clocking the system.

Assuming that bit and word synchronization have been established in the modem 110, then an incoming data bit may be expressed as corresponding to either +1 or −1. If that data bit multiplies one of the codes, code 2 for example, then the resulting 4 bit sequence is either code 2 or code 2 with the sign of each bit reversed. If that sequence is applied to one of the W' inputs of a cascade or tree synthesizer as a sequence of bits, then the receiver's analyzer will recover that W' and may correlate with code 2 to get either a large positive or a large negative number which will determine the receiver output as a +1 or a −1 respectively. Here for ease of explanation, an example using a single bit has been described. In practical systems of course, such operations would typically be performed on digital words having a plurality of bits.

The application of the coded data bits to the W' inputs of a cascade synthesizer is somewhat complicated by the fact that each stage in the cascade operates at a different sampling rate. Such an operation may be more easily accomplished in a tree synthesizer since input data may be assembled into words and applied all at once at the frequency of the lowest synthesizer stage. For a tree synthesizer, the transmitter's power would also be distributed more evenly across the link bandwidth—a preferred and efficient case. Spreading the transmitter's energy evenly across the link bandwidth is a prescription for possibly achieving operation at the maximum limit of the link.

Several coded modems of the type described in FIG. 6 may operate simultaneously over the same link, within the constraint of total link power. Each modem should use a different orthogonal code. For example, a code 3 modem would not interfere with a code 2 modem. It should be noted that the number of modems that may share a link using the 4 bit Walsh codes described above is more than four since each modem may have a different and unique combination of codes on each of its independent residual inputs, provided certain groups of modems don't operate at exactly the same time. It should also be noted that these multiple modems may simply be provided as different orthogonally coded data bits.

A two wire full duplex modem may be provided by using a companion set of almost orthogonal codes. The Walsh codes identified as code 1 through code 4 above, and their bit-wise complement, are only one half of the 16 possible combinations of 4-bits. As shown below the remaining combinations also form another set of mutually orthogonal vectors, below numbered as c5 through c8. This second set of 4 vectors is not orthogonal to the first set. It can be described as "nearly orthogonal" because the dot product of any member of set 1 with any member of set 2 is always half the length of the vector; and of course the dot product of any member with another of the same set is always 0 except that the product with itself is always equal to the length.

| MASTER (set 1) | SLAVE (set 2) |
| --- | --- |
| c1 = + + + + | C5 = + − − − = $\hat{c1}$ |
| c2 = + − + − | c6 = + + − + = $\hat{c2}$ |
| c3 = + + − − | c7 = + − + + = $\hat{c3}$ |
| c4 = + − − + | c8 = + + + − = $\hat{c4}$ |

The master group is orthogonal and the slave group is also orthogonal, however the cross group correlation is −2 for the dual and +2 for any other cross term. One end of a transmission link may transmit signals using the master set of codes and a second end of the transmission link may transmit using the slave set of codes. It should be noted that the same benefits may be realized by using the matrix transformation approach to provide the synthesizer 114 and analyzer 120.

Thus to provide full duplex operation, the modems at each end of a link can be assigned to use set 1 or set 2 as Master and Slave. If the Master used only codes 1 and 2 and the Slave used codes 3 and 4 then all echo signals would be totally cancelled by the orthogonality but the data throughout for each modem would be half of the rate possible by using the arrangement described above based on the two sets of codes.

Furthermore, coded modems of the type described in conjunction with FIG. 6 may coexist with other signals on the link since the correlator will provide little or no output signal. Longer code sequences may improve this effect at the expense of lower data throughput. Certain codes, other than the Walsh codes, may be better able to exploit this characteristic for multiple access applications.

Figure 7:
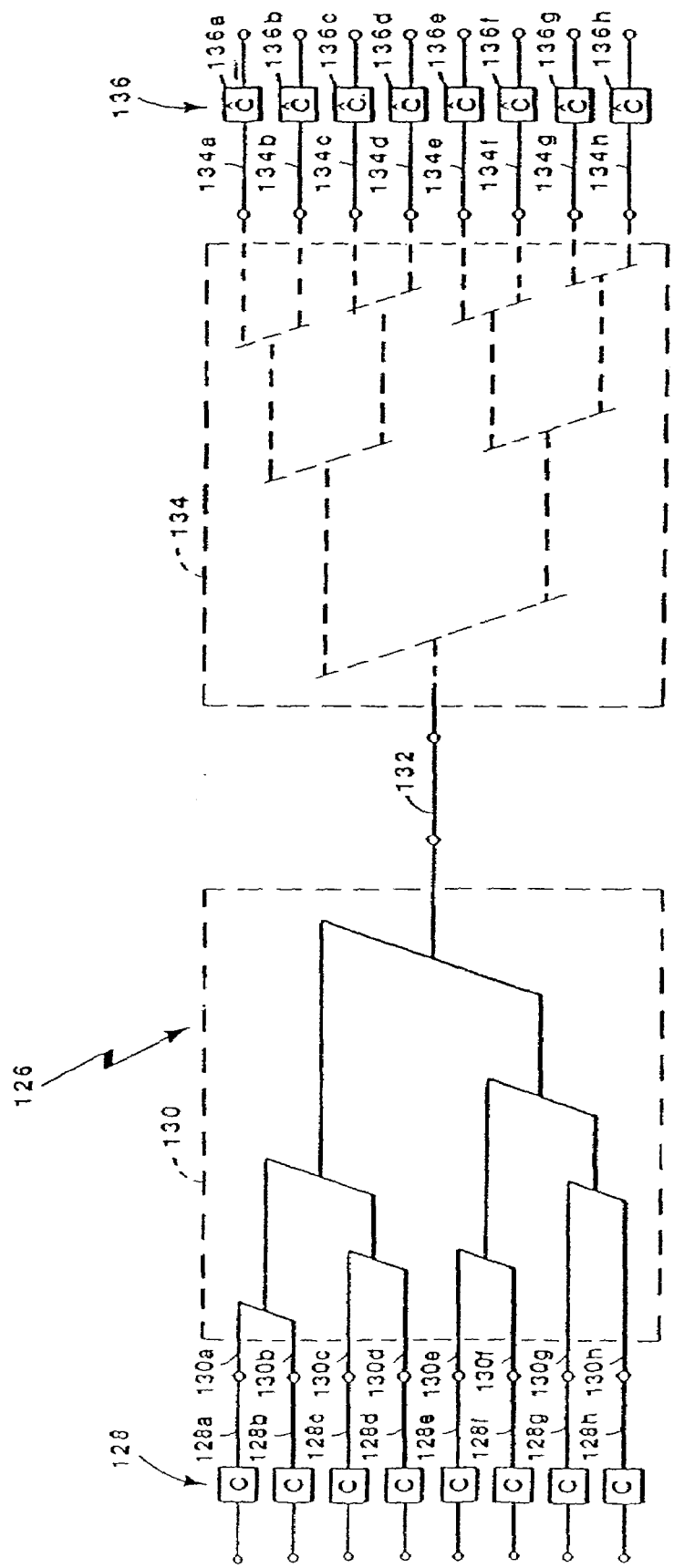
FIG. 7 is a block diagram of a coded tree modem.

For a modem 126 as shown in FIG. 7, it is possible to use direct sequence code division multiplexing to excite the sub-stages of the synthesizer cascade. As described above, such a procedure would permit clock recovery based on a sliding correlation. It also allows data multiplying the code sequence (as is done in direct sequence spread spectrum) to be recovered at a receive end using correlation techniques.

One application for such a coded modem would be to take advantage of the processing gain of the correlation receiver to recover a low power signal from the modem buried in a large "jamming" signal. Practical examples of jamming signals include voice (hence data may be sent as 'noise' under the voice), television (hence high definition digital information may be sent in the same channel as standard video to maintain compatibility), code division multiplexing and two wire full duplex FDX. The disclosed technique is an improvement on those methods because the modem utilizes the bandwidth more efficiently than heretofore.

Furthermore, the modem described herein, being a modulator (the synthesizer) and a demodulator (the analyzer) may also take the form of a baseband RF or soundwave transmitter modulator and receiver (or above baseband except for the limits of ADC's). Such a receiver may have application in receiving digital High Definition TV (HDTV).

Coded modems of the type described above in conjunction with FIG. 6 and to be described in conjunction with FIG. 7 below may use Walsh codes to pre-encode data which is applied to the w' and v' inputs. Because the synthesizer itself uses Walsh codes, if implemented by the rotation matrix, it should be pointed out that these two coding schemes are independent. For example, the code length for the data inputs need not be the same as the number of synthesizer outputs. The number of outputs is equal to the length of the synthesizer rotation operators. Thus by applying the matrix method to the coded modem, the coded modem becomes in essence a twice coded modem.

Referring now to FIG. 7, a coded tree modem 126 includes a plurality of coder circuits 128a–128h coupled to corresponding ones of a plurality of input ports 130a–130h of a tree-type synthesizer 130 operating in accordance with the principles described above in conjunction with FIG. 1. The synthesizer output port is coupled through a link 132 to an input port of a tree-type analyzer 134 also operating in accordance with the principles described above in conjunction with FIG. 1. A plurality of decoder circuits 136a–136h are coupled to the analyzer output ports 134a–134h to decode the coded signals fed thereto.

In principal the coded tree modem 126 operates such that the coder circuit performs a coding operation of multiplying a data word times an orthogonal code C. The decoder performs a correlation operation here denoted C^. It should be noted that the final V' input sequence on line 130h may be set to zero if it is assumed to be below a frequency corresponding to the lower frequency limit of the passband frequency of the link 132.

Figure 8:
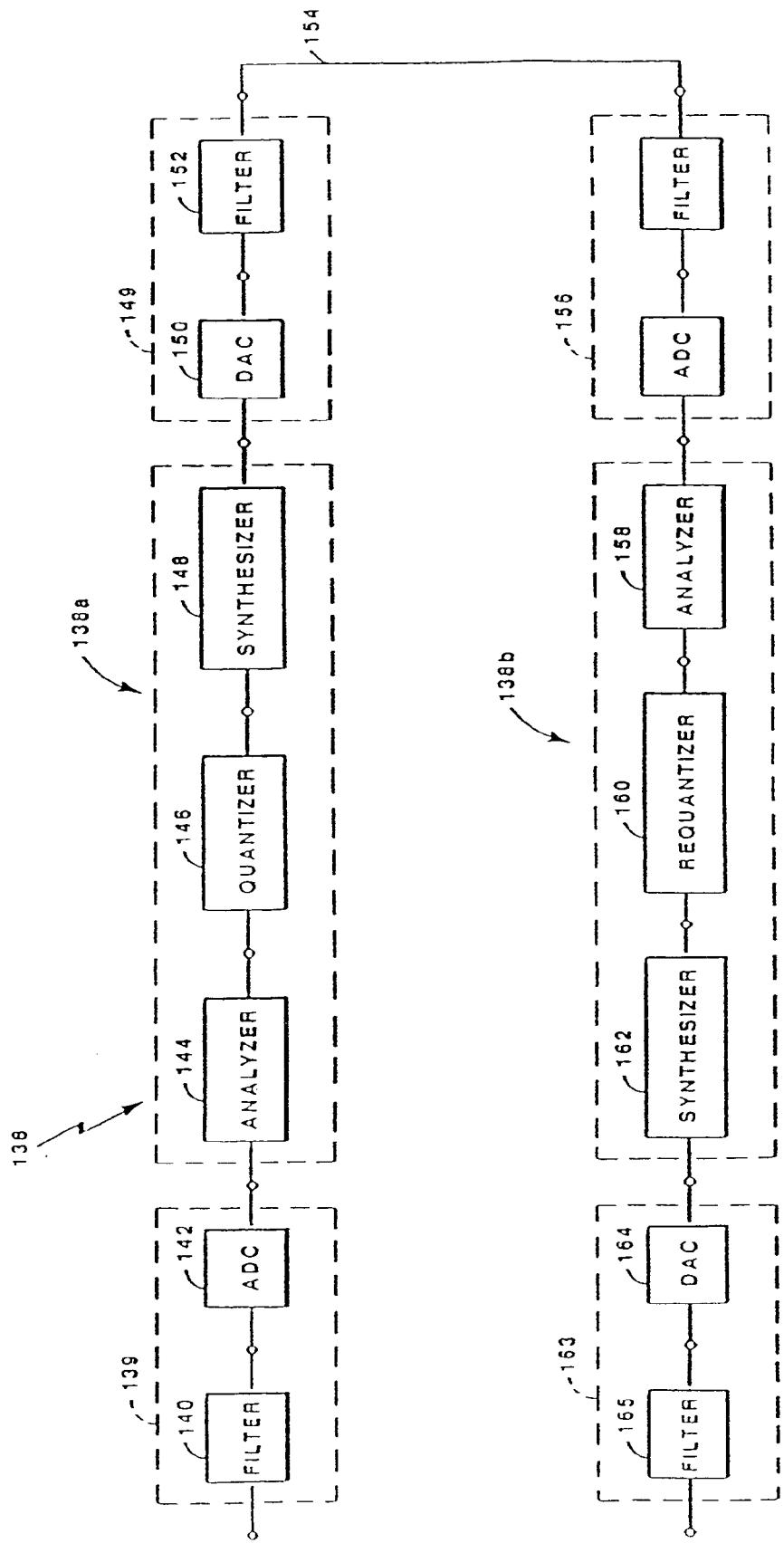
FIG. 8 is a block diagram of a system for receiving and transmitting compressed signals.

Referring now to FIG. 8, a system for transmitting and receiving compressed signals 138 includes a transmit portion 138a having an input signal conditioning circuit 139, which here includes an input filter 140 and an ADC 142. The filter 140 and ADC 142 are selected to operate in accordance with the techniques described above to provide an appropriate stream of digital words to the first input port of an analyzer 144. A quantizer 146 is coupled between the analyzer 144 and a synthesizer 148. In operation, the signal compressor quantizer 146 maps the residual W'(N) into a new number taking fewer bits to describe. Thus it is a compression operation.

An output signal conditioning circuit 149 includes a DAC 150 coupled to the output port of the synthesizer 148. The DAC 150 receives a digital stream of words and provides an analog output signal representative of the bit stream fed thereto. A filter 152 having appropriately selected filter characteristics couples the analog signal from the DAC 150 to a first end of a transmission line 154.

A second end of the transmission line 154 is coupled to a receive portion 138b of the system 138. The receive portion b includes an input signal conditioning circuit 156, which appropriately filters and converts the analog signal fed thereto to provide an appropriate stream of digital words to the first input port of an analyzer 158. An inverse quantizer 160 (i.e. requantizer) is coupled between the analyzer 158 and a synthesizer 162.

In operation, the requantizer 160 remaps to the original bit definition. The compression operation, of course, lowers the information content of the signal and that lost information may not be recovered. In many applications, however, the lost information is redundant or the human observer is insensitive to the level of detail contained in the information discarded by the quantizer and thus little or no signal degradation may be detected.

An output signal conditioning circuit 163 receives a reconstructed digital stream of words from the synthesizer 162 and provides an appropriately filtered analog output signal representative of the bit stream fed thereto to an the output port of the receive portion 138b of the system.

In speech compression processes, bandwidth may generally be reduced by limiting the number of bits devoted to the residual W'.

However, an alternative which may provide an increased reduction in bandwidth may be accomplished by first replacing a signal $V_5$ on the cascade channel corresponding to the lowest frequency band with a zero, thus only transmitting the signal $W'_5$. Next, a signal $W'_3$ associated with a cascade channel corresponding to the frequency band in the 700 Hz to 1400 Hz frequency range may be eliminated or coarsely quantized. Furthermore, Huffman coding or codebook vector quantization methods may be used on $W'_2$.

By adjusting the sample rate, the frequency band from 700 Hz to 1400 Hz may be isolated. Since human voice especially in the English language, generally does not include a formant in this range, the cascade channel corresponding to the frequency band from 700 Hz to 1400 Hz may be eliminated (i.e. by setting the residual $W'_3$ equal to zero) with little loss in intelligibility. Similarly, as shown in the Table below, $W'_1$ and $W'_5$ may also be set to zero.

TABLE

| SIGNAL | SAMPLE RATE (smpls/sec) | FILTER RANGE (Hz) |
|---|---|---|
| $W'_1$ | 5600 | $W'_1$ = 0 >>2800 to 3200 |
| $W'_2$ | 2800 | $W'_2$ >>1400 to 2800 |
| $W'_3$ | 1400 | $W'_3$ = 0 >>700 to 1400 |
| $W'_4$ | 700 | $W'_4$ >>350 to 700 |
| $W'_5$ | 350 | $W'_5$ = 0 >>175 to 350 |
| $V_5$ | 175 | $V_5$ = 0 |

Thus, in this example $W'_1$ through $W'_5$ and $V_5$ are sampled at the rates shown in the Table and it is possible to transmit only the signals corresponding to the residuals $W'_2$ and $W'_4$, for example, which have sample rates of 700 and 2800 baud perhaps less than 2 bits for each residual $W'_2$, $W'_4$ after Huffman coding. Further reduction may also be possible since $W'_2$ may simply be considered as another sampled signal and thus may also be subdivided by multi-resolution analysis to further reduce the bandwidth.

By way of example, if 1.5 bits are used for the 700 sample/second residual and $W'_2$ is decomposed into 1400 samples/second, 700 samples/second, 350 samples/second, 175 samples/second, and 65 samples/second at 1.5 bits each then the total number of bits per second (bps) corresponds to 5085 bps to which should be added overhead bits for frame synchronization. This method is considerably less computationally complex than methods such as Linear Prediction Coding 10 (LPC10) and dynamic Excitation LPC and refinements thereto as are known to those or ordinary skill in the art of voice compression.

Although not here shown, the receiver may be provided having the same form with received signal applied to $V_0$ and the clear output taken from $V'_0$.

In view of the above, those of ordinary skill in the art will now recognize that combinations of the system described above may be created to form, for example, an encrypted data compression system for use on analog links. This may be particularly useful, for example, in those applications such as transmission and reception of high definition television signals in which the amount of digital data to be transmitted exceeds the Shannon Law limit of the link. Thus, in such applications the data may first be compressed by any algorithmic means until the sample rate is consistent with the Nyquist sampling theorem limit of the link and the data may then be applied to one of the modem systems described hereinabove in conjunction with FIGS. 5–7 for example.

Referring now to FIG. 9, a digital compression circuit 166 includes an analyzer 168 coupled to a quantizer 170. A digital signal is fed to the analyzer input. The analyzer 168 decomposes the signal and the quantizer 170 performs a compression operation as described above in conjunction with FIG. 8. The quantizer 170 subsequently feeds a compressed digital signal to a first end of a digital link 172. A second end of the digital link 172 is coupled to an input port of a requantizer 174. The requantizer 174 receives the signal fed thereto performs an inverse quantization process and subsequently feeds a requantized signal to a synthesizer 176. For a digital scheme it is only necessary to perform a logical operation, such as an exclusive or operation, between the W signal and a random number RN.

Figure 10:
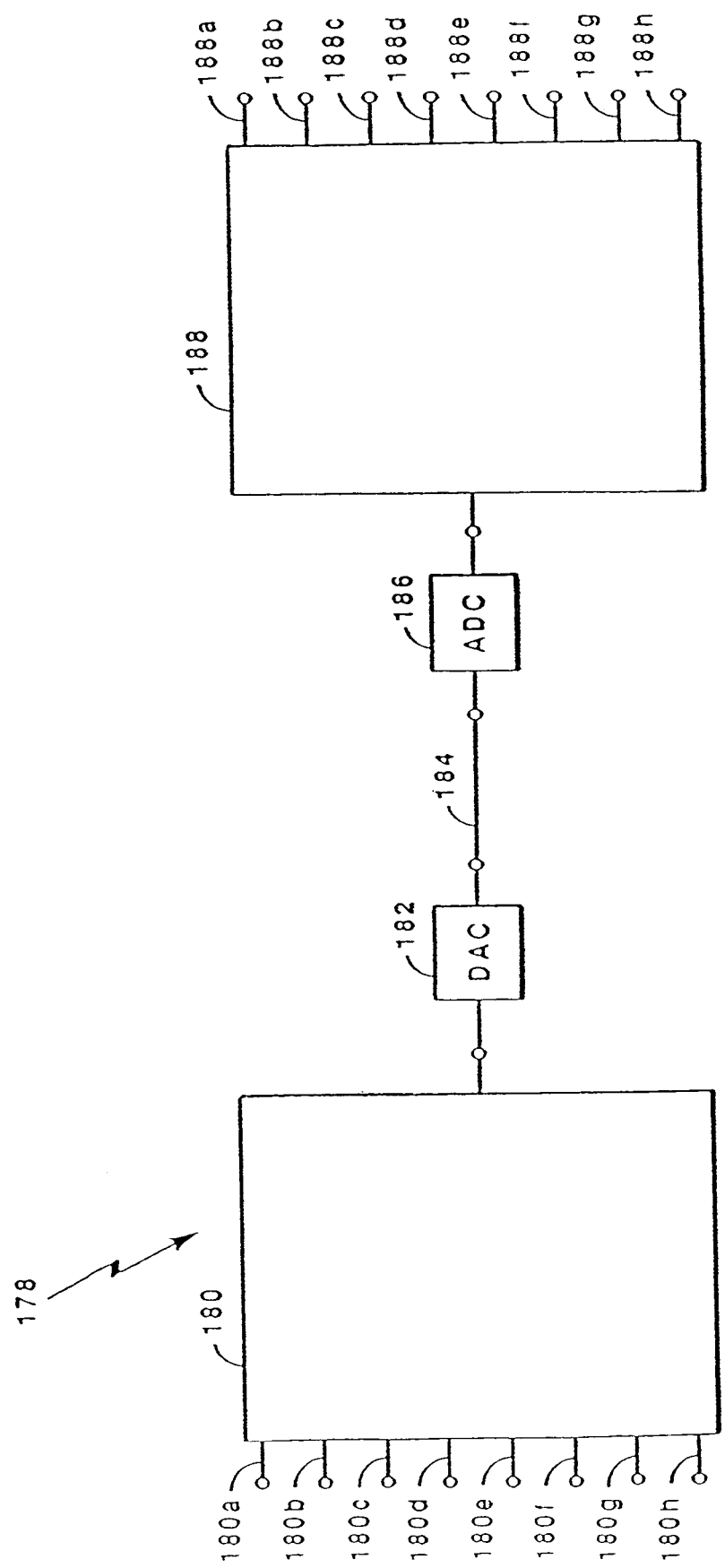
FIG. 10 is a block diagram of a modem.

Referring now to FIG. 10, a telephone modem 178 includes a synthesizer 180, capable of operation over the frequency band from 400 Hz to 3200 Hz. The synthesizer 180 feeds a signal to a DAC 182 having a sampling rate typically of about 6400 samples/second which converts the bit stream fed thereto to an analog signal. The analog signal is subsequently fed over an analog transmission link 184 to an ADC 186 also having a sampling rate typically of about 6400 samples/second. The ADC 186 converts the analog signal fed thereto to a digital bit stream. The digital bit stream is subsequently fed to an analyzer 188.

The synthesizer 180 may be provided in accordance with the matrix transformation methods described above in conjunction with FIG. 1. It should be noted, however, that the synthesizer 180 may alternatively be provided as a three level tree synthesizer in accordance with Equations 3 and 4 also described above in conjunction with FIG. 1.

In the matrix approach, the synthesizer 180 operates on the data frames fed thereto with a rotation matrix. Here, an 8 dimensional rotation matrix would be applied to the data frames. Similarly, the analyzer 188 would perform an inverse rotation operation by applying an 8 dimensional matrix corresponding to the inverse matrix of the matrix used by the synthesizer 180.

As mentioned above, the basic sampling rate of the DAC 182 and ADC 186 is 6400 samples/sec. The digital input and output operate at a frame rate of ⅛ or 800 frames per second. Each frame may be composed, for example, of 35 bits divided into 7 words of 5 bits (or more) each and applied to channels 180a–180h. The throughput is 28,000 bps (35 bits times 800 frames/second). The usable rate is determined by the S/N ratio on the link 184 and forward error correction (FEC). Thus, the modem 178 may operate at a data transfer rate at or below 28 kbps.

Furthermore, the modem 178 may utilize FEC and as is common practice, the frequency range from 300 Hz to 400 Hz may be used for frequency shift keying (FSK) diagnostic signaling.

Channel 180h corresponds to signaling below 400 hz and cannot be used for data in this example. However, if a signal having a constant amplitude and alternating sign is applied to channel 180h then a 400 hz tone may be filtered from the line signal by a receiver (not shown) to aid in synchronization. In addition, the known pre-selected amplitude may be recovered from channel 188h as data and used as a gain calibration signal in the receiver and, may further be used to define block boundaries for FEC block coding schemes.

Accurate timing synchronization and gain calibration are important to the operation of the modem 178. As described above in conjunction with FIGS. 6 and 7, coded modems may obtain synchronization information without any tones appearing in the transmitted signal. Thus, clandestine communications by encrypting coded modems may be transmitted as low level, seemingly uncorrelated, noise in the same narrow bandwidth as simultaneous, non secret, communications.

The data in the channels 180a–180g may be scrambled, as is common practice in modems, so that the output appears more noise-like when transmitting the commonly encountered input string of 35 zeros or ones. Without scrambling, an input string of zeros will produce a modulated but strongly correlated output without a DC component.

The data received by the analyzer 188 will be a multiple of the actual data. The multiplication factor will correspond to the dimension of the rotation matrix which in turn corresponds to the number of channels in the synthesizer 180. The receiver should quantize, that is, round the received channel output to the nearest multiple then divide by the multiple to reduce the effects of noise on the link 184.

A modem using baseband modulation techniques, in which no carrier signal exists, may also be provided by using the matrix rotation approach or by the equations provided in conjunction with FIGS. 1–1D above. In either of these approaches, the modem must demodulate and process groups of two or more samples to recover the data. In a conventional baseband system, single samples are processed to recover the data.

Thus, in a baseband system a modem operating according to the matrix method described above should modulate and demodulate groups of samples. For example, if the matrix vectors are of length eight, then eight samples should be processed together as an independent group by the demodulator. That is, the demodulator multiplies the group of samples by the inverse matrix used in the modulator. It should be noted that the grouping of samples is part of the modulation and distinct, for example, from a block data coding method for error correction, and both techniques may be simultaneously used in a single modem.

In summary, a baseband modem technique uses an invertible mapping. According to the foregoing disclosure, and the issued parent patent, U.S. Pat. No. 5,367,516, the modulation and demodulation mappings may be characterized as a filter bank synthesizer and analyzer, or a rotation and counter-rotation matrix, or a baseband mathematical transformation and its inverse transformation. These characterizations may be distinct, or in some instances they may describe the same operations in different technology. The terminology and unification of the three characterizations appear in publications cited in conjunction with the filing of the instant patent application. For example, the analyzer and synthesizer in FIG. 1 may be a two-channel Quadrature Mirror Filter (QMF) pair as described by Vaidyanathan and Hoang. The matrices may be commuting polyphase filter matrices of Viterli and Gall or similarly of Vaidyanathan and his students. Inverse polyphase matrices describe the QMF of FIG. 1 as well as filter banks with more sub-bands, such as the polyphase banks that are functionally equivalent to the structure in FIGS. 1C and 1D. Finally, the structure of FIG. 1A, which is based on a two-channel QMF, is mathematically equivalent to the Discrete Wavelet Transform (DWT) as described by Rioul and Vitterli. Scaling functions and residual functions are terms used to describe Wavelet transformations.

The invertible mapping for the modem is similar to a geometric rotation, although the mapping may or may not have a pure delay due to the filter. A sequence of samples X(0) through X(3) may be considered as the coordinates of a vector X in a 4-dimensional space. A linear transformation may be made from the coordinate system of X to another coordinate system in the same 4-dimensional space. Thus the vector X may be transformed to a vector Y by a "rotation" matrix, or by a filter bank, or by a mathematical transformation such as the DWT.

The components of vector X can be equated to a frame of successive samples into the transmitter's D/A converter. The components of Y are assigned to those inputs to the filter bank corresponding to the sub-bands that are within the transmission bandwidth. In a modem based on the foregoing disclosure, and the issued parent patent, U.S. Pat. No. 5,367,516, X and Y are two different coordinate representations of the same vector. The modem modulator can be considered as a linear "rotation" operator [M] and the demodulator as an operator [D]. At the transmitter, it follows that X=[M]Y. The vector Y is being sent so the received data [D]X=Y if the modem is correctly conveying the data, a condition met by the requirement that [D][M]=z[I], where [I] is the identity matrix and z represents a pure, frequency independent delay, if any, through the system. If there is additive noise at the receiver then the linear demodulation operator must remove the noise term by a non-linear threshold operation as is common in all modems.

In a general sense that includes both linear and non-linear operators, all modems require that [D][M]=z[I] in order to recover data correctly. However, in the baseband modem of the foregoing, and in the issued parent patent, U.S. Pat. No. 5,367,516, the geometric rotation analogy results because its linear operators commute. That is [D][M]=[M][D], or at least they can very nearly commute over the entire useful bandwidth of the channel. Geometric rotations in 2-dimensions commute and rotations in any dimension can be made to commute by making a series of 2-dimensional rotations that commute with a reversed sequence of counter-rotations, which is the essence of Vaidyanathan et al.'s design procedure for multi-dimensional (multi-band) QMF banks of the cited publications.

As described in the foregoing, and in the issued parent patent, U.S. Pat. No. 5,367,516, any sampled analog signal can be framed as a vector A and can be digitally encrypted without bandwidth expansion and without digital compression since an encryptor at the transmitter can transmit X=[M][e][D]A and the receiving decryptor can compute A=[M][d][D]X, where digital encryption [e] and decryption [d] satisfy [d][e]=[I] and assuming [M] and [D] commute.

Passband modems modulate one or more carriers with one or more separate baseband modem waveforms that represent data. The carrier modulation and subsequent demodulation is most often a linear operation in contemporary modems. Thus, at some carrier frequency, a modem may add a sine and cosine carrier wherein each carrier has been linearly amplitude modulated by baseband data modulators, or filters. The resultant signal may have both phase and/or amplitude variations as in a Quadrature Amplitude Modulation (QAM) modem. The baseband modulation of the foregoing disclosure can be applied in this same manner to make a linear modem for passband.

Non-linear modulations into passband are also possible for data modems and analog signal encryptors. Non-linear modems have seldom been used except in Frequency Shift Keying (FSK) modems, which are very inefficient. However, non-linear modems employing the methods described herein may be more bandwidth efficient than any linear modulation including QAM when operated, for example, in the region of interest for wireless communications, assuming for comparison that there is no Forward Error Correction (FEC) for either the non-linear or linear designs. An exemplary non-linear FM modem is described herein.

An FM DSB signal can be generated by the quadrature carrier method wherein a sine and cosine carrier are amplitude modulated, respectively, by the sine and cosine of the integral of the baseband modem signal. Thus, a cosine function amplitude modulates the cosine carrier, etc., so that the FM signal is indeed a non-linear modulation and distinct from linear passband modulations, which may or may not include baseband integrators. FM, and nonlinear Phase Modulation (PM), can also be generated by a voltage controlled oscillator (VCO) and by other techniques. The viewpoint taken in the foregoing, and in the issued parent patent, U.S. Pat. No. 5,367,516, that data and modulated signals can be different coordinate representations of the same vector, provides insight and specific techniques for the design of non-linear modems using rotations by filter banks or wavelets.

Figure 11:
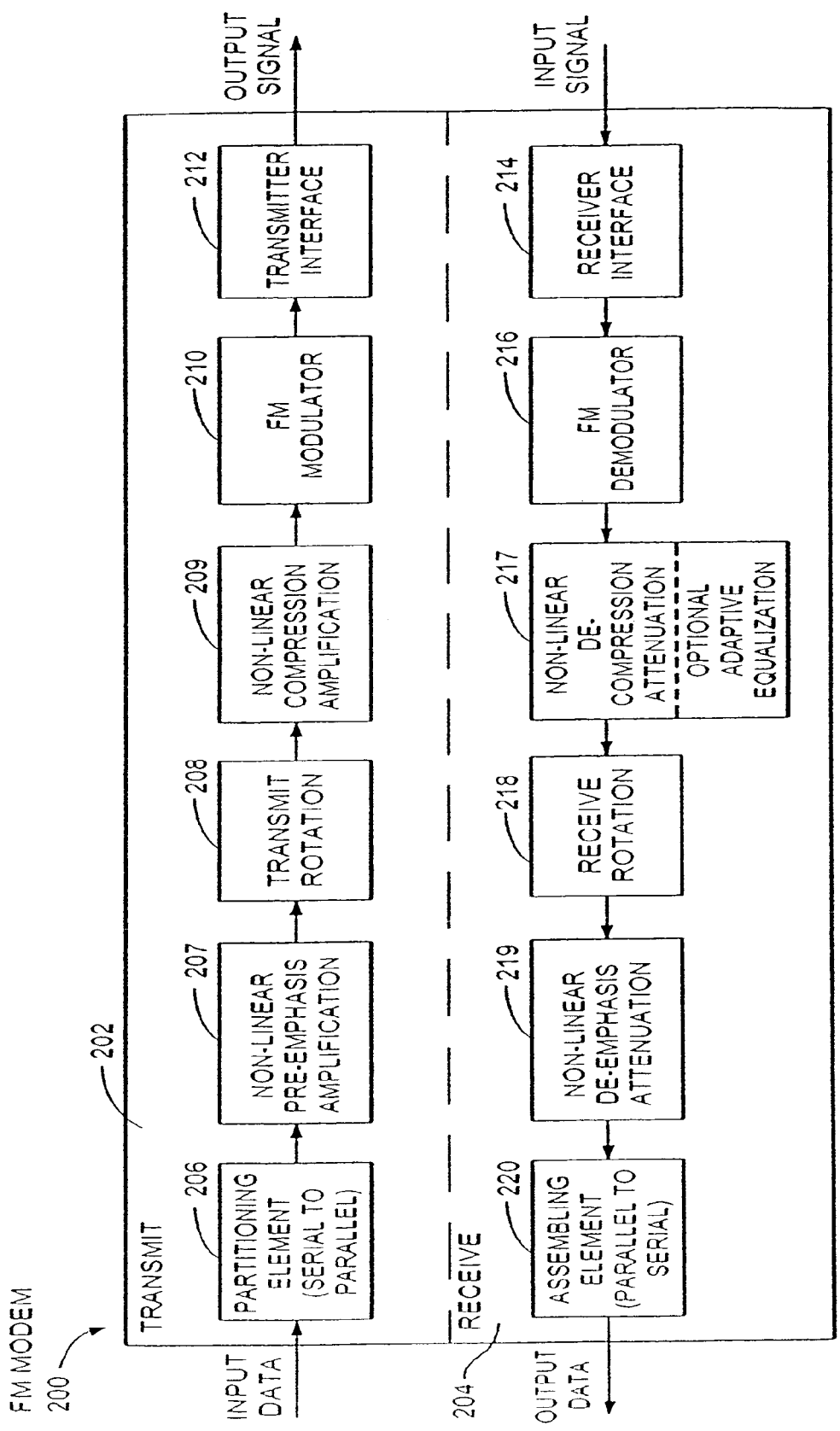
FIG. 11 is a block diagram of an FM modem according to the present invention.

In FIG. 11, an FM modem 200 according to the present invention is illustrated in block diagram form. The modem is comprised of a transmit portion 202 and a receive portion 204. Input data into the transmit portion 202 is first divided into a data vector representation by a partitioning element 206. After non-linear pre-emphasis amplification 207 to provide equivalent average power across the partitioned signal, the data vector is rotated to a signal vector by a transmit rotation operator 208, as disclosed in the foregoing. After non-linear compression 209 to improve modulation gain (discussed subsequently), the signal vector is FM modulated as illustrated in block 210 and provided to a transmitter (not illustrated) by the transmitter interface 212 as an output signal.

Typically, the output signal from the transmit portion 202 of one modem 200 will not be received by the receive portion 204 of the same modem 200. However, it is possible that a transmission path over which the output signal is transmitted and from which the input signal is received includes a memory device for storing the transmitted signal. In such case, it is possible that the same modem will carry out both the transmit and receive functions.

For example, in alternative embodiments of the present invention, the memory device is a magnetic disk or a non-volatile solid-state memory device; modulated digital information to be stored in analog form is later retrieved and demodulated by the same modem. The memory device behaves as a modem transmission link with an exceptionally long link delay, so the bit-error-rate calculations and maximum system transfer rate into or out of the memory can be determined as for any modem system. In particular, the maximum error-free bit rate for recovery of the data is given by Shannon's law, where the signal-to-noise ration depends on the device physics as well as the noise figure of the electronics.

On the receive portion 204 side of the modem 200, an input signal from an FM receiver (not shown) is received at a receiver interface 214, and is forwarded to an FM demodulator 216. The demodulated signal, after non-linear de-compression attenuation 217, is then counter-rotated by a receive rotation operator 218. After complimentary de-emphasis amplification 219, the result is assembled 220 into output data which is ideally the same as the original input data. The de-compression attenuation 217 further comprises an equalizer in an alternative embodiment.

Modems employing convolutional rotation, such as discussed in the foregoing and in the parent patent, U.S. Pat. No. 5,367,516, are optimal in the sense of potential bandwidth efficiency. Encryption using this technique is optimal in the sense that the signal encryptor can transform any band limited analog signal into the digital domain, digitally encrypt it, and then transform the signal back to the analog domain without changing the analog bandwidth. This is in contrast to contemporary digital voice encryptors which rely on digital voice compression algorithms to achieve encryption without bandwidth expansion. Both of these optimal properties are a consequence of the invertible baseband transformation used in the modem disclosed in the foregoing and in the parent patent, U.S. Pat. No. 5,367,516. A preferred embodiment of this invertible baseband transformation is the Quadrature Mirror Filter (QMF) bank, also known as the wavelet filter, which can provide lossless reconstruction of signals over all of the filter's passband. Since the transition region to the stopband at the band edges can be designed to vanish as the filter delay increases, the modulator satisfies Shannon's criterion for no entropy loss in the mathematical limit.

The rotation operator in a first embodiment is a multi-rate wavelet filter-bank. Such filters are designed in a manner similar to sub-band coding schemes. Each analyzer input corresponds to one of M overlapping sub-bands. Ports corresponding to out-of-band regions of the signal spectrum are not used for data, though they are used in a further embodiment to carry baseband synchronizing bits without violating spectral constraints. Regardless of the number of sub-bands, the polyphase rotation matrices commute exactly over the entire band. There is a very small entropy loss at the band edge (but not between sub-bands), as determined by the independently chosen filter length.

For a time-frame corresponding to M samples, the input binary information is partitioned into the integer coordinates of an information vector. The output of the demodulation operator may be viewed as a vector with non-integer coordinates. "Thresholding" is a non-linear operation that removes noise by rounding the received vector coordinates into integers.

It is normal modem practice when transmitting data to encode the data as equally spaced signed odd-integer values. For example, two bits are encoded as one of four levels, $-3$, $-1$, $+1$, $+3$. In this case, thresholding rounds to the nearest odd-integer value. The modem can also be used to transmit any bandlimited analog signal which has been digitally processed by sub-rate filtering, including but not limited to the digital processing step of digital encryption as described in the foregoing and in the parent patent, U.S. Pat. No. 5,367,516. When the modem is being used in this manner, the input samples to the modem modulator may be considered as signed integers spanning even and odd values including zero. Receiver thresholding rounds to those values. To be consistent in notation, integers are assumed to be input to the modulator, the modulator sends integers to the D/A converter and the receiver obtains integers from the A/D. The demodulator outputs integers which are thresholded by appropriately rounding the quotient to integers or odd-integers after dividing by the rotation matrix normalization constant. As described in the foregoing and in the parent patent, U.S. Pat. No. 5,367,516, this rotation gain is computed from the rotation operators (the filter bank polyphase matrix).

The transmitted data, including synchronizing information, is represented by an M-dimensional vector. In one embodiment, the modulo addition of a secret vector to the carrying vector in the data representation results in a highly secure, digitally encrypted, analog signal out of the D/A. Decryption modulo-subtracts the secret vector to recover the carrying vector.

Input information bits can be assigned to the data-representation coordinates of a vector and multiplied at the chip-rate by a pseudo-random sequence unique to each coordinate. The chip-rate result is then input to the modem's inband data ports where it undergoes up-sampling by a factor equal to the dimensionality of the rotation. Modem transformation results in an orthogonal summation of each up-sample-filtered subsequence into overlapping sub-bands of the transmitter's spectrum. Alternatively, a single spreading function is applied to the information, which is then partitioned according to the desired modulation efficiency into the components of a vector, which is then transformed by a wavelet filter bank.

A cooperating receiver filters the input into sub-bands by counter-rotating the signal vector back into data space coordinates. However, the effect of the spreading function must be removed prior to thresholding since the spread signal may have a signal-to-noise ratio of less than 1. "De-spreading" is accomplished by correlating the known spreading functions with the unthresholded data-representation coordinates. Since any vector in the transmitter's data-representation can be re-oriented by an invertible secret transformation (i.e. digitally encrypted by modulo addition of a secret vector) to anywhere in the in-band signal space, a truly secure spread-spectrum can be made. The receiver must decrypt the unthresholded data-representation prior to de-spreading. The receiver counter-rotates, decrypts, de-spreads, and thresholds, in that order. Geometrically, the encrypted vector is always inside a radius R, the radius of the N-dimensional signal space. Modulo-R vector subtraction preserves the large non-integer noise vector added onto the encrypted carrying vector so it may be subsequently correlated (de-spread) and thresholded.

Thus, to reiterate, an N-dimensional space is defined by N samples into a D/A converter. The data coordinate system is chosen so that a subset, n of the N coordinates in the data representation, define all the information points that are in-band. For each of the n coordinates, B bits of data can be sent as one of $2^B$ integer levels with an efficiency of $2*B$ bits/Hz per coordinate (i.e. per sub-band). Since the sub-bands overlap perfectly inside the passband and have typically $-70$ db stop-bands outside, the overall bandwidth efficiency is nominally $2*B$ bits/Hz if the filter transition region is negligible compared to the total bandwidth used for data. The remaining N-n data coordinates are not used for data, but can be used for synchronizing the modem.

A data vector with integer coordinates is therefore rotated to signal coordinates by a first commuting operation. From a geometric standpoint, this operation can be the application of a polyphase matrix for mapping (or rotation) of a data vector into a signal vector representation. Otherwise, the mapping can be implemented via the use of a Finite Impulse Response (FIR) filter bank or an Infinite Impulse Response (IIP) synthesizer. Alternatively, the mapping can be a wavelet transformation, which can be shown in several cases to be mathematically equivalent to the filtering performed by a synthesizer. The first commuting operator in the transmitter is complimented by a second commuting operator in the receiver. Together, these operators result in an identity matrix, enabling the complete recovery of input data. Practical FIR lattice filter implementations of a Perfect Reconstruction (PR) QMF bank can result in an identity matrix multiplied by a scalar gain and a pure delay. The gain factor arises because the matrices are typically in un-normalized integer format, and the pure, frequency independent delay factor represents the delay through the FIR filters. A Near Perfect Reconstruction (NPR) filter bank is also known to those skilled in the art of QMF design. The FIR lattice QMF is designed by employing the commuting properties of geometric rotations. The FIR transversal filter form is then obtained from the lattice form but in doing so, the PR property is compromised and the filter bank provides NPR. However, by using computer aided design techniques, the NPR filter can usually be optimized to provide an NPR filter having better overall properties for stopband attenuation, for example, than the PR lattice filter used to initiate the iterative design. Therefore, the mappings used to construct the baseband modem modulator and demodulator of the foregoing disclosure and the parent patent application, U.S. Pat. No. 5,367,516, commute in the sense that it may be a perfect or a near-perfect reconstruction with a possible delay and gain.

A two-dimensional QMF as in FIG. 1 is described in the literature by polyphase matrices. For example, if the high and low-pass filters are FIR, then each filter transfer function is factorable into its even and odd powers of the z-transform variable. So, if H(z) describes the high-pass filter and L(z) describes the low-pass filter, then the filters of a QMF analyzer are factorable into:

$H(z) = He(z^2) + z^{-1}Ho(z^2)$ $L(z) = Le(z^2) + z^{-1}Lo(z^2)$

This can be written in matrix form as:

$$\begin{bmatrix} H \\ L \end{bmatrix} = \begin{bmatrix} <He| & <Ho| \\ <Le| & <Lo| \end{bmatrix} \begin{bmatrix} 1 \\ z^{-1} \end{bmatrix}$$

The sample rate change in a QMF combines with the delay column matrix on the right to become a serial/parallel conversion for the analyzer, and the 2×2 matrix on the right, whose elements are shown as row vectors, is the polyphase rotation matrix. The sample rate change also converts the powers of $z^2$ to powers of z, but since only the coefficients of powers of z in the row vectors are relevant to calculations, the z variable is often omitted. A similar definition is used for the QMF synthesizer. The up-sampling at the input to the 2-band synthesizer implies that only the odd coefficients contribute to the odd output sample. Thus, the filtering can proceed at half the rate using filters of half the length, which is what the polyphase notation describes. Polyphase matrices for filters with more than two sub-bands are defined in a similar manner in the cited publications associated with the parent patent, U.S. Pat. No. 5,367,516.

The polyphase matrix may be further factored into a form corresponding to an FIR transversal filter that operates on vectors instead of scalars. That is, square matrices $C_j$ having scalar elements each multiply the power j power of z. Thus, the modulation operator [M] is described by:

$M(Z) = C_0 + C_1 Z^{-1} + C_2 Z^{-2} + \ldots + C_L Z^{-L}$

In this form, the modem frames the data bits and converts them to the coordinates of a vector. The vector is input to the vector-filter to perform the rotation. There are L−1 previous data vectors stored in the delay line of the transversal filter. The vector filter maps the current and L−1 previous data vectors to new vectors using the matrices $C_j$ and then finds, by vector addition, the resultant baseband modem output vector. The receiver counter-rotates to recover the data using the vector filter corresponding to [D]. In one embodiment, a hardware ASIC uses a single time-shared nine-tap filter with a ROM bank of coefficients and a bank of shift registers to implement the modem rotations.

The vector-filter arrangement is of course mathematically equivalent to the other forms of a rotation. However, the transversal form suggests that a modem as described in the foregoing discussion and in the parent patent, U.S. Pat. No. 5,367,516, can be equalized for distortions in the transmission link by using the same methods as are applied to transversal equalizers in the known modem art. Significantly, the equalizer filter and the demodulation filter [D] can be one and the same.

Therefore, a further embodiment of the present invention employs adaptive adjustment of the receiver polyphase matrix, also referred to as a de-rotation matrix. If it is determined that some form of frequency dependent distortion is being introduced into the transmission path, the polyphase filter in the receive portion of the present FM modem, or any modem using the methods of as previously discussed and found in the parent patent, U.S. Pat. No. 5,367,516, can be adjusted to compensate for such distortion. Another way of stating this is that some of the de-rotation coefficients in the de-rotation matrix are adjusted to compensate for the frequency-dependent distortion in the transmission path. The adjustment would minimize a computed error function. This is similar to the design procedure for optimizing NPR in the design of the filter bank. In the modem, however, the NPR solution does not accurately reconstruct the information because of amplitude and delay distortions in the modem transmission link. The receiver polyphase filter bank in an FIR implementation is equivalent to FIR filters for each sub-band wherein the filter outputs are decimated and thresholded to recover the data. This is the same form as a fractionally spaced equalizer, which is known to those of ordinary skill in the art of modem equalization. Therefore, the methods in the modem art, such as, but not limited to, the Least Mean Squares (LMS) algorithm, for adaptively adjusting the coefficients of an equalizer in proportion to an error function can be applied to the polyphase matrix coefficients of the demodulator to provide the receiver with an adaptive de-rotation that corrects for link distortions without a separate equalizer filter. Thus, a fractionally sampled FIR filter is provided. The adjustment of the receiver polyphase filter can be done at the initiation of a communication and left at a certain setting, or can be adjusted dynamically by monitoring the RMS spread of noise about the integer or odd-integer threshold values out of the demodulator, as one example.

Additive noise in a transmission link between a transmitter and a receiver will add a noise vector to the transmitted signal so that a counter-rotation performed in the receiver will yield a recovered data vector with non-integer coordinates. In a first simplified embodiment of the present invention, a threshold operator takes the nearest integer coordinate values as the most likely symbol. In a more sophisticated receiver embodiment, thresholding is executed according to a Viterbi algorithm since the rotations are convolutional with M-n extra degrees of freedom. This enables "free" error correction without the use of parity bits.

In each transmitted frame of a modem according to the foregoing disclosure and the parent patent, U.S. Pat. No. 5,367,516, each D/A sample depends on the scaling input and all other residual inputs to the modulator. To avoid aliasing in the conversion to and from analog by D/A and A/D, the highest frequency sub-band is not used to transmit data in a preferred modem design. Since the number of samples to/from the converter equals the total number of sub-bands M, there is redundancy in the transmitted signal. Other sub-bands may optionally be omitted to shape the output spectrum, for example to avoid transmitting DC, further increasing the redundancy to n out M samples. Sync signals transmitted by the technique of alternating the sign of a fixed amplitude into, for example, the highest frequency sub-bands carry no information and do not increase the redundancy. If the receiver has thresholded a sequence of frames prior to the current frame without bit errors, it may use those results to aid in demodulating the current frame. For example, the unthresholded demodulator output may be midway between two allowed odd-integer threshold values. To decide which soft decision value is most probable, the receiver could use the prior data frames along with the two possible current-frame soft decisions to generate in the receiver a modulated signal to correlate with the actual received signal. Then, the receiver may make a final decision about which integer levels were most probably transmitted for the current frame based upon the better correlation. This procedure, which may be implemented through dynamic programming via the Viterbi Algorithm, is possible because of the redundancy inherent in the convolutional output of the modulator of the foregoing disclosure and the parent patent, U.S. Pat. No. 5,367,516. It differs substantially from the soft forward error correction (FEC) method known in the modem art as Trellis Coded Modulation (TCM).

In TCM, as commonly practiced, redundancy is provided by appending one or more suitably calculated parity bits to the data before transmission. The coding gain from the Trellis Coding must make up for the loss in energy per bit due to the transmission of the extra parity. Furthermore, a TCM modem cannot be optimal because of the Shannon capacity sacrificed to send the parity bit. This does not rule out the use of TCM with the current invention. Other methods of forward error correction such as the multi-dimensional coding methods known in the modem art are also applicable to the inherently multi-dimensional signal generated by a coordinate rotation. Thus, a data modem based on rotations that would normally use only odd-integer coordinates for the data vector could instead select the coordinates of successive vectors from a larger set of even and odd integers in a way that decreases the probability of a bit error.

Implicit in both the modem and encryptor definitions given above is the assumption that the data will rotate to an N-band analog signal. The N samples of the D/A are within a precise time frame. Placing a strict simultaneous requirement on the bandwidth must be done with care according to known transformation techniques since sine and cosine-based transformations are complicated by the infinite extent of those waveforms. When the time is constrained exactly, the frequency components extend to infinity and vice versa.

Wavelet theory provides for transformations based on "mother wavelets" which do not have infinite extent in time. Like Fourier analysis, many basis functions are summed together to represent any arbitrary signal. The mother wavelets are stretched and shifted in time to form a set of residual basis functions and a related set of scaling basis functions. Thus, a single mother wavelet generates a transformation just as a prototype sinewave generates the Fourier transformations. There are innumerable "mother" wavelets, each generating a different transformation. The wavelet transformations are entirely real (there are no imaginary components or carriers). This halves the complexity of modulation and equalization. Since only real components are involved, it is thus possible to frequency modulate an input data stream without having to account for an imaginary component.

An exemplary FM modem according to the present disclosure employs an 8-dimensional polyphase filter as the baseband input to an FM modulator. As illustrated in the following table, a non-linear distribution of bits per band is employed.

| BAND $i =$ | BITS $B =$ | LEVELS (L) | PRE-EMPH SCALE FCT $Hi =$ | DE-EMPH GAIN FCT (db) $Gd =$ |
|---|---|---|---|---|
| 0 | 4 | +/−1, 3, 5, 7, 9, 11, 13, 15 | x1 | 18.6 |
| 1 | 3 | +/−2, 6, 10, 14 | x2 | 16.2 |
| 2 | 2 | +/−4, 12 | x4 | 17.9 |
| 3 | 1 | +/−9 | x9 | 22.0 |
| 4 | 1 | +/−9 | x9 | 19.9 |
| 5 | 1 | +/−9 | x9 | 18.1 |
| 6 | 1 | +/−9 | x9 | 16.7 |
| 7 | 0 | not used for data (sync) | | |

Thus, in the presently illustrated embodiment, there are a total of 13 bits per input symbol. One design goal is that each band is to have approximately the same power (here, RMS average=9 db). From the following equations, it is apparent that the noise coming out of the FM receiver depends on the square of the sub-band frequency. The power spectral density, or PSD, is given by Couch, "Digital and Analog Communications Systems", 4th ed., MacMillan, equation 7–125:

$$PSD=[(K/A)^2]/N_0][f^2]$$

where K is the FM detector gain, A is the carrier amplitude and $N_0$ is double-sided noise power spectral density.

According to this frequency versus noise relationship, fewer and fewer bits may be transmitted within each sub-band as the sub-bands move away from DC since the noise increases as the square of the frequency. Therefore, it is possible to send a larger number of bits at the lowest frequencies since there is significantly less noise coming out of the discriminator within the receiver then at the higher sub-bands. In the above example, sub-band 0 has 4 bits, while sub-band 6 has 1 bit; the number of levels in each band are chosen to match the parabolic noise density function, PSD, of an FM discriminator.

It is possible in a first embodiment of the present invention to provide to an FM modulator sub-bands having decreasing average power levels with increasing sub-band frequency. For example, the higher sub-bands can carry fewer bits but all sub-bands use the same level spacing per bit. In a second embodiment of the present invention, the levels representing each bit or bits in the sub-bands are spaced apart or pre-emphasized to provide equivalent average power across all sub-bands. In other words, voltage levels of +/−1, 3, 5, 7, 9, 11, 13 and 15 are employed in sub-band 0 in order to represent the data conveyed by the 4 bits assigned to this sub-band. Voltage levels of +/−9 are used to represent the 0 or 1 state of the lone bit assigned to sub-band 6. The average power for these two sub-bands is thus approximately the same. This technique of spacing the levels apart at higher frequency sub-bands is referred to as a pre-emphasis technique. With a signal pre-emphasized in this manner in its data coordinate representation, it can then be converted to its signal coordinate representation by a polyphase coordinate rotation filter. This sampled analog signal can then be used as an input to an analog FM transmitter. A receiver detects these levels and converts them back to bits. Thus, no explicit pre-emphasis or de-emphasis filters are needed.

In the above example, the levels for each sub-band are given as integers (i.e. +/−1, 3, 5, . . . ). In other words, each sub-band has $2^B$ levels. In a further embodiment of the present application, the number of levels in a given sub-band is not a power of two, but if a total of K bits are transmitted in p sub-bands, then the total number of levels in p sub-bands is $2^K$. A binary mapping algorithm is then employed for determining which of the two to the n levels is represented. Adjusting the bits per sub-band and total number of bits per symbol enables the optimization of bandwidth for carrier to noise ratio. Computer aided design iterations provide these optimized values.

In order to compensate for the pre-emphasis of the higher frequency sub-bands, it is necessary to "de-emphasize" the received signal at the higher frequencies in the receiver. Less data is sent in higher frequency sub-bands, though the data is conveyed at higher levels to provide uniform power out of the transmitter across the sub-bands. Attenuating the high frequency sub-bands results in de-emphasis gain Gd. This de-emphasis results in an overall gain which, for M dimensions, may be approximated by the following formula:

$$Gd = Gs \times M^3/(M-1)$$

where Gs may be one in a carefully designed modem, or may vary slightly for each sub-band in a design having the levels in each sub-band restricted to $2^B$ levels. Clearly, a larger number of sub-bands M increases the gain. Further improvements in gain are possible by forward error correction and by reducing the peak to average power ratio PAR using either companding or controlled vector filtering. The latter is a technique whereby the output peak voltage is pre-calculated at the transmitter and extra bits, carrying no useful information, are sent along with the data. These extra bits are chosen in a manner that reduces the peak-to-average voltage ratio (PAR) out of the baseband modulator.

Designating H(i) as the pre-emphasis amplification in sub-band i:

$$Gs(i) = H(i)^2/(3i^2 + 3i + 1)$$

for sub-bands i=0 to M−1 where the denominator in the preceding expression for Gs is proportional to the integral from sub-band i to sub-band i+1 of the PSD of the noise out of the discriminator. Sub-band i=0 carries k bits of data and no pre-emphasis so H(0)=1. Sub-band 1 carries k−1 bits with H(1)=2, etc. A typical assignment for M=8 results in nearly equal power in each sub-band:

| | i | | | | | | | |
|---|---|---|---|---|---|---|---|---|
| | 0 | 1 | 2 | 3 | 4 | 5 | 6 | 7 |
| bits | 6 | 5 | 4 | 3 | 3 | 3 | 2 | 0 |
| H(i) | 1 | 2 | 4 | 8 | 8 | 8 | 16 | 1 | for a total of B=26 bits per symbol. The various bit level assignments are as illustrated above in the previous example of bits per sub-band.

The total gain G is derived from the de-emphasis gain Gd, as given above, the normal FM transmitter gain Gm (also known as the modulation gain), which is due to the FM index, as given below, and the noise-reduction gain Gr. The total gain G is given by:

$$G = Gm \times Gd' \times Gr$$

where G' equals the minimum de-emphasis gain Gd from the de-emphasis gain formula given above. The textbook modulation gain factor Gm is also given by:

$$Gm = 6(m+1)(m^2)/(PAR)^2$$

where PAR is the peak-to-RMS voltage ratio into the frequency modulator and m is the modulation index.

The FM index is the ratio of the peak carrier frequency deviation to the peak frequency of the baseband signal. As shown in the foregoing formulas, as the peak-to-average ratio (PAR) increases, the FM gain, or modulation gain, decreases. To address this problem, a further embodiment of the present invention employs non-linear amplification of the baseband signal prior to insertion into the FM transmitter and complimentary de-amplification at the receiver, collectively referred to as companding. In a preferred embodiment, a logarithmic Mu-law function performs the transmitter amplification digitally by table look-up. The Mu-law is applied to the signal coordinate representation. In an embodiment preferred for large carrier to noise ratios (CNR), the data bits are framed and expressed in data coordinates, then pre-emphasized, then rotated, then Mu-law amplified by look-up before the application to the FM modulator as a sampled sequence. As previously noted, in one embodiment, the de-compression attenuation includes an equalizer.

In another embodiment preferred for small CNR, the data is framed and expressed in data coordinates, rotated to signal coordinates, digitally Mu-law amplified, rotated back to data coordinates, pre-emphasized, rotated to signal coordinates and then applied to the FM modulator. This latter configuration, which permits de-emphasis immediately after the discriminator, may be preferred when operating near FM threshold or when operating in the presence of high-amplitude non-Guassian interference. The Mu-law function preferred for the transmitter non-linear amplification is:

$$Vo = SIGN(Vi) \times Vp \times \text{Log } 2(1 + Mu \times ABS(Vi/Vc))/\text{Log } 2(1 + Mu)$$

where the input Vi has a maximum voltage value Vc and the output Vo has a maximum value Vp. The value of Mu is greater or equal to 1 and may typically be 255. The FM deviation is determined by Vp, whereas Vc reflects the precision of the rotation filter calculations.

A second benefit of logarithmic amplification is a result of the necessary logarithmic de-amplification (i.e. de-compression) at the receiver, which amounts to attenuation. The input signal has been logarithmically amplified and then de-amplified at either ends of a transmission link. However, noise has been introduced within this transmission link. Therefore, this noise is inverse logarithmically attenuated, resulting in the noise reduction gain Gr, as shown in the receiver gain equation above.

The bit error rate of a modem depends upon the energy per bit, or in other words, the energy separating each data representation level. This rate also depends upon the noise energy density. The signal to noise ratio of an FM modem is:

$$S/N = Gm \times Gd' \times Gr \times C/N$$

Thus, unlike linear modems, the efficiency depends continuously on the design value for C/N. The efficiency of a linear modem varies in steps as one adds modulation levels, for example in going from 4-PSK to 8-PSK. For a given design, any increase in C/N improves the bit error rate (BER) for both linear and non-linear modems. However, a small increase in C/N for the FM modem can be used instead to increase the bandwidth efficiency or to reduce the bandwidth at the same efficiency. That is, the increased C/N can be used to reduce the FM modulation index, which lowers the bandwidth by Carson's rule, which specifies the bandwidth W of FM or non-linear PM, given by:

$$W = 2(M+1)w$$

where w is the baseband bandwidth. Thus, a non-linear modem system could reduce the adjacent channel interference (ACI) by using the excess of C/N over the design C/N value while maintaining a constant BER and efficiency, or the modem can increase the efficiency at the same BER and ACI.

The signal to noise ratio of a modem is Eb/N0 times the bandwidth efficiency of the modem (given in bits per second per hertz), or:

$$S/N = (Eb/N0) \times (\text{eff})$$

where Eb/N0 reflects the energy per bit versus noise energy density.

Figure 12:
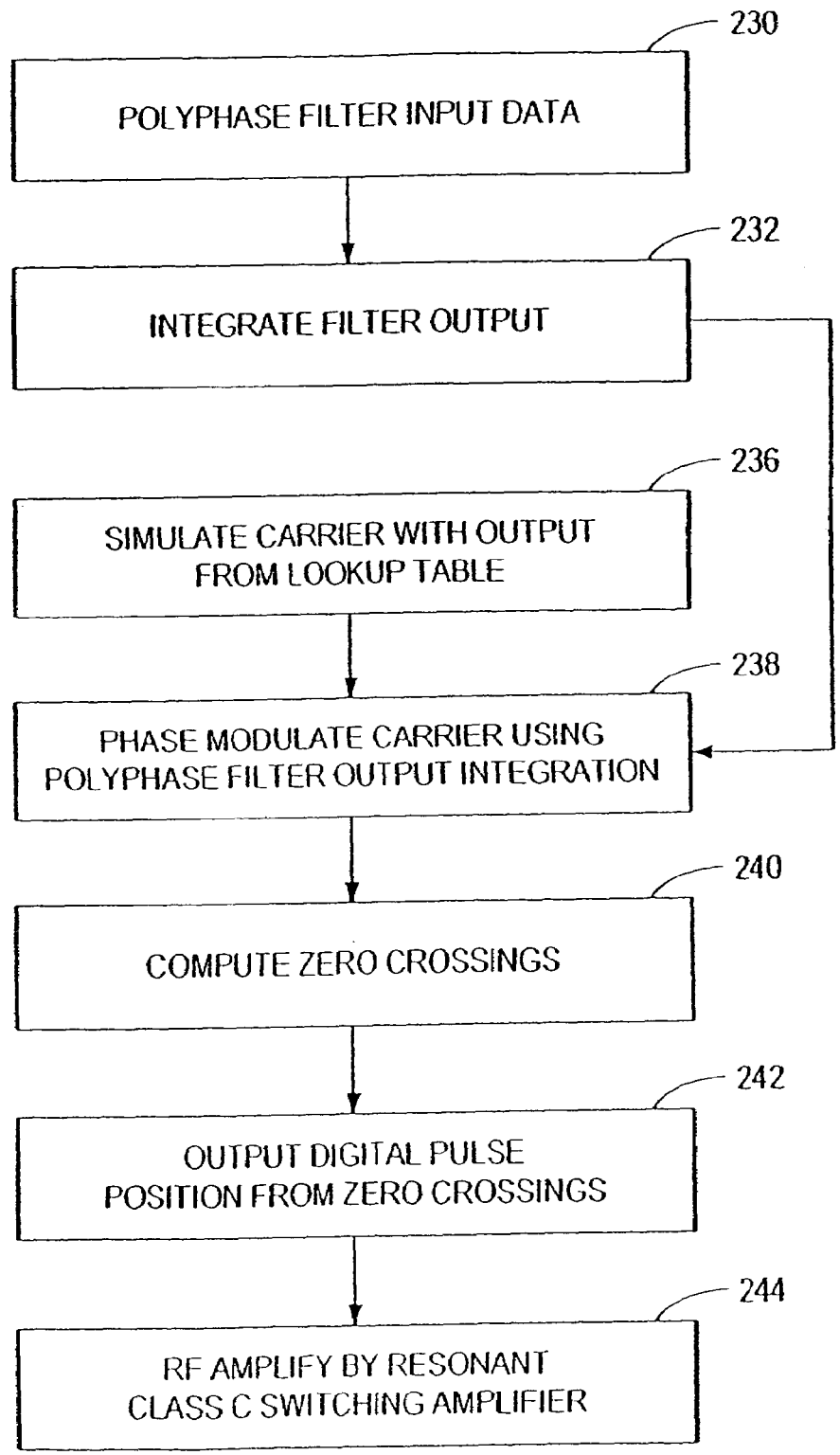
FIG. 12 is a flow diagram of a method for transmitting data using a double-side band variant of the FM modem of FIG. 11.

The foregoing application of FM transmission techniques to data transmission derives benefit from the fact that amplitude distortion is irrelevant for FM since information is retrieved by the receiver from the frequency by, for example, tracking zero-crossings. In FIG. 12, the transmission of data via FM double side-band is illustrated in flow diagram form. In step 230, the data to be transmitted is polyphase filtered as previously discussed. Also as previously discussed, FIR filtration involves the summation of a given number of previous polyphase filtrations. This will be discussed with respect to FIG. 14.

It is commonly recognized that frequency modulation can be achieved either by: 1) directly adjusting the frequency of a carrier; or 2) adjusting the phase of a carrier with a signal which is the integral of the information to be transmitted. The use of phase adjustment to achieve frequency modulation is preferred in one embodiment of the present invention since chips are available which enable phase modulation in an entirely digital fashion, thus maximizing the reproducibility of the input signal. Phase adjustment FM is illustrated in FIG. 12 for FM double side-band and FIG. 13 for FM single-side band.

In FIG. 12, the polyphase filtered input is integrated at step 232. A lookup table is employed to digitally simulate a sinusoidal carrier signal in step 236. This carrier signal is then phase modulated using the result of the polyphase filtration integration (step 238). The zero crossings of this signal contain the coded information; by counting zero crossings (digitally—step 240), the desired information is provided to an RF switching amplifier (steps 242 and 244). In a first embodiment of the present invention, the switching amplifier is a Class C amplifier. In a second embodiment, a VCO is employed for generating FM at passband. In a third embodiment, FM is generated using the in-phase and quadrature technique.

FM double side-band provides significant advantages over prior art modems. It provides immunity to noise associated with amplitude modulated signals. Distortion due to non-linear amplification is avoided. The RF amplifier employed need not be as precise (and expensive) since amplitude modulation need not be accurately reproduced. It also provides a certain degree of circuit simplicity, since carrier recovery is not necessary at the receiver.

Figure 13:
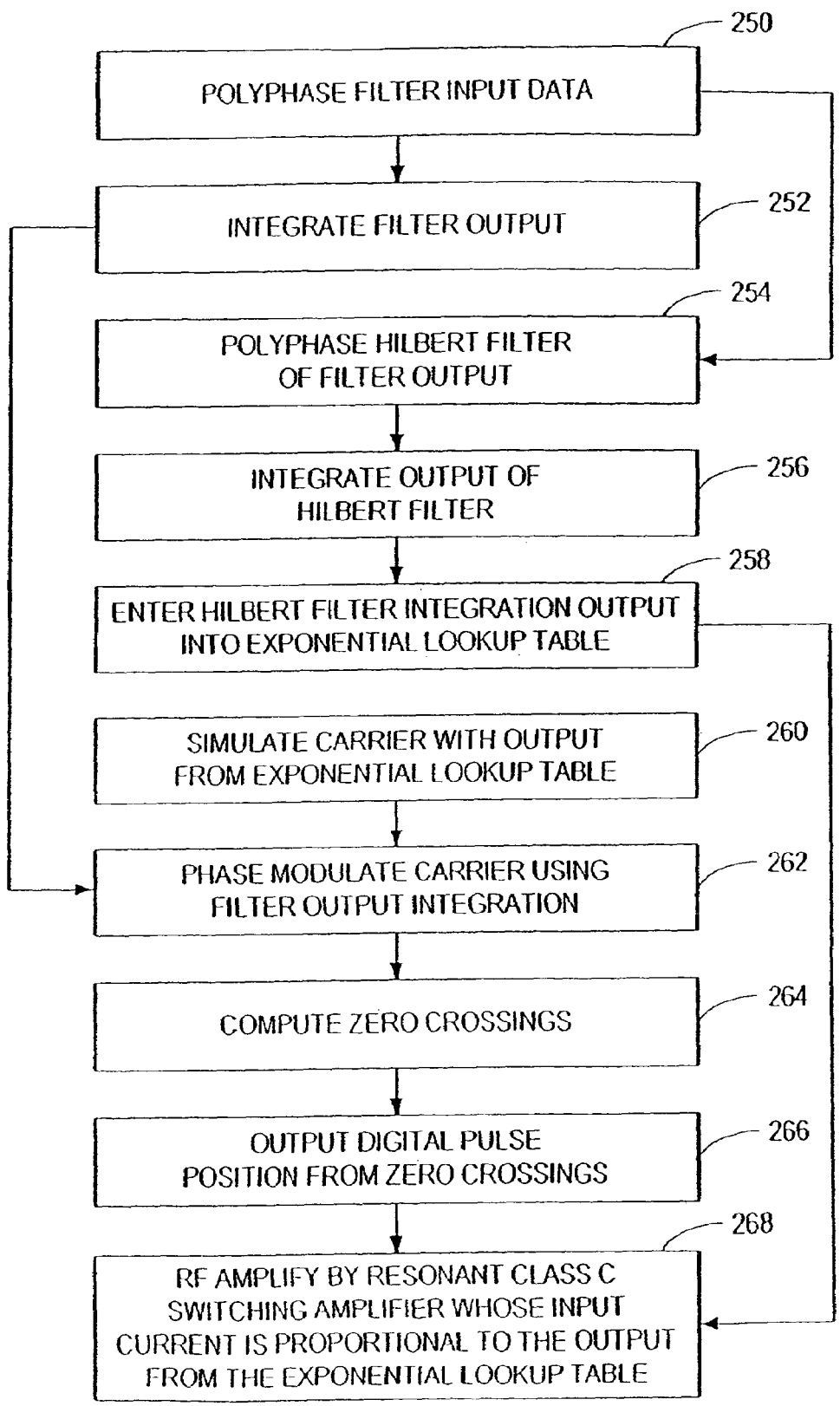
FIG. 13 is a flow diagram of a method for transmitting data using a single-side band variant of the FM modem of FIG. 11.

However, FM double side-band provides half the bandwidth efficiency as compared to FM single side-band. Therefore, another embodiment of the present invention employs FM single side-band. The flow diagram of FIG. 13 illustrates FM single side-band for the present invention. In step 250, the input data is polyphase filtered using, for instance, an FIR filter or wavelet transformation as previously discussed. This step is further developed in FIG. 14, discussed below. The polyphase filter output is then integrated, and this result is stored (step 252).

A Hilbert Transform processes the input signal, effectively phase shifting the input by 90 degrees (step 254). The output of the Hilbert filtration is likewise integrated (step 256). The Hilbert filter integration is then entered into an exponential lookup table (step 258).

A sinusoidal carrier signal is digitally simulated as in step 260 via the use of a lookup table. This carrier is then phase modulated using the integrated polyphase filter output (step 262).

As with the FM double side-band scenario, the zero crossings of the phase modulated carrier are computed (step 264), and a digital pulse train corresponding to the zero crossings is produced (step 266). Finally, in the single side-band case, a switching amplifier whose input current is proportional to the output from the exponential look-up table output amplifies the digital zero crossing pulse train (step 268).

In either the FM double or single side-band cases, the first steps in the transmission procedure, polyphase filtering the input data, is achieved as follows. With reference to FIG. 14, the input data is first partitioned into a block having B bits, wherein the B bits are further separated into M coordinates of a vector (step 270). In the illustrated flow diagram, B=13 and M=8, though other values for these variables are employable. Since the de-emphasis gain factor varies according to ($M^3/(M-1)$), an increase in M permits a decrease in carrier to noise ratio. The optimal numbers are determined empirically, and necessarily implicate the determination of pre-emphasis across the sub-bands, as previously discussed in relation to the de-emphasis gain factor.

A stack is employed in step 272 is order to retain this and L previous vectors. As indicated in the figure, a first embodiment uses L=9 vectors. These L vectors are multiplied by an M×M dimensional scalar matrix to effectuate the initial polyphase filtering (step 274). As illustrated, the scalar matrix is 8×8. Subsequently, in step 276, the matrix multiplication occurs on the (L−1) previously stored vectors in the stack using different 8×8 matrices for each iteration, and the result is accumulated and output (step 278). As noted in step 280, the previous steps shown in FIG. 14 are then repeated at the symbol rate (R/B) in order to transmit R bits/second.

In all of the foregoing illustrations, it is understood that alternative procedures for FM modulating input data according to the present polyphase technique are feasible. However, the illustrated procedure maximizes the proportion of data manipulations which are digital.

With reference to FIG. 15, a procedure for receiving FM transmitted data is illustrated. In step 284, the received signal is low-noise amplified and passed through an image filter to eliminate images introduced by mixing the received signal with a local oscillator. Next, in step 286, the filtered receive signal is down-converted to an intermediate frequency and inband filtered. The zero crossings of the IF are counted in step 288; it is unnecessary to recover a carrier signal or to determine the phase of a carrier using FM modulation.

The DC filtration of step 290 is useful in applications of the present invention which are subject to substantial doppler shift. For modems used for low earth orbiting satellites, where the doppler shift follows known orbital parameters, filtering is used in one example in order to eliminate the effects of such DC or low frequency distortion. Another approach to addressing such low frequency distortion is to avoid use of the lowest frequency sub-band. The decimation filtering of the same step effects a smoothing of the zero crossing count, the latter necessarily being at a high rate for adequate signal resolution, but which may introduce unwanted noise. In step 292, polyphase filtration involves the application of the commuting operator employed in the first step of the transmission procedure.

Thresholding is used to differentiate between received levels. The transmitted signal was sent at one of multiple, easily distinguished levels. However, noise introduced in the transmission link shifts the received signals to points intermediate the expected levels. It is therefore necessary in step 294 to assign the decimated receive signal to one of multiple signal levels.

Though carrier recovery is not required using FM data transmission, baseband synchronization requires some form of bit sync recovery (step 294). As previously noted, such sync information can be transmitted in sub-bands not employed for data transmission. If doppler shift is expected to be a problem, such as in low earth orbit satellite communications, the lowest frequency sub-band may not be used for data, and may be available for sync transmission.

Similarly, the highest frequency sub-band cannot typically be used. A filter perfect enough to avoid aliasing in the equivalent A to D and D to A conversion operations does not exist. By transmitting a known bit pattern at the 3 db point between the second to highest sub-band and the highest sub-band, the sync information is within the bandwidth of the transmitted signal, but is not taking up usable data bandwidth. Such sync information can be inserted by sampling a DC signal at a sync bit rate. High and low pass filtering result in a sinewave output at the sample rate, each square wave being at the high or low end of the respective sub-band. Thus, this sync signal, akin to a pilot tone, is orthogonal to all of the data signals.

The specific steps involved in the application of the operator of step 292 is illustrated in FIG. 16. Specifically, the sampled input is partitioned into a vector having the same number M of dimensions as that employed in the transmission procedure (step 300). In the illustrated example, M=8. The result is pushed onto a stack of L vectors (step 302), wherein the present example employs L=9. The first vector on the stack is multiplied in step 304 by the same 8×8 scalar matrix as employed in the transmission sequence. This is repeated for L−1 previously vectors on the stack, the results being accumulated (step 306). This accumulated result provides the coordinates of a resultant vector sum (step 308) which, after the thresholding and recovery of step 294, yields the originally transmitted data. The steps of FIG. 16 are repeated at the symbol rate R/B in order to receive R bits per second (step 310).

The aforementioned steps illustrate that this is, for all practical purposes, an all digital FM modem. The only non-digital parts are a passive tank circuit employed in steps 244 and 268, the receiver front end in steps 284 and 286, and a D to A converter necessary to modulate the input current to the Class C switching amplifier using the output of the exponential lookup table. The transmitter RF power amplifier is in fact a digital switch. The filters could also be implemented so that all multiplications become binary shifts and adds, thus reducing the cost and power dissipation of an ASIC.

The previous description and equations generally assume that only one of M subbands is unused to prevent aliasing in analog converters. In alternative embodiments, a speed advantage may flow from allowing more than one sub-band to be unused.

As previously recognized, the instant technique and general structure can be adapted in a further embodiment for the transmission of polyphase filtered data using AM modulation. Adaptive rotation of the receive rotation matrix, as previously described, can be applied to an AM modulated modem which employs the LMS algorithm. For the LMS method, the rows of the vector filter tap matrices are corrected iteratively by subtracting a vector proportional to the error times the input vector stored in the filter delay line for that tap. The error can be either the difference between the unquantized and quantized output of the modem receiver (i.e. the error margin), or the error can be the difference between the unquantized output and a known training data sequence. These general techniques are like those used in modem equalizers except they are applied to the rotation matrix without a separate equalizer.

As noted above with respect to one embodiment of the presently disclosed modem, parallel streams of input data are vector rotated using multi-rate filter banks prior to transmission over a data link. Under ideal conditions, the data link introduces no distortions, the impulse responses of the filters are matched wavelets and the receiver filter bank behaves as a counter-rotation in a vector space. Ideally, the sampling of each band of the receiver filter bank at the symbol rate effectively computes the auto-correlation of the incident signal. To achieve a wavelet transformation whereby the original data is completely recovered, a cross-correlation of the received signals with all earlier and later over-lapping wavelets stored within the filter from past and future symbols in the same band, as well as in all other bands, must be zero or at least cause negligible "self-interference." In other words, the cross terms must be orthogonal. Yet, data link distortions can upset orthogonality and cause self-interference.

A transmitter may transmit a frequency reference "pilot" tone to the receiver, for instance in a sub-band not used for conveying data. At the receiver, a Phase Locked Loop (PLL) can be employed to synchronize the phase and frequency of the received signal to a receiver correlator such that only a small residual phase error exists in the PLL band. If the link, including the analog conversion filters for the digital-to-analog and analog-to-digital converters in the transmitter and receiver, respectively, does not have linear response there will be changes in phase (i.e., dispersion) from band to band.

To address such offsets, cross-correlations for any set of wavelengths may be calculated by a filtering process. The multi-rate filter banks of the transmitter and receiver in one embodiment, as described above, have filter coefficients that are wavelet functions, W(I,J). If there are M sub-bands in the filter then I ranges from 1 to M and J is the time of the current symbol at the transmitter; j is the time of that symbol when it arrives at the receiver. For digital processing, the times are measured in samples, so both I and J are integers, and i is a specific sub-band to be processed in the receiver.

The modem sends symbols spaced in time by T for each of M samples so that symbols are sent at . . . , J−3T, J−2T, J−T, J, J+T, J+2T, etc. The symbol sent at J arrives at time j in the receiver. Thus, a specific symbol arrives at j+nT for processing in the receiver. The wavelets have limited time duration and span only N symbols so the "n subscript" can be limited to a small range of −(N−1) to +(N−1) to cover all the wavelets that overlap in time with the received symbol at time j.

The sub-bands are well defined in frequency so that any sub-band, i, has only a few overlapping neighbors. Thus, one need only consider bands i+m, where m is in the range −2,−1,0,+1,+2 if, for example, there is no overlap in frequency beyond the two nearest neighbor sub-bands on either side. That is, for magnitude m>2 this filter is in its stop-band. Of course, i+m is always in the range of 1 to M, M being the total number of sub-bands in the filter.

The transmitter encodes the bits in data symbols D(I,J) and sends an amplitude weighted wavelet for each sub-band. The symbols are transmitted as Signal=sum $\{D(I,J)W(I,J)\}$ over all $I$, all $J$.

The sum of these terms for all active sub-bands arrives at the receiver at time j, where j=(J+delay in the link). Considering all except m sub-bands are insignificant for receiving band i Signal for receiver band $i$ at time $j$=sum $\{D(i+m,j+nT)W(i+m,j+nT)\}$.

Thus, there is a sequence of wavelets overlapping in time and overlapping in frequency when the sum is taken over all allowed m and n.

The receiver adjusts its timing and if necessary, the phase of the wavelet of the receiver filter so that the receiver filter evaluates the inner product with W(i,j) every symbol period, T, to obtain Recovered symbol=$D(i,j)<W(i,j),W(i,j)>$+(cross terms) for $m, n \neq 0$ The notation <, > represents the inner product. A constant $C_{00}$ represents the auto-correlation of the wavelet, i.e. the inner product with itself, so that the data symbol is found by dividing by $C_{00}$. Thus, Normalized Recovered Symbol=$D(i,j)$+(cross terms)/$C_{00}$ where D(i,j) is the transmitted symbol D(I,J) delayed in time. The wavelet functions are exactly, or nearly, orthogonal so that at the receiver the cross term inner products are all zero or very small compared to $C_{00}$, by design. The receiver recovers the symbols accurately from the Normalized Recovered Symbol by threshold detection.

All the relevant wavelet correlations or inner products for band i can be written as:

$<W(i+m,j+nT),W(k,j)>=C_{m,n}$

The subscripts range over plus and minus integers to represent the adjacent bands and adjacent symbol times, as previously defined.

However, dispersive impairments in the link may create a relative phase shift between sub-bands. In that case, the "orthogonality" of the wavelets is lost and cross terms appear as self-interference in the recovered symbols.

Figure 36:
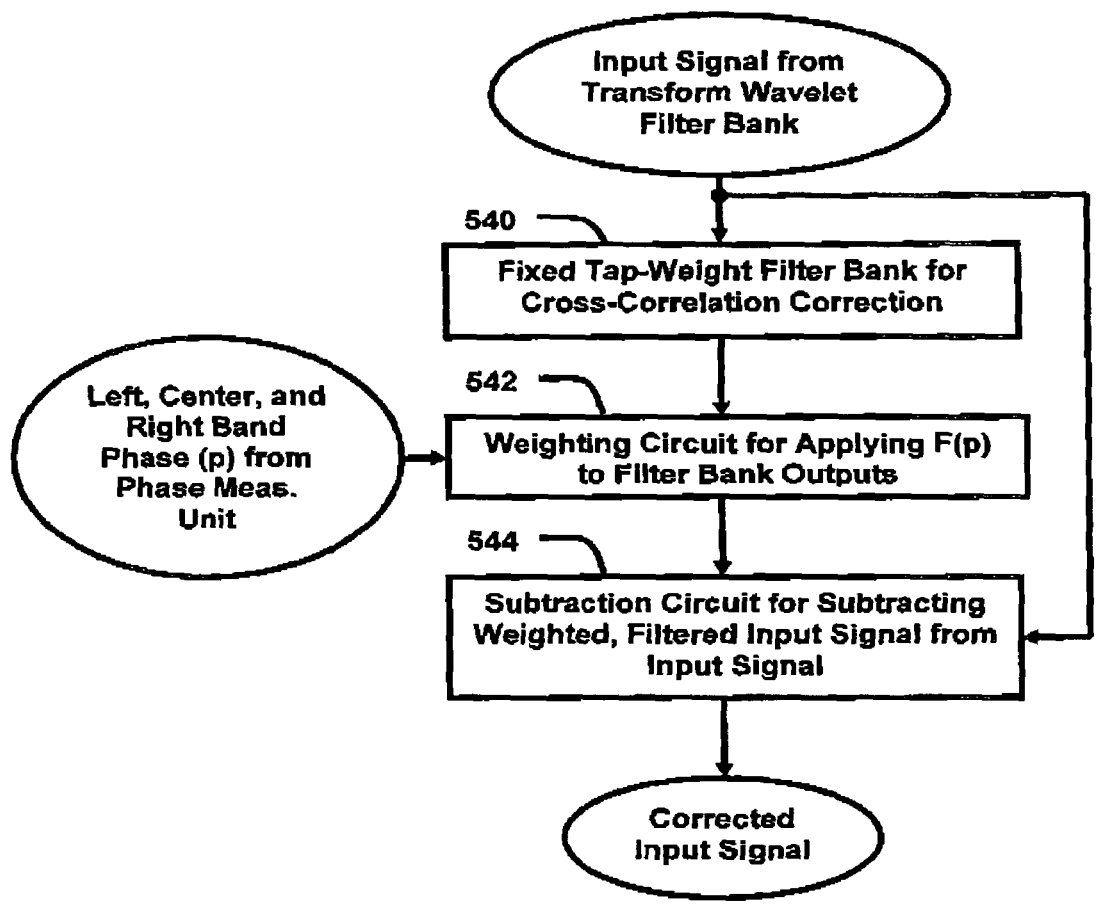
FIG. 36 is a block diagram of a filter circuit as used in the Equalizer of FIG. 18.

In the presently disclosed invention, and as illustrated in FIG. 36, fixed tap-weight filters 540 are used to approximate the cross terms for a particular differential phase shift. The filter outputs are then weighted 542 by a known function F(p) of the measured differential phase shift and the weighted filter outputs are subtracted 544 from the recovered signal to remove the self-interference. In the preferred design, the fixed coefficients of the filter are calculated from the inner products at one value of differential phase shift. An adaptive combiner could be used if the phases could not be measured.

In a preferred embodiment, the particular differential phase shift is 90 degrees and the known function for weighting is sin(p), where p is the measured differential phase angle.

If the phase of band i+m is angle Pm, then the neighboring bands have differential phase p=$P_0$−Pm. The inner products for a differential phase angle, p, are first calculated to be:

$X_{m,n,p}=<W(i+m,j+nT,p),W(i,j)>$

The self interference for band i has several components. For example, the recovered signal in band i is input to filter S. The recovered signal from the band to the left of i, which is band i−1, is inserted into adjacent band filter $A_L$ and the recovered signal from i+1 is inserted in the right filter $A_R$ to the right of the band i. The weight functions F(p) are determined from the p dependence of the X coefficients. The self-interference is then removed by combining with the delayed recovered signal R, as in:

Weighted sum=$R-F_1*S-F_2*A_L-F_2*AR$

The principle of calculating the self interference terms from the inner products of the wavelets can be extended from phase shift impairments to also include time shift impairments by computing for a time shift t:

$Y_{m,n,t}=<W(i+m,j+nT,t),W(i,j)>$

The self interference due to timing offset is then removed by combining filtered signals in the same manner as for phase but with the filter tap weights chosen from the Y values.

Even if a sliding correlation can remove the timing offset between transmitter and receiver for one sub-band, there can be an offset in other bands due to group delay variation (i.e., dispersion).

The foregoing describes a method of providing phase and time equalization for a wavelet modem based on cross-correlations of the wavelet functions. As noted, an adaptive combiner can be used in instances where the phase or time shift cannot be readily measured. Further, since an m band modem has only m phase shifts relative to a correlator reference phase, all m bands may be recovered with only those m parameters. If the m angles can be measured, the combiner need not be adaptive. Yet, distortion within a wide sub-band or a frequency offset may complicate the calculation of cross-correlations, in which case making all taps adaptive may be mandatory.

In yet another application of inner-product cross terms, an isolated wavelet W(i,j) with no overlap in time or frequency with other wavelets may arrive offset in time from the receiver by u samples. The receiver computes the isolated symbol as well as small early and late "satellite" responses at symbol times before and after the true symbol.

Recovered Isolated Symbol=$D(i,j)<W(i,j),W(i,j+u)>$

The receiver can perform a sliding correlation as previously disclosed to find the correct time. However, the precision of the wide correlation peak of the isolated signal for small errors of time, u, may not allow an exact determination of the setting where u=0. If, however, the correlation is also done at, for example, one symbol time before and one symbol time after the true arrival of the peak then there will be two more inner products:

Early=$D(i,j)<W(i,j),W(i,j+u+T)>$

Late=$D(i,j)<W(i,j),W(i,j+u-T)>$

If the wavelets are symmetric or anti-symmetric, which is desirable for a linear phase response in a modem, then the Early and Late signals will be equal in amplitude when the timing is correct, if the phase of the wavelets in the inner products match. That is, when u=0 the satellite responses from the receiver's filter have the same magnitude when synchronized. Furthermore, the magnitude of the Early and Late signals relative to the Isolated signal can be used as a threshold to assure that the sliding correlation is close to u=0 and not near a false peak.

Figure 28:
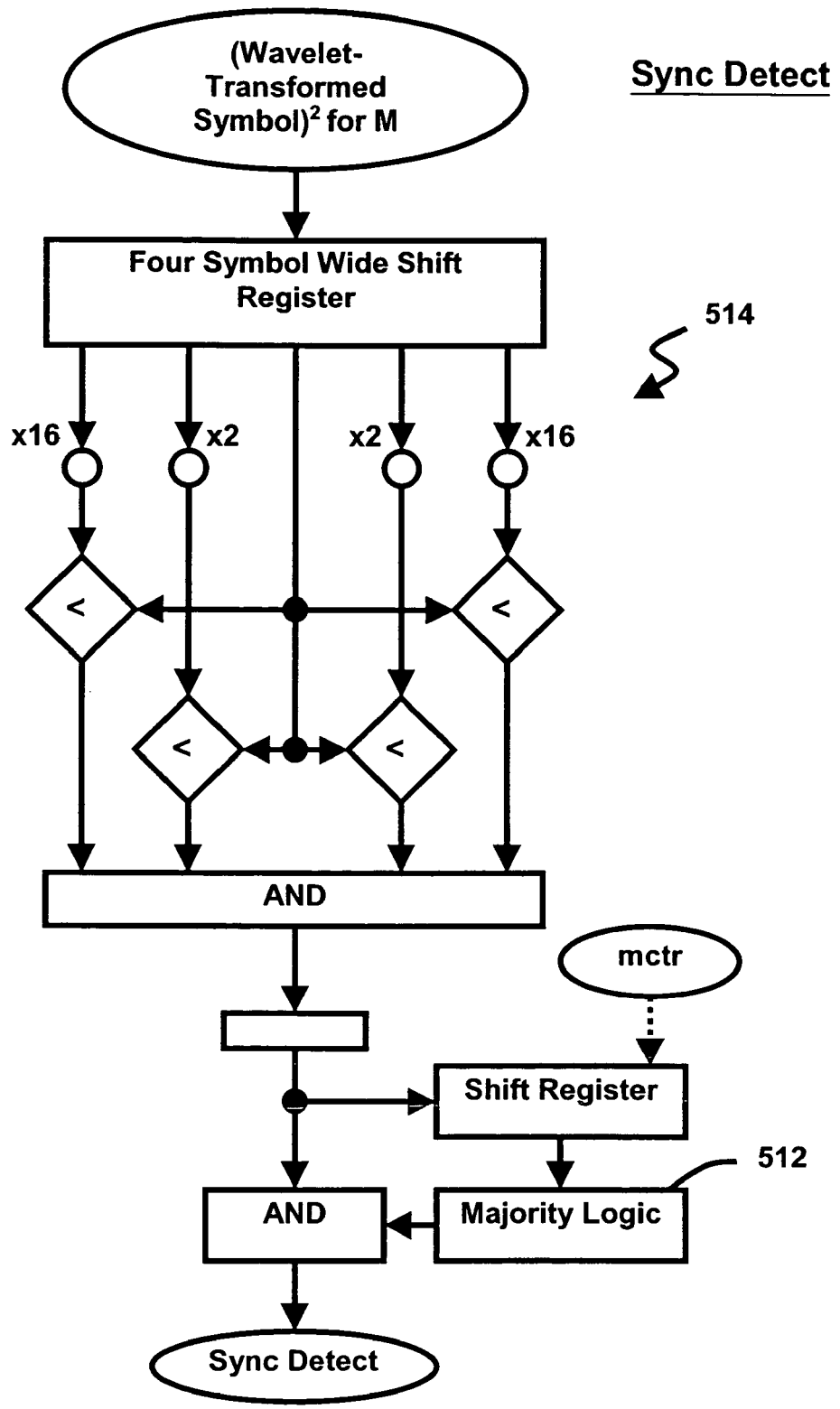
FIG. 28 is a block diagram of a Sync Detect circuit as used in the timing and phase synchronization circuitry of FIG. 25.

For example, with one suitable wavelet function, the peak energy value for an isolated wavelet will be more than twice that of the energy offset by one symbol time and will be more than sixteen times that of the energy offset by two symbol times. A suitable circuit for evaluating sync detect is shown in FIG. 28 and is described subsequently.

In the absence of knowledge of the phase of the received signal relative to the receiver's wavelet, then the receiver may also compute the cross correlations Early' and Late' from wavelet w(i,j), where w(i,j) is W(i,j) phase shifted by 90 degrees. In that case, the energy or specifically the squared energies are:

Early energy squared=(Early*Early)+(Early'*Early')

Late energy squared=(Late*Late)+(Late'*Late')

The Early and Late energy or squared energy will be equal when u=0, that is, when the transmitter and receiver are in time synchronization, so that the incoming isolated wavelet aligns with the receiver's wavelet. Then, subsequent transmitted symbols can be detected by the receiver filter. Furthermore, the ratio of squared energies for the isolated to early or isolated to late signals are calculable from the cross correlations and that ratio can aid in the search for true synchronization.

Small cross-correlations may also be present in the transmitted signal itself. These terms represent a slight non-orthogonality in the wavelets which may be the result of the choice of a "near-perfect" wavelet family and/or may be the result of truncations or similar efficiency-directed efforts in the transmitter hardware which degrade orthogonality. These effects are also addressed in the receiver in a manner similar to that for addressing channel distortions.

For wavelets with high stop-band attenuation, the cross-correlations are computed as previously; namely, $C(I,J)=<b,s|B,S>$ for bands B=b±1 and symbols S=s±N In practice, only the inter-symbol interference (ISI) for the sub-band being equalized and its two nearest neighbors contribute. The three filters have fixed taps and there is nothing requiring feedback. The normally small interference is removed by subtraction just as in the channel-induced case described above.

The wavelet's imperfections are typically only noticed when transmitting extremely large numbers as would be the case for symbols carrying many bits at a correspondingly high bandwidth efficiency. The fixed filters, with tap weights proportional to the above equation, remove at the receiver the self-interference that was generated inside the transmitter.

Figure 17:
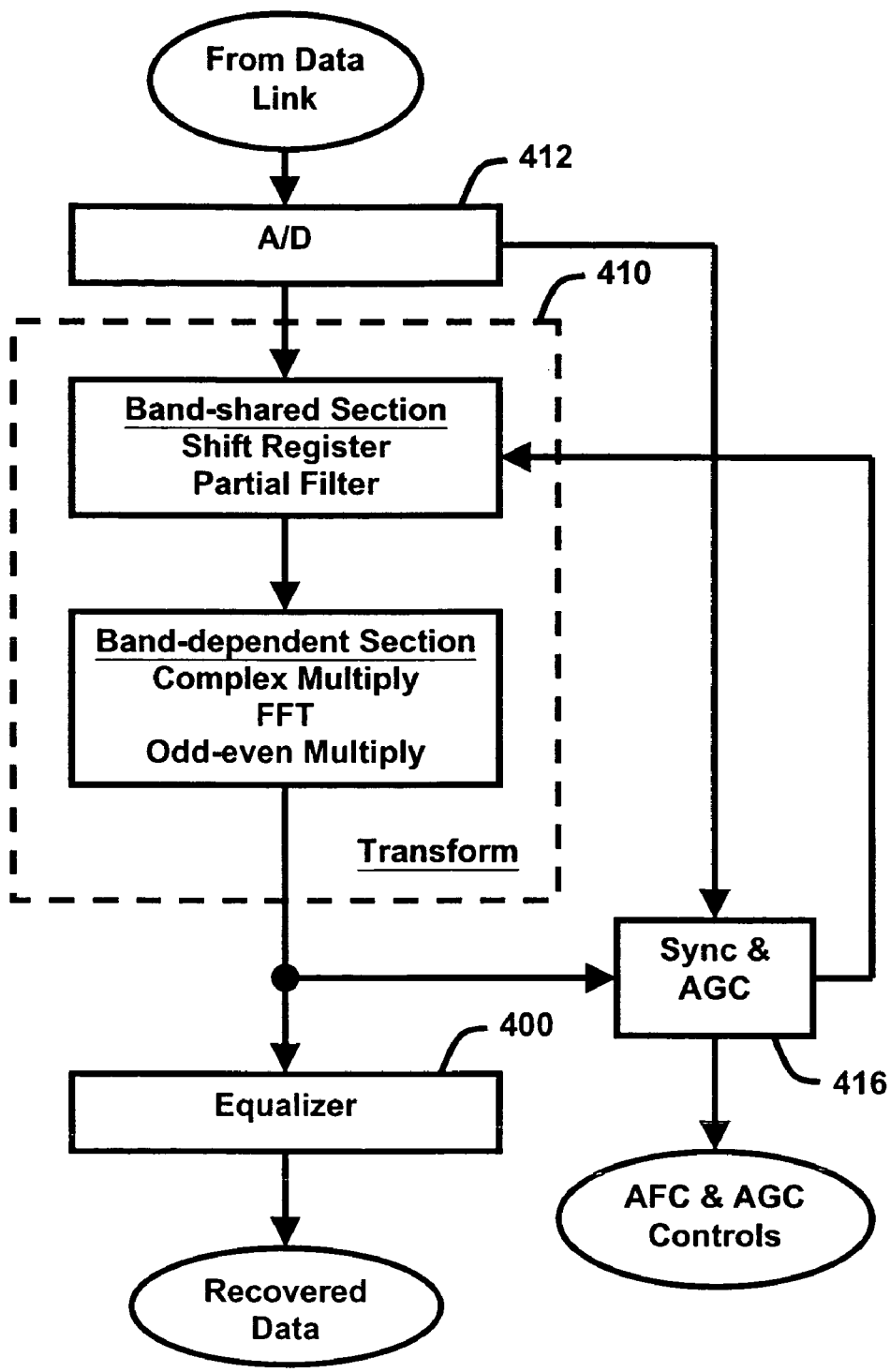
FIG. 17 is a block diagram of a modem receiver according to the presently disclosed invention.

In the following discussions, aspects of the modem receiver which enable equalization according to the foregoing requirements and synchronization to the respective transmitter are discussed. FIG. 17 provides a block diagram of certain receiver circuitry which is invoked in this discussion.

The previously discussed multiband equalizer uses the data in each sub-band from the QMF filter bank to continuously track the phase and amplitude of each sub-band without the use of pilot tones. The modem receiver uses this phase information both for data recovery by the equalizer and as the phase detector input to a phase-locked-loop used for transmitter timing synchronization.

Figure 18:
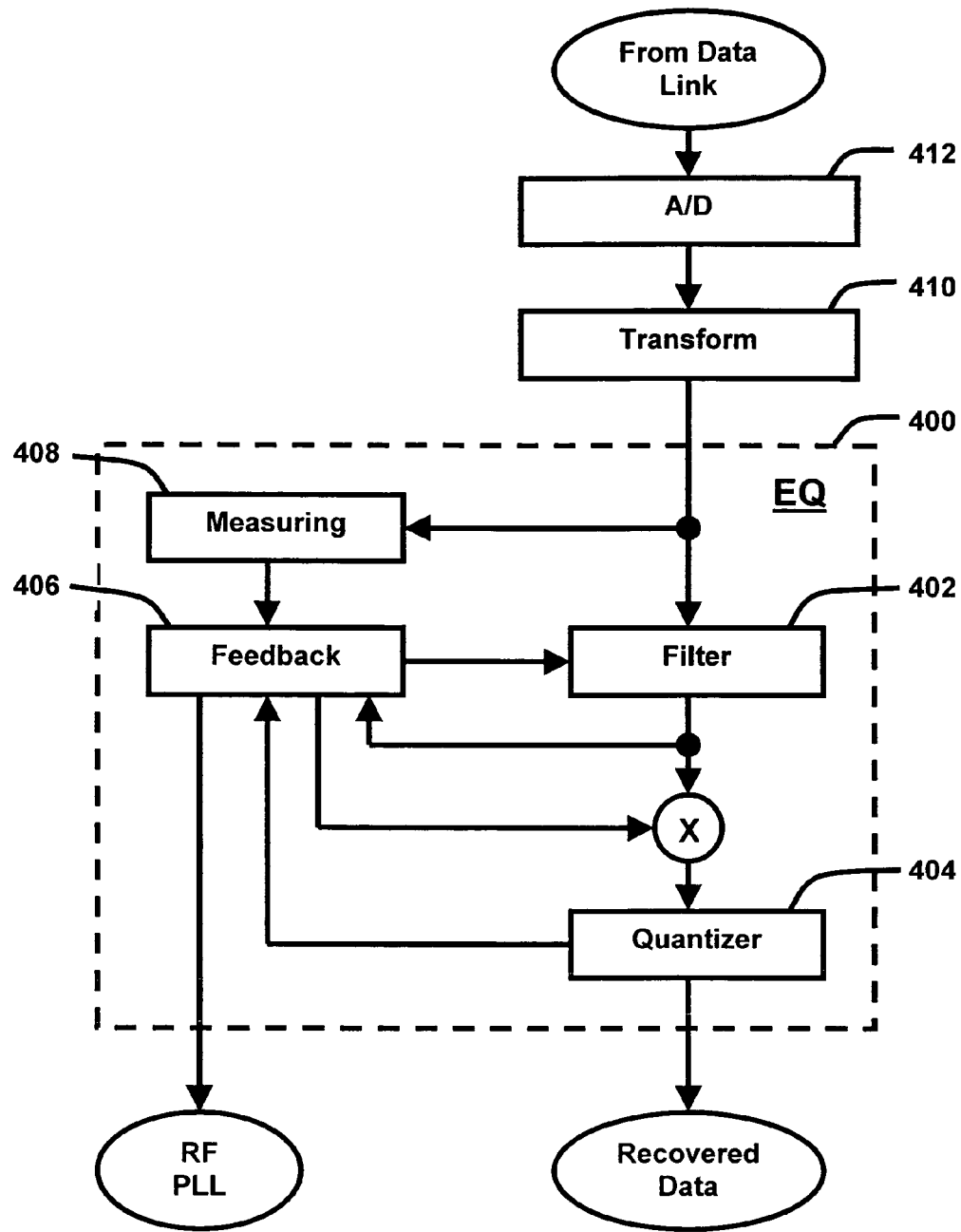
FIG. 18 is an exploded block diagram of the modem receiver of FIG. 17.

FIG. 18 depicts an Equalizer ("EQ") in a modem receiver capable of performing the functions described above. Functional blocks of the Equalizer 400 include a Filter 402 and a Quantizer 404 in the forward path and a Feedback circuit 406 connecting the Quantizer output to the Filter input. A Measuring circuit 408 is used to initialize the Feedback circuit. These circuits process each sub-band sequentially so all sub-bands are served by the illustrated circuits. This is possible since M sub-bands are transformed by the wavelet filter bank (labeled "Transform" in FIG. 17) 410 using M samples from the A/D converter 412.

The receiver multirate QMF wavelet filter bank 410 may be implemented with a form of polyphase filtering followed by four M/2-point FFTs. This very computationally efficient wavelet transform architecture is described in the following. The FFT outputs successive sub-bands, one per sample. As described, it is computed internally in a block-floating point format with a mantissa and exponent that applies to all sub-bands; the FFT is essentially a fixed-point calculation but with extended range.

The separable wavelet functions described next are an example of wavelets chosen for an efficient design implementation of the wavelet transforms for a modem.

A near-perfect reconstruction QMF filter bank can use FIR filters with coefficients that are the product of a time-symmetric envelope function, E, multiplying a sinusoid. For the Master set of wavelets, which are used to transmit data, the sinusoids are preferred to be a cosine for odd numbered sub-bands and a sine for even numbered sub-bands. The symmetry of the functions is exploited to simplify the hardware.

Using the earlier notation, the wavelet for odd band, bo, and even bands, be, at symbol time 0 is:

$|be, 0>=E*\cos(w*t)$ symmetric $|bo, 0>=E*\sin(w*t)$ anti-symmetric

The radian frequency is w, which is the frequency at the center of each of M sub-bands.

$$w=[pi*(2*b-1)/(2*M)]$$

for band number b=[1:M]

Time, t, is measured in samples so the values of |b,0> are the filter coefficients.

The length of the filter is L=M*N. To exploit the symmetries, N must be a multiple of 4 and is typically 8. M is typically a power of 2. Given these conditions, L is even and time t is:

$$t=[-L/2+1/2:L/2-1/2]$$

if L is odd $t=[-L/2:L/2]$

The envelope is chosen as the product of a sine function with a guassian function. The wavelet envelope is defined to be symmetric about the middle of the filter by using the "fliplr" operator (flip columns left to right about a vertical axis) in MATLAB (registered U.S. trademark of The MathWorks, Inc., Natick, Mass., USA) after defining the function for positive time, tp.

a1=1.8244; preferred approximate
a2=2.2888; values
g=constant; determines the scaling in fixed point hardware $$L=M*N;$$

$$p=3*M/2;$$

$$tp=[1/2:L/2-1/2];$$

for positive time if L is even $$m=q2/p;$$

$$q1=pi*q2/(3*M);$$

$$q4=\sin(a1*q1)./(a1*q1);$$

$$q5=\exp(-m.*m/a2).*q4;$$

$$E=g*[fliplr(q5),q5];$$

The preferred values of the constants a1 and a2 are chosen to minimize the cross-correlations of the wavelets, thereby making the wavelets nearly orthogonal. For a modem, 'near-orthogonality' is usually sufficient since there is always noise at the receiver. If the self-interference from the imperfect wavelets is too large, the cross-correlations can be computed and removed by a filter as already described.

The filter bank can perform the filtering function by calculating all the sums of products of the data with the Finite Impulse Response (FIR) coefficients. The sums of products of the sinusoids can be computed with Fast Fourier Transforms (FFTs) over M samples.

Each wavelet has exactly 2*b-1 cycles of the sinusoid in M samples over each of N segments. This symmetry leads to the definition of the odd and even polyphase terms po and pe. The notation follows MATLAB conventions.

$$po=s(1,:)-s(3,:)+s(5,:)-s(7,:);$$

$$pe=s(2,:)-s(4,:)+s(6,:)-s(8,:);$$

where s(i) are the samples from tap i out of the RAM shift registers of the receiver A/D buffer.

For symmetric wavelets, the filter output is:

$$Master=SUM\{po*\cos(\ )-pe*\sin(\ )\}$$

$$Slave=SUM\{po*\sin(\ )+pe*\cos(\ )\}$$

the sum is over M samples

For anti-symmetric:

$$Master=SUM\{po*\sin(\ )-pe*\cos(\ )\}$$

$$Slave=SUM\{po*\cos(\ )+pe*\sin(\ )\}$$

The arguments for the sinusoids are w*t and have radian frequency w:

$$w=[(2*b-1)*pi/(2*M)] \text{ for band number } b=[1:M]$$

The wavelet time axis is offset by ½ from 0.
By comparison, the DFT for 4*M points is:

$$X(k)=SUM\{x(n)*W4^{\wedge}(n*k)\}$$

where $W4=\exp(-j*2*pi/(4*M))$

So a 4M transform computes the right frequency, though there are only have M points, the time axis needs to be shifted by ½, and only every other sub-band is used from the Discrete Fourier Transform (DFT). All of these things are accounted for by the algebra given below.

The FFT multiplies by exp(-j*w*t) and integrates so if a complex signal is defined as:

$$xs=\text{complex}(po,-pe); \text{ i.e. } xs=po-j*pe$$

then the FFT will compute:

$$[po-jpe]*[\cos-j\sin]=[po*\cos(\ )-pe*\sin(\ )]-j* [po*\sin(\ )+pe*\cos(\ )]$$

which is FFT(xs)=Master-j*Slave for symmetric wavelets.
Likewise, a complex signal for anti-symmetric wavelets is:

$$xa=\text{complex}(pe,-po)$$

which results in an FFT of the form:

$$[pe*\cos(\ )-po*\sin(\ )]-j*[po*\cos(\ )+pe*\sin(\ )]=- [Master+j*Slave]$$

This means that a 4M transform can be used. In MATLAB, the M point input is zero filled and, in the following, the unwanted terms are discarded.

$$ys4=fft(xs,4*M);$$

$$ys=ys4(2:4:2*M);$$

To complete the transform method, a time offset of ½ is needed and the conjugate for symmetric case puts the output in the form Master+j*Slave:

$$kb=2*[1:2:M]-1;$$

$$\text{offset}=\exp(-j*kb*pi/(4*M));$$

% adds time offset of ½

$$y(1:2:M)=\text{conj}(ys.*\text{offset});$$

% conj to make M&S positive

For the anti-symmetric case:

$$ya4=fft(xa,4*M);$$

$$ya=ya4(4:4:2*M);$$

$$kb=2*[2:2:M]-1;$$

offset=exp(−*j*\**kb*\**pi*/(4\**M*));

*y*(2:2:*M*)=*ya*.\*offset;

The 4M transform contains many unneeded terms and can be simplified by a decimation in frequency to a 2M transform. For the symmetric case:

*xs*=[*xs*, zeros (1,*M*)];

*mm*=[0:2\**M*−1];

*W*4=exp(−*j*\**mm*\*2\**pi*/(4\**M*));

% complex twiddle

*ys*2=*fft*(*xs*.\**W*4,2\**M*);*ys*=*ys*2(1:2:*M*);

% 2M transform

*y*(1:2:*M*)=conj(*ys*.\*offset);

The above 2M transform also has unwanted output terms and zero input terms. It can be simplified to a 1M transform by another decimation in frequency.

*mm*=[0:*M*−1];

*W*4=exp(−*j*\**mm*\*2\**pi*/(4\**M*));

*ys*1=*fft*(*xs*.\**W*4,*M*);*ys*=*ys*1(1:*M*/2);

% M transform

Since there are only M/2 symmetric bands, a further simplification is possible using a decimation in time. This leads to the final form for symmetric and anti-symmetric processing with M/2 point transforms, namely:

*xf*=*xs*.\**W*4;

*ys*=(*fft*(*xf*(1:2:*M*),*M*/2)+*W*1.\**fft*(*xf*(2:2:*M*),*M*/2));

*y*(1:2:*M*)=conj(*ys*.\*offset(1:2:*M*));

% symmetric bands only

The above describes the receiver's wavelet transform. L samples from the A/D buffer are "collapsed" into M samples by the polyphase filtering, and then those M samples are processed by four M/2-point FFT's.

Figure 32:
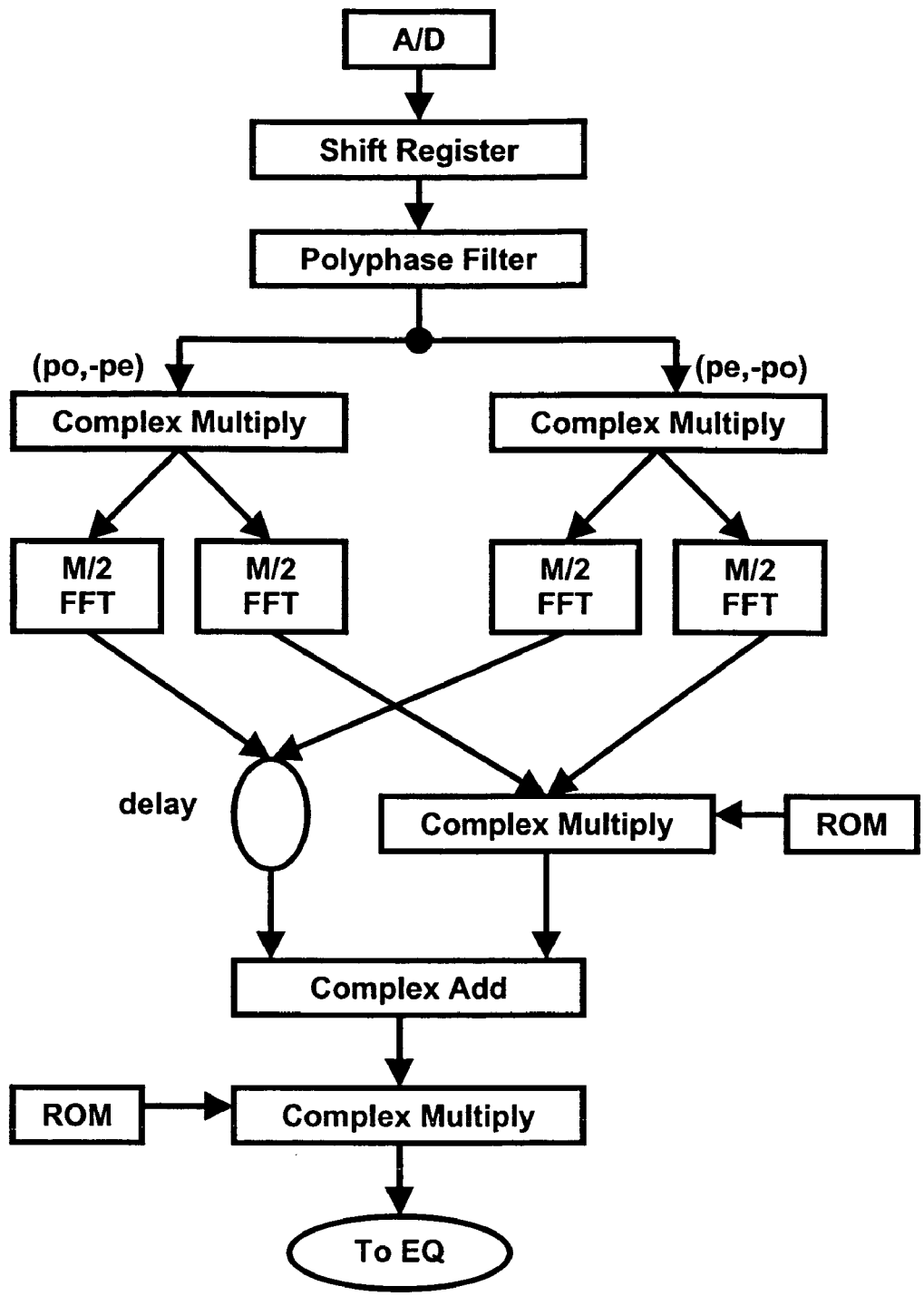
FIG. 32 is a block diagram of algebra utilized in the definition of wavelet functions used to transmit data to the modem receiver of FIG. 17.

A simplified block diagram for the above algebra is found in FIG. 32. In that figure, the A/D output goes to a Shift Register of length L having eight equally spaced taps which are weighted by the envelope in the Polyphase Filter, which in turn yields the signals po and pe arranged as complex numbers for input to the four FFTs. The M/2 points for the FFTs are sub-samples of the original stream of M samples per symbol so that each of the complex multipliers and the adder shown operate at the same sample rate as the A/D. The complex multipliers use ROM tables of exponentials given by the algebra above. The output goes to the equalizer and sync circuits.

Each M/2 point FFT requires a complex multiplier. The polyphase filter has eight real taps and is roughly equivalent to one complex multiplier, so the overall circuit has the computational complexity of eight complex multipliers per A/D sample.

Figure 33:
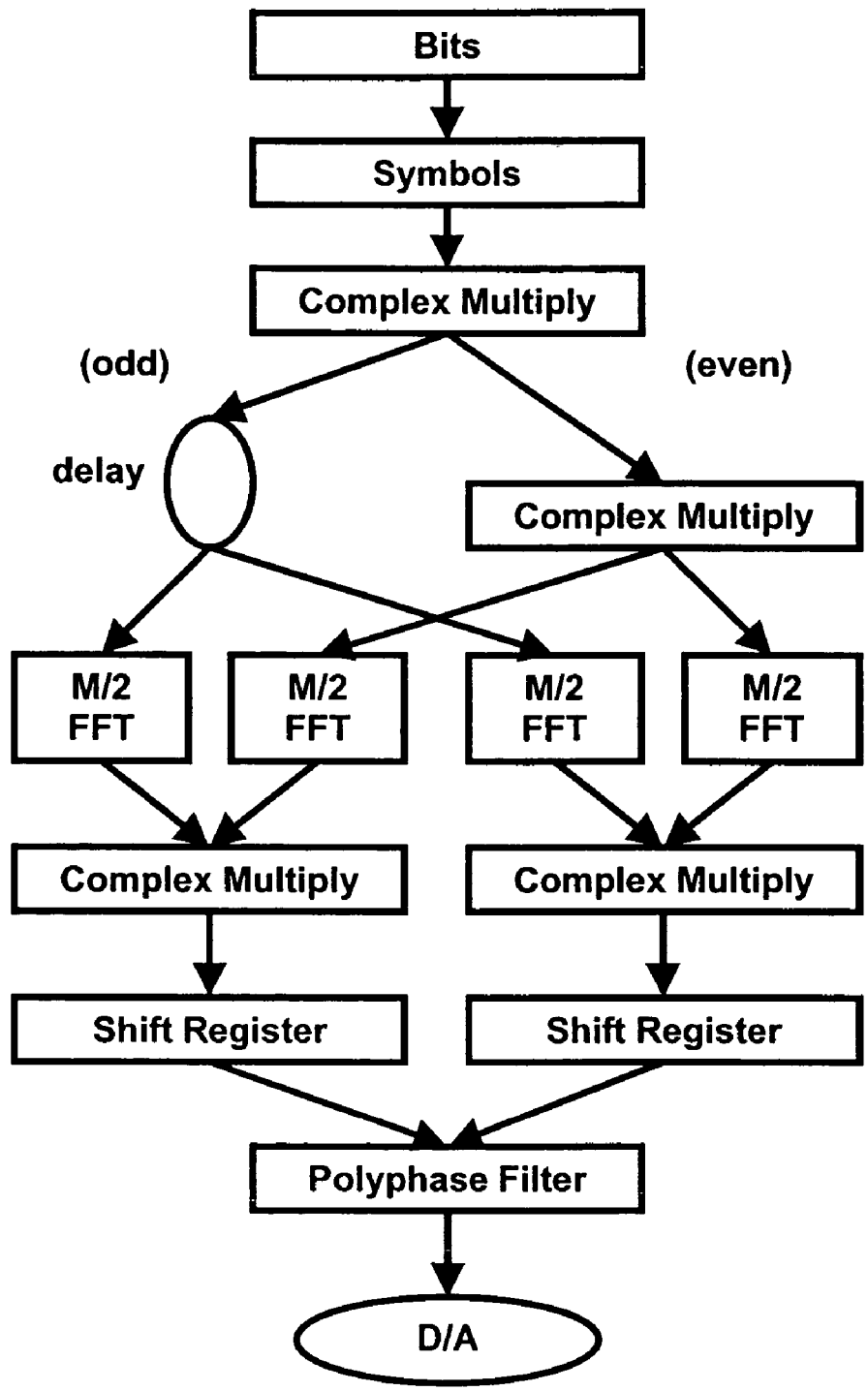
FIG. 33 is a block diagram of a process utilized in the definition of a transmitter signal for receipt at the modem receiver of FIG. 17.

With reference to FIG. 33, the transmitter uses the same QMF filter bank coefficients following similar algebra but the data is first processed by M/2-point FFTs and placed in two RAM Shift Registers containing either the sums for odd and even sub-bands, respectively, or containing the sums for all bands in normal and time-reversed order, respectively. The output of the two RAM Shift Registers is then polyphase summed to create the transmitter signal for a D/A converter.

For the transmitter, the data bits for each sub-band are typically gray-coded into symbols as numbers in the range +−1, +−3 . . . 2^n−1, etc. according to the number of bits per symbol, n. For the two RAM Shift Registers, only the real or the imaginary part, respectively, are placed into the Shift Registers so the output to the Polyphase Filter is eight real numbers per D/A sample.

The Filter circuit 402 of the receiver Equalizer 400 (FIG. 18) is an implementation of the previously disclosed approach to removing cross-correlations (i.e., loss of orthogonality) due to distortions in the transmission medium (labeled "Data Link" in FIG. 18) or originating in the transmitter itself, possibly as a result of using "near-perfect" wavelets. A practical modem may not have perfectly orthogonal wavelets such that there are small, known cross-correlations even when the transmitter and receiver are connected directly without distortions from a transmission medium.

The Quantizer 404 recovers the data symbols and provides as a feedback metric the difference between a quantized symbol (i.e., the Quantizer output) and the unquantized symbol (i.e., the Quantizer input).

The Measuring circuit 408 determines the approximate phase and amplitude of isolated wavelets, which have been previously described as having utility in modem synchronization. A Read Only Memory (ROM) table of arctangents (not illustrated) within the Measuring circuit is used to estimate the phase and level of each active sub-band. Normally, this measurement is only made once, when a modem is first powered up on the operating frequency. The preamble of isolated wavelets may repeat, however, to enable multiple modems to power up at any time.

Figure 19:
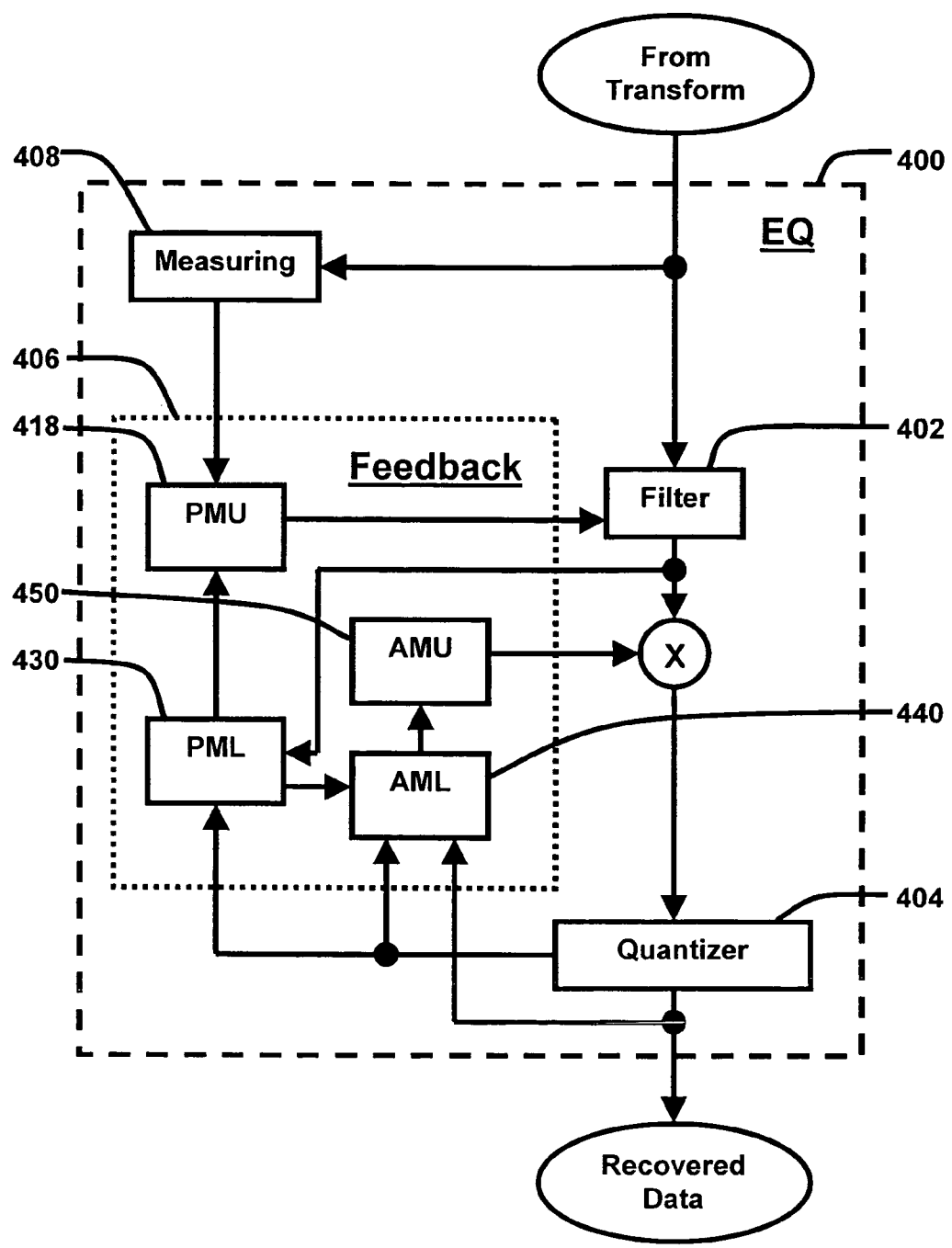
FIG. 19 is a block diagram of an Equalizer as used in the modem receiver of FIG. 17.

In FIG. 19, components of the Feedback circuit 406 are illustrated in block form. The Quantizer 404 error signal is received at a Phase Measurement Loop ("PML") 430 and used as detailed below to generate a Proportional Phase Correction. This correction signal is then utilized within a Phase Measurement Unit ("PMU") 418 in providing left, center and right sub-band phase angles to the Equalizer Filter 402 for each sub-band being processed.

Also shown in FIG. 19 is an Amplitude Measuring Loop ("AML") 440 and an Amplitude Measuring Unit ("AMU") 450. The Amplitude Measurement Loop 440 uses the Quantizer Error signal from the Quantizer 404 in generating a Gain Error Offset. This signal is then used within the Amplitude Measurement Unit 450 in generating a Gain Factor applied to Equalizer Filter outputs.

Figure 20:
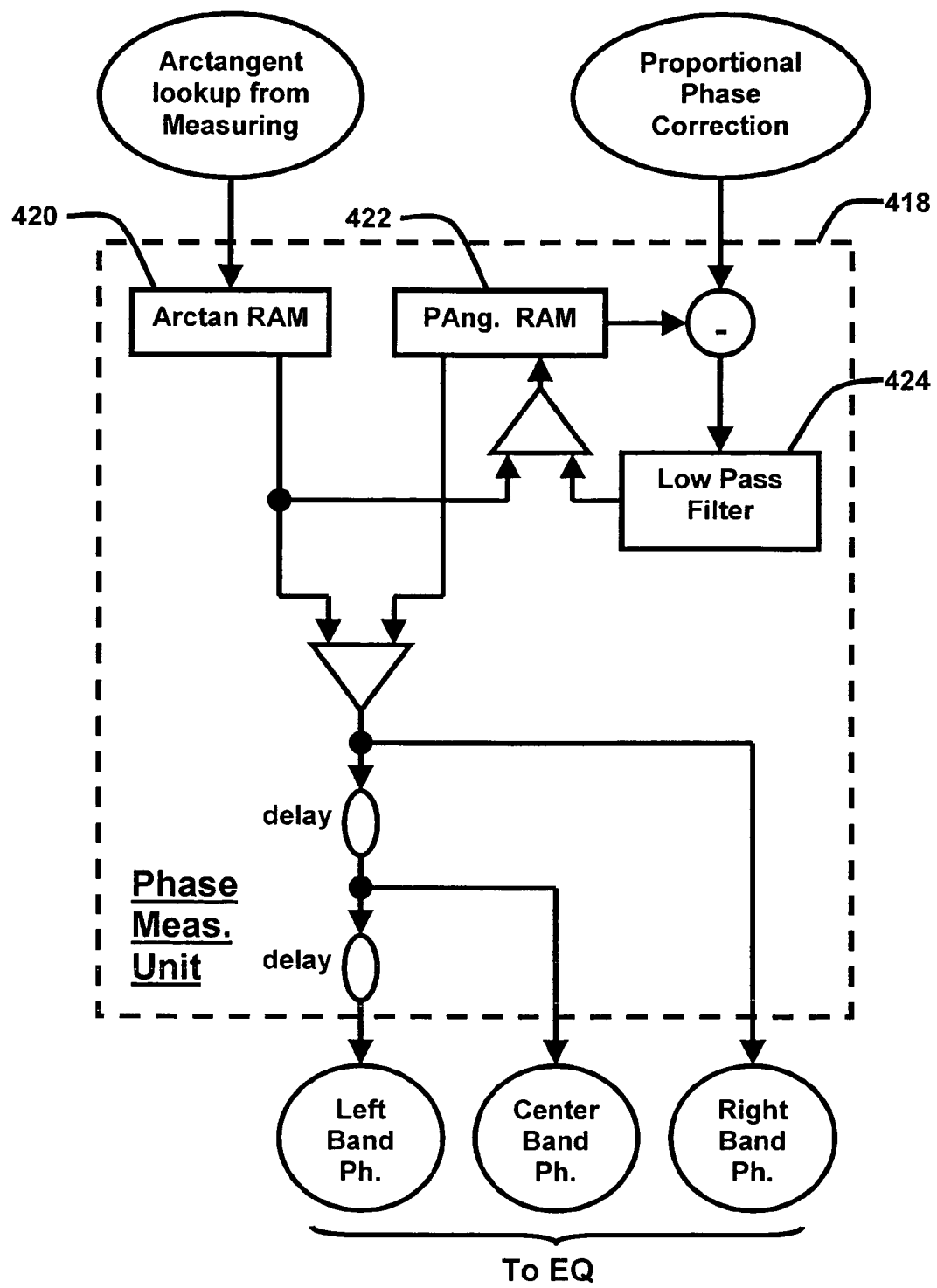
FIG. 20 is a block diagram of a Phase Measurement Unit for use in the Equalizer of FIG. 19.

In the Phase Measuring Unit 418 of the Feedback circuit 406, illustrated in FIG. 20, the arctangent lookup value from the Measuring circuit 408 is saved in Random Access Memory ("Arctan RAM") 420 for each sequentially analyzed sub-band. A Proportional Phase Correction in the correct direction (discussed below) increments a phase value stored in a Phase Angle RAM ("PAng. RAM") 422 for the purpose of achieving phase tracking. The Phase Measurement Unit 418 computes the differential phase angle between adjacent sub-bands since sequential processing makes the Center Band Phase and the phases of the sub-bands to its left and right accessible with delays.

An important feature of the Phase Measurement Unit 418 is the Low Pass Filter 424 located in the phase increment path. This filter provides smoothing independent of the update rate of the phase Feedback circuit 406. The Low Pass Filter smoothes the band-to-band variations in the phase angle and tends to dramatically reduce the phase noise seen in the Center Band Phase value. The signal into the Low Pass Filter is essentially the Center Band Phase. A process of copying, in reverse order, the filter values at the beginning and end of the sequence of active sub-band phases removes end effects for the filter. The Low Pass Filter circuit actually filters the differential phase between sub-bands, then adds this filtered differential phase to the phase of the previous sub-band, stored in the PAng. RAM 422, to obtain the phase of the current sub-band. RF Tuner phase noise is common across all sub-bands.

Figure 21:
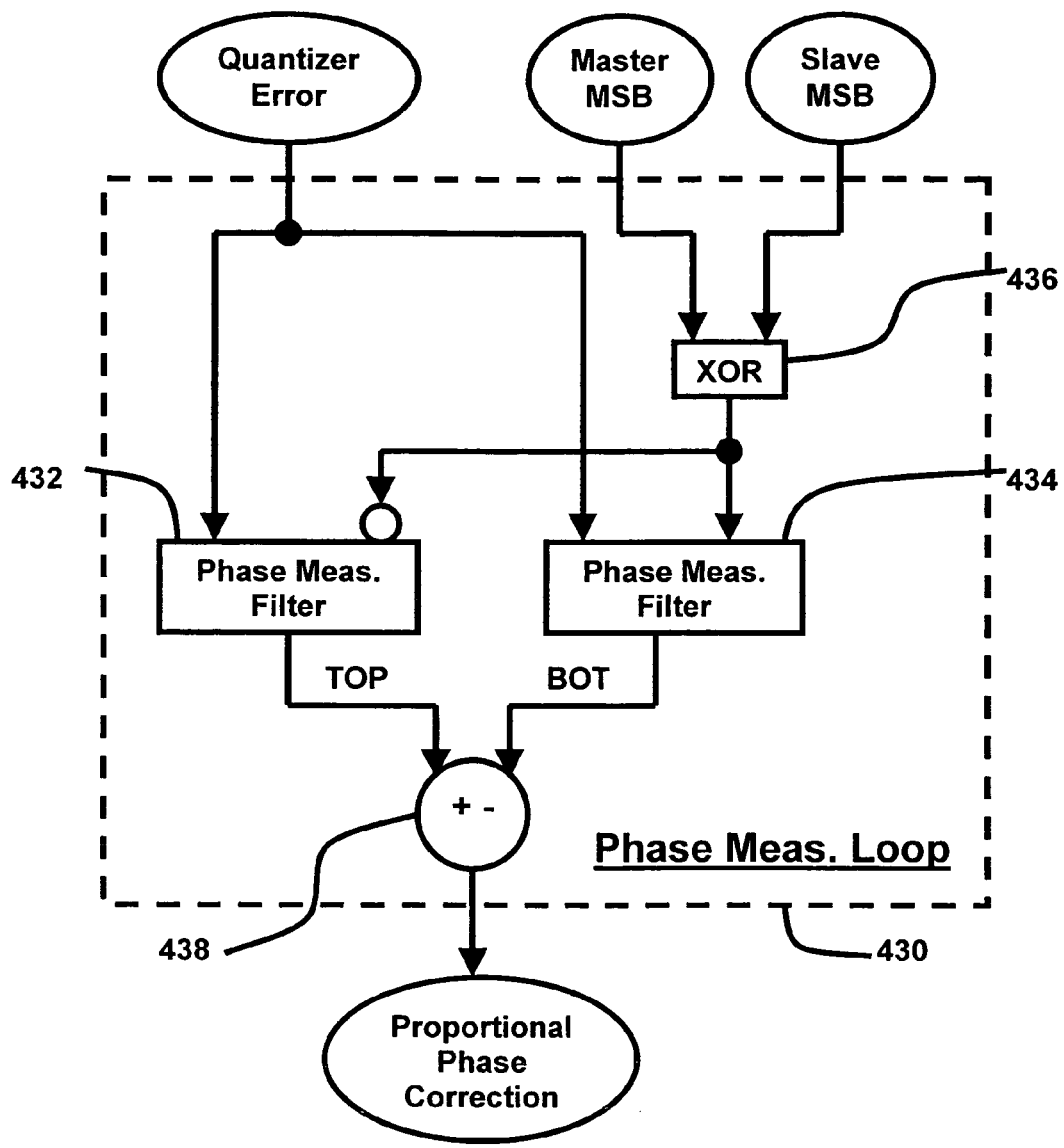
FIG. 21 is a block diagram of a Phase Measurement Loop for use in the Equalizer of FIG. 19.

The Phase Measurement Loop 430 of FIG. 21 supplies the Proportional Phase Correction signal utilized in the Phase Measurement Unit 418. In a practical modem, the gain of the Proportional Phase Correction is adjustable to provide one value for tracking the phase (e.g., a gain factor of 2) and a different value for use in acquisition of the Phase Locked Loop (e.g., a gain factor of ¼), which because it is not initially locked can have a significant frequency error. The Phase Measurement Loop circuit computes the difference between two averages of the Quantizer Error signal using two Phase Measurement Filter circuits 432, 434. Unlike Quadrature Amplitude Modulation (QAM), the constellation is one-dimensional.

Figure 22A:
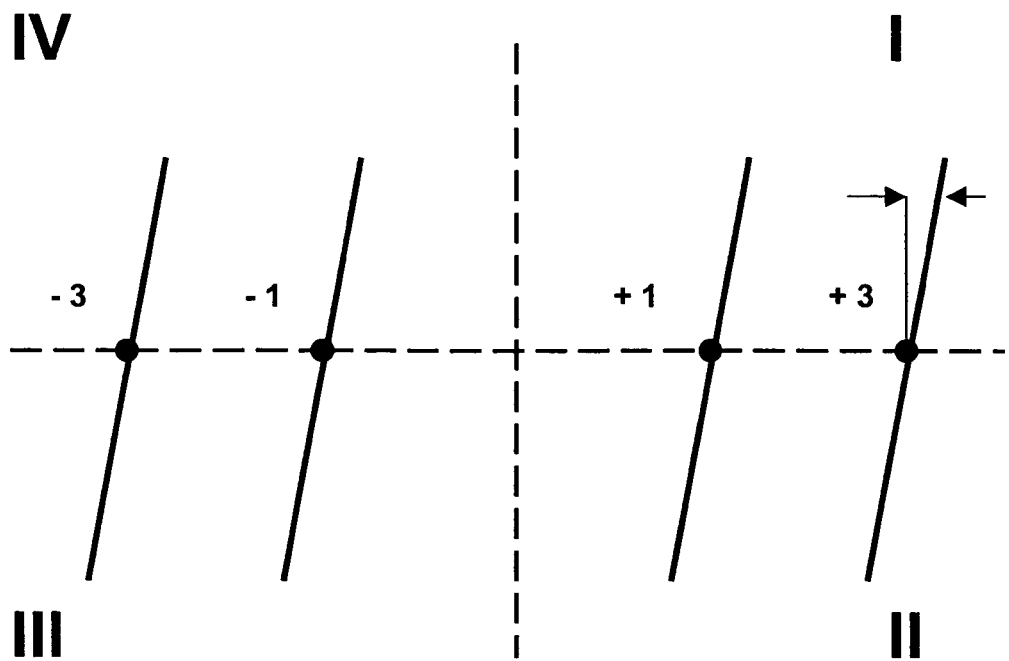
FIGS. 22A and 22B are graphs illustrating proportional phase error for selected symbol values.

FIG. 22A illustrates four symbol amplitudes corresponding to two bit values transmitted in one sub-band. The horizontal arrows indicate the Proportional Phase Correction from a nominal symbol amplitude of +3 to observed symbol amplitudes on the right-most solid line. Symbol amplitude is plotted horizontally and is the amplitude of the Master wavelet correlation after equalization. The vertical axis is the Slave output and carries unnecessary redundant information. Each data symbol, at two bits per sub-band, is a point near one of the solid lines shown. A phase error exists such that the solid lines are not perfectly aligned with the symbol values on the horizontal axis. The projection of the symbol amplitude onto the horizontal axis determines the Proportional Phase error. The standard deviation of the Proportional Phase Correction is directly related to Bit Error Rate.

Figure 22B:
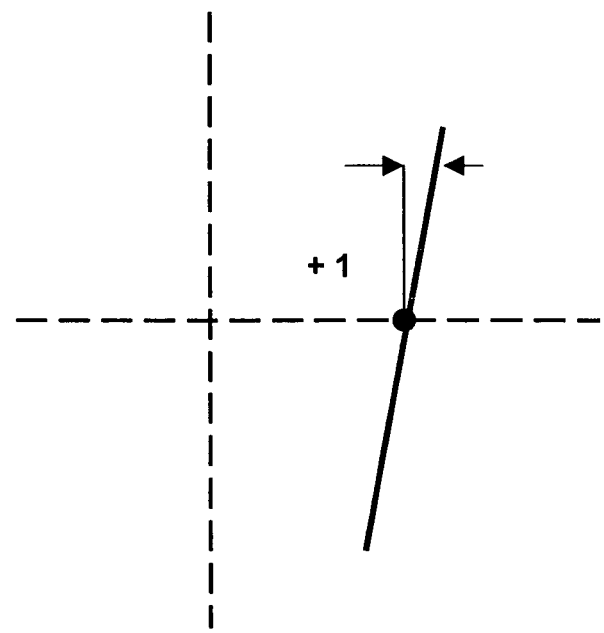

Because the modem uses Proportional Phase Correction, both the nominal +1 and +3 symbols can be treated identically. By symmetry, the −1, −3 regions in the fourth quadrant are like those in the first quadrant, and the symbols in the second quadrant are like those in the third quadrant. Thus, by employing the Phase Measurement Loop 430 circuitry to exclusive-OR 436 the sign of the Master and Slave signals out of the Equalizer Filter 402 and to appropriately modify the sign 438 of the resultant Proportional Phase Correction signal, all possible symbol values can be treated with a single diagram as shown in FIG. 22B.

The phase circuit does not depend upon an accurate measurement of amplitude. The solid lines do not have to cross the horizontal axis exactly at +/−1 or +/−3 for the phase circuit to work correctly. The action of the phase feedback circuits causes the solid line to become more perpendicular to the horizontal Master data axis, while the amplitude feedback circuits (discussed subsequently) make the solid line intersect the Master data axis at the Quantizer levels, which are multiples of +/−1, +/−3, +/−5, etc.

The data points on the solid line above the horizontal axis can be averaged together separately from the data points below the horizontal line. For that reason, the Phase Measurement Filters 432, 434 are called TOP and BOT in FIG. 21. The difference, the Proportional Phase Correction, between TOP and BOT is approximately proportional to the angle of tilt in the solid line, which is the incremental phase error for this sub-band. As previously described, this error correction signal is selectively multiplied by a gain factor and subtracted from the stored phase angle value from RAM within the Phase Measurement Unit of FIG. 20.

After collapsing the +/−3 and −1 symbols into a single +1 case, the tilt of the solid line can be removed even though the symbol amplitude is not exactly an integer. The phase is recovered independent of the amplitude loop, though the two loops should have synchronized update rates so the top and bottom averages are valid.

The Phase Measurement Filters 432, 434 average the Proportional Phase Correction signal by accumulating successive values and multiplying by the reciprocal of the number of points accumulated. At high loop bandwidths, it may happen that the exclusive-OR 436 produces all top or bottom entries, in which case a logic signal (not shown) is defined which prohibits a change to the phase for that sub-band in the Phase Measurement Unit 418 for this update interval.

Figure 23:
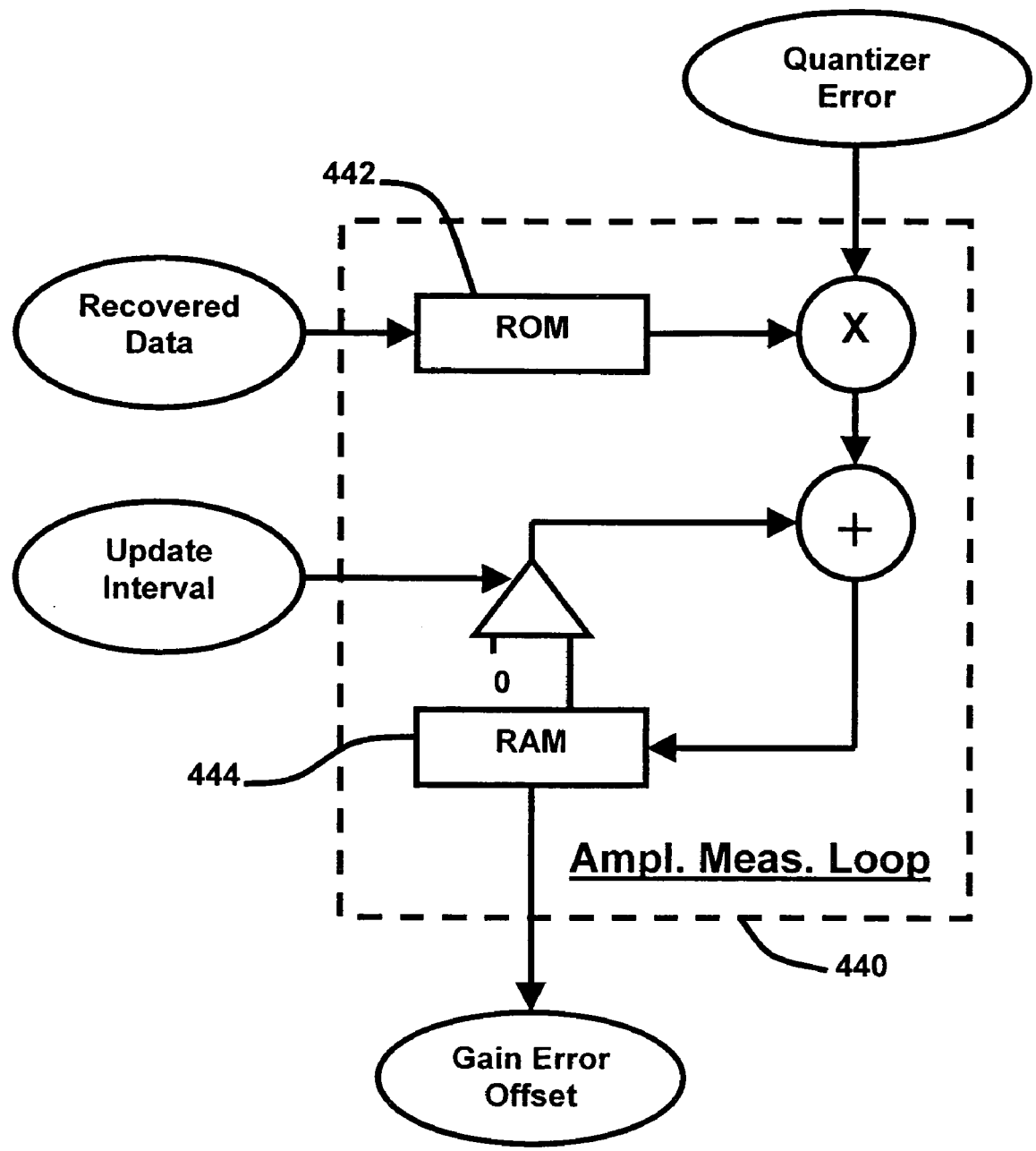
FIG. 23 is a block diagram of an Amplitude Measurement Loop for use in the Equalizer of FIG. 19.

To account for the effect of gain error on observed quantizer error for higher symbol levels, the Amplitude Measurement Loop 440 (FIG. 23) multiplies the Quantizer Error value by the reciprocal of the sliced symbol value using a lookup ROM 442. The symbol value is provided by the Quantizer 404. The product is accumulated in a RAM 444 during an update interval and is provided as a Gain Error Offset. This offset value is then input to an Amplitude Measurement Unit 450.

Figure 24:
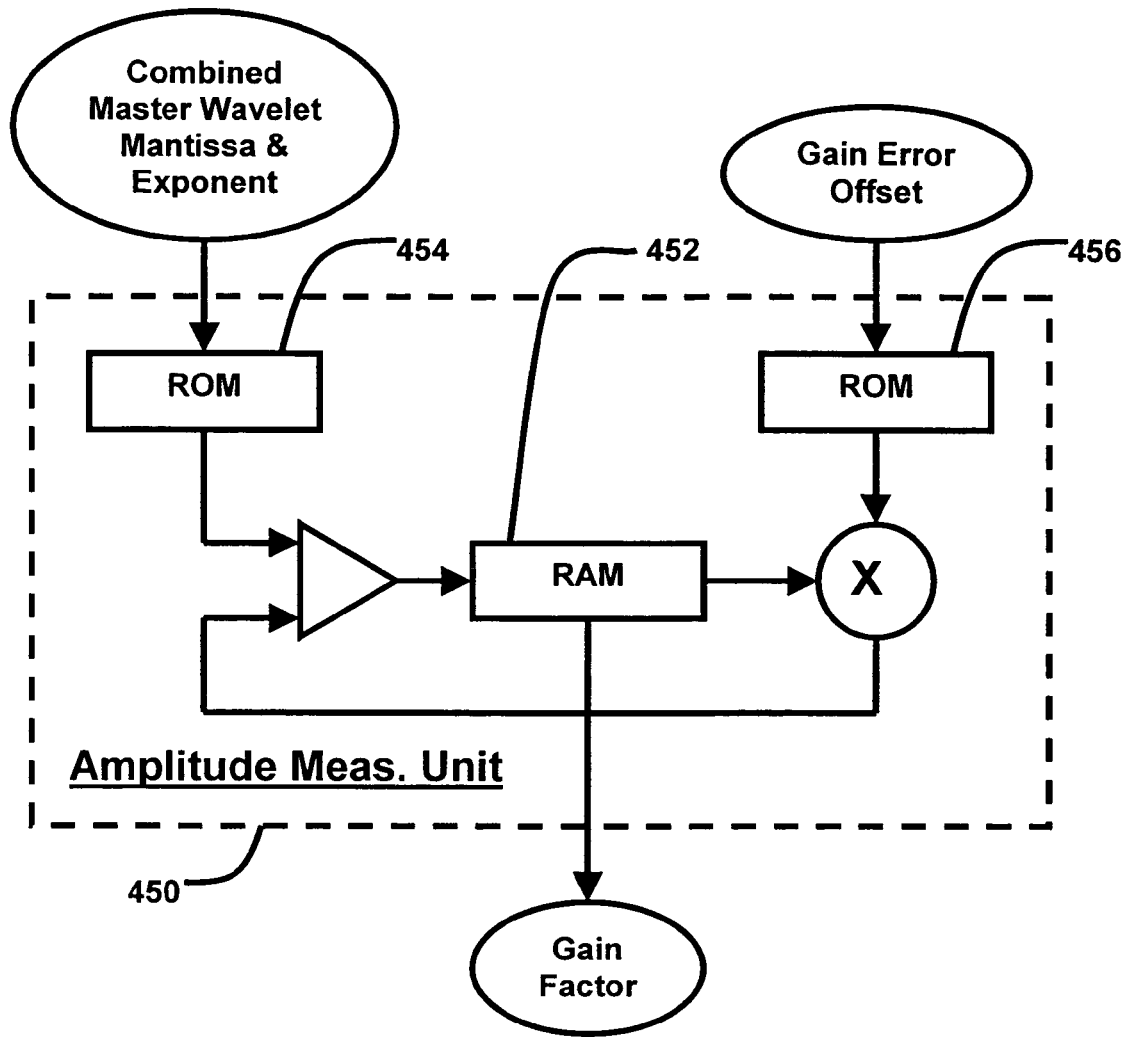
FIG. 24 is a block diagram of an Amplitude Measurement Unit for use in the Equalizer of FIG. 19.

The amplitude of the recovered wavelets is measured at the same time as the phase during initial power-up or when tuned to a new operating frequency range. The amplitude value is stored in RAM 452 of the Amplitude Measurement Unit 450, shown in block form in FIG. 24. The Amplitude Measurement Unit 450 can also include a filter (not shown) for band-to-band smoothing in the update path similar to the Low Pass Filter 424 in the Phase Measurement Unit 418. Such a filter in the Amplitude Measurement Unit 450 is used to reduce the fluctuations in gain due to noisy feedback and thereby improves the Bit Error Rate.

The signal out of the Filter 402 is multiplied by the Gain Factor, which is initially (i.e., at start-up) the reciprocal of the measured amplitude of the isolated wavelet, divided by any scaling factor if not one. The Amplitude Measurement Unit 450 takes the isolated wavelet amplitude directly from the FFT and uses a ROM 454 to provide the reciprocal scaled to represent a symbol of +1, a value which is referred to as "levelone."

After this initial value of the reciprocal of levelone is stored as the Gain Factor in RAM 452, the resulting input to the Quantizer 404 is approximately normalized to the values +/−1, +/−3, +/−5, etc. times a constant equal to the maximum magnitude of the Proportional Phase Correction. Subsequent updates are processed by the Amplitude Measurement Unit 450 on the basis of the Gain Error Offset from the Amplitude Measurement Loop 440. The Gain Factor is tracked according to:

$$GF = GF \times (1/(1 + \text{Average} GEO \times FBGC))$$

where GF=Gain Factor, AverageGEO=Average Gain Error Offset, and FBGC=Feedback Gain Constant which may have different values during loop convergence and loop tracking. The quantity (1/(1+AverageGEO×FBGC)) is obtained in the Amplitude Measurement Unit 450 from a lookup ROM 456 addressed by the Gain Error Offset.

The Quantizer 404 produces the Quantizer Error signal as the difference between the absolute value of an equalized signal and the signal rounded to the nearest odd integer. The Quantizer is based upon the following MATLAB (registered U.S. trademark of The MathWorks, Inc., Natick, Mass., USA) algorithm for quantizing a signal y. The Quantizer Error signal is referred to as "minerr" in this algorithm. The recovered data symbol is referred to as "slice."

```
x=abs(y);
x1=round(x);
slice=sign(y).*x1;
minerr=x-x1;
reven=find(2*fix.(x1/2)==x1);
if isempty(reven)==0
    gt=find(x(reven)>=x1(reven));
    slice(reven(gt))=sign(y(reven(gt))).*
        (x1(reven(gt))+1);
    minerr(reven(gt))=x(reven(gt))-
        (x1(reven(gt))+1);
    lt=find(x(reven)<x1(reven));
    slice(reven(lt))=sign(y(reven(lt))).*
        (x1(reven(lt))-1);
    minerr(reven(lt))=x(reven(lt))-
        (x1(reven(lt))-1);
end
```

Thus, according to the foregoing, the master and slave QMF filter-bank outputs are filtered with fixed tap equalization filters for correcting the master and slave signals for various cross-correlation errors appearing in the receiver. The fixed tap filter outputs are then weighted and combined according to computer functions of the phase angles to remove distortions and self-interference. Finally, the combined equalizer filter outputs are trigonometrically weighted to correct for the overall phase shift in each sub-band due to channel or other distortions. Note that the order of steps in the algorithm described above can be adjusted as one skilled in the art will appreciate.

Other particular features of the presently disclosed receiver Equalizer include the ability to combine data symbols into two groups, top and bottom, on the basis of a property of the symbols. For each group, an average quantizer error is calculated and used in tracking the phase of each sub-band. Differential phase variations between successive sub-bands are smoothed using a low-pass filter with band-edge correction.

The averaged quantizer error signal is also weighted by the inverse of the symbol value in the computation of a multiplicative gain factor applied to the quantizer input, resulting in all symbols being distributed proximate the fixed, nominal symbol levels. Band-to-band variations in differential gain correction are smoothed by a low pass filter similar to that used for phase tracking.

The phase and amplitude loops in the receiver Equalizer are initialized with values measured infrequently from isolated wavelets having known amplitude and phase at the respective transmitter. These loops are then updated together or at least in synchronism.

A Phase-Locked-Loop in the receiver (not illustrated) serves to synchronize the A/D sample rate to the transmitter D/A sample rate. The analog converter rates must be M times the symbol rate for a multirate QMF wavelet filter bank (except when the converter is over-sampling or under-sampling).

Figure 25:
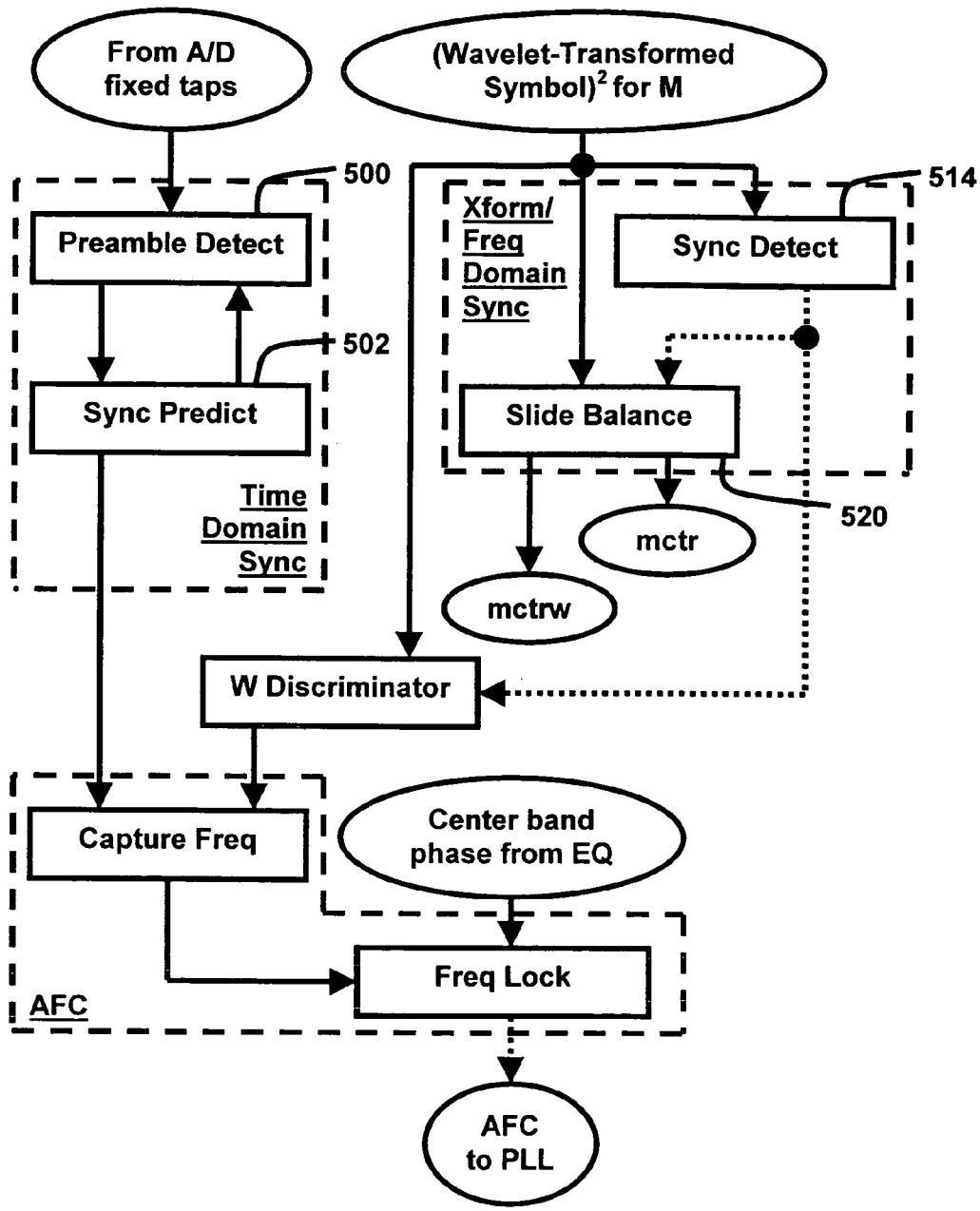
FIG. 25 is a block diagram of timing and phase synchronization circuitry for the modem receiver of FIG. 17.

FIG. 25 illustrates in block diagram form the circuitry utilized in the receiver for providing timing and phase synchronization between the transmitter and the receiver. The Preamble Detect 500 and Sync Predict 502 functional blocks represent time domain synchronization circuitry. The Sync Detect 514 and Slide Balance 520 functional blocks represent transform or frequency domain synchronization circuitry. The components of this circuitry are addressed subsequently.

The D/A and A/D sample-rate clocks in the transmitter and receiver, respectively, must be phase locked. The Capture Frequency, Frequency Lock and Wavelet Discriminator of FIG. 25 provide this clock synchronization, as is discussed in detail below.

Symbol sync is also a requirement. A wavelet extends over N symbols and each symbol comprises M samples. Typical values include, but are not limited to, M=256 and N=8. The transmitter and receiver must agree as to when a wavelet starts. Another way of stating this is that the receiver must be able to identify which sample represents the start of a wavelet. The receiver refers to the difference between the transmitter and receiver wavelet starting values as the "slide" (as used in a "sliding correlation"). The value of "slide" is thus a number from 0 to M−1.

If the preamble of isolated wavelets is such that multiple sub-bands are pulsed at once while still being isolated so that none overlap in frequency, then certain wavelet families will result in a set of very narrow, high amplitude peaks of only a few samples in width.

Figure 26:
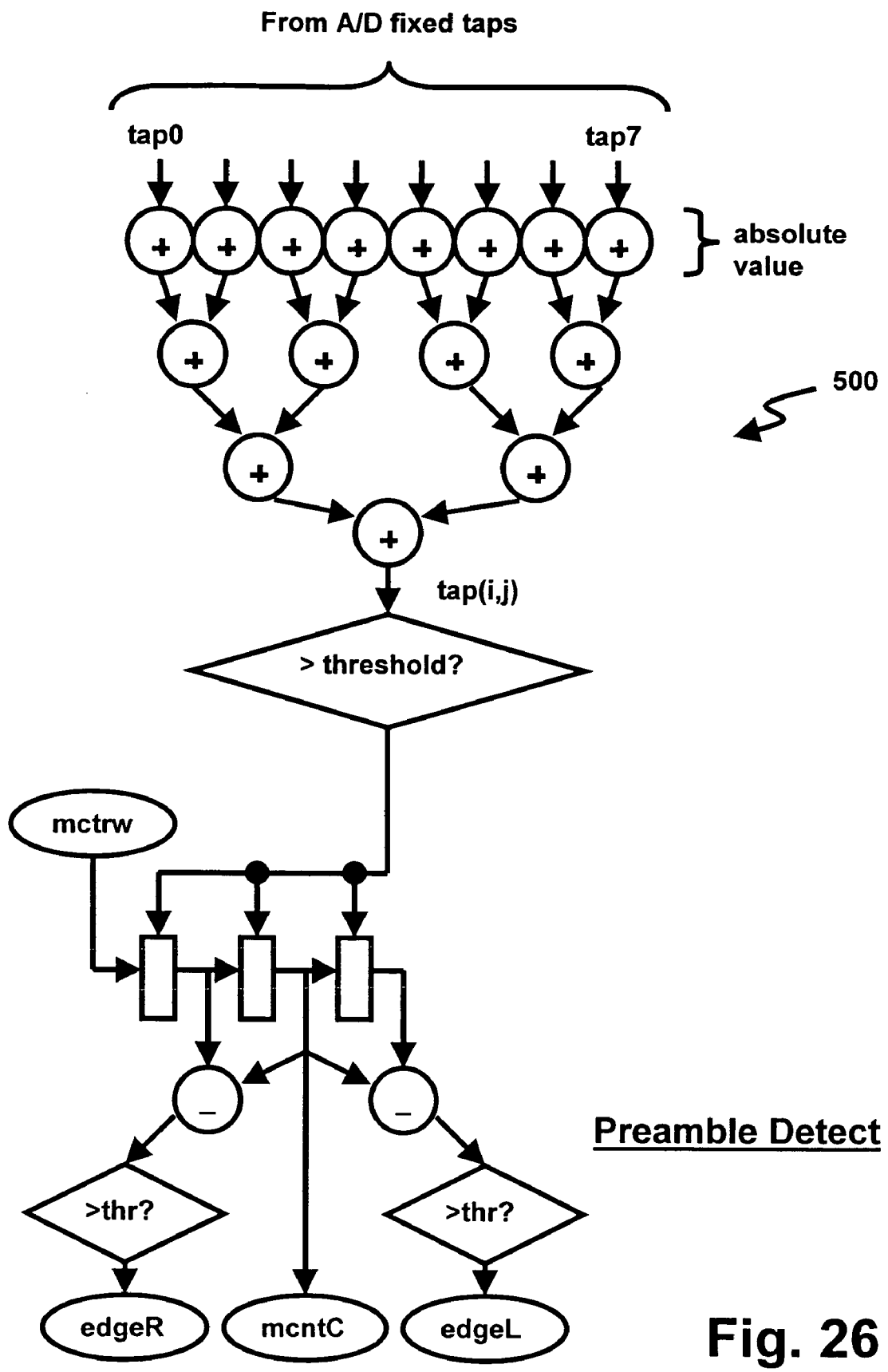
FIG. 26 is a block diagram of a Preamble Detect circuit as used in the timing and phase synchronization circuitry of FIG. 25.
Figure 27:
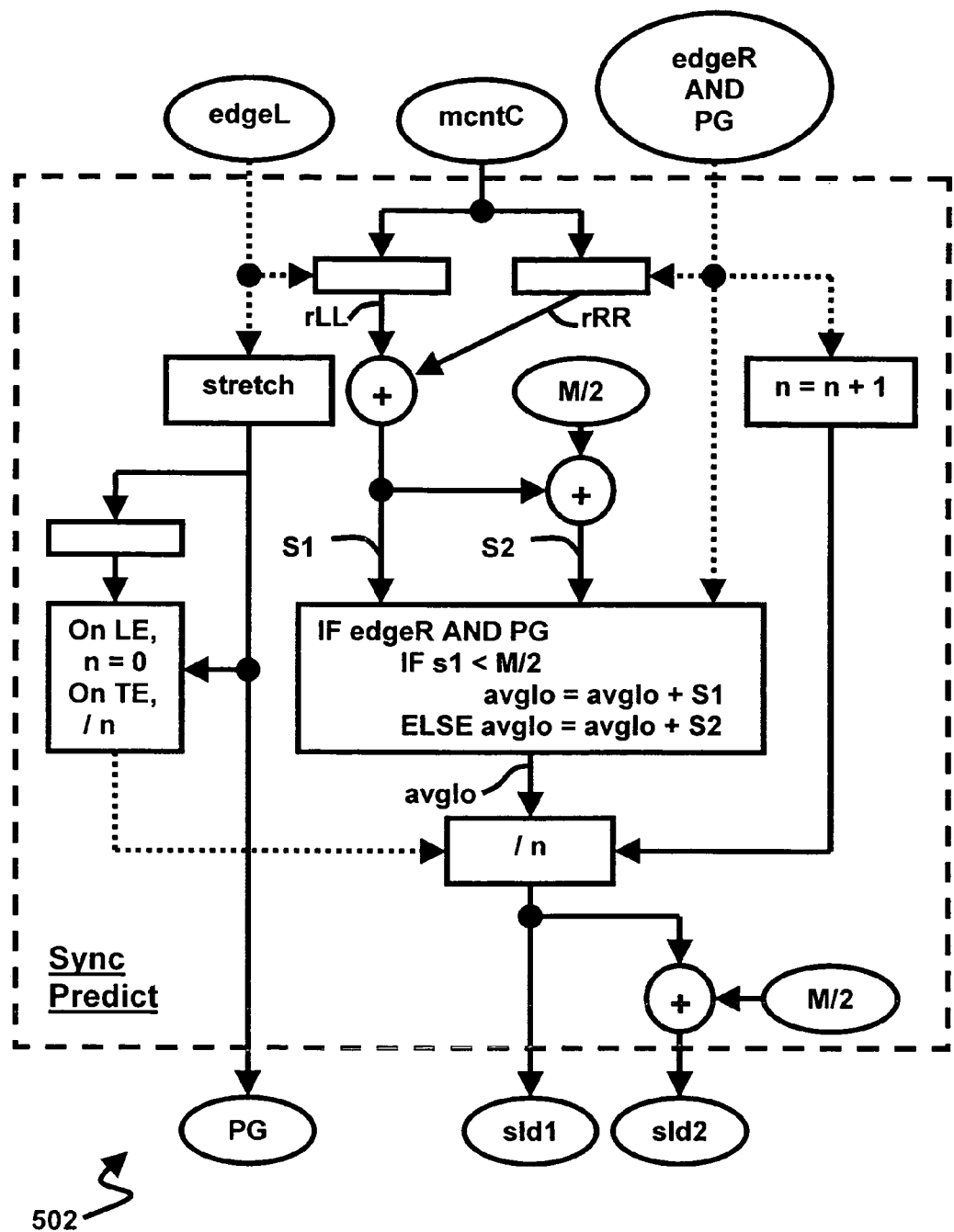
FIG. 27 is a block diagram of a Sync Predict circuit as used in the timing and phase synchronization circuitry of FIG. 25.

A Preamble Detect circuit 500, shown schematically in FIG. 26, forms a signal referred to as "tap(i,j)" as a set of narrow pulses spaced M/2 apart from such a preamble. The circuit determines the sample number from 0 to M−1 of each value of tap above a fixed or variable threshold. The sample number values are processed to find the left and right edges of a cluster of peaks in the tap signal. The edges are then used in the Sync Predict circuit 502 of FIG. 27 to compute the average center of the cluster. The average center value, also referred to as the average location of the sample peak or "avglo" in FIG. 27, is the sample value coincident with the start of a wavelet as seen by the receiver sample counter.

The transmitter starts the wavelet at a nominal sample count of zero. The timing offset of the transmit and receive sample counters is referred to as "slide." As illustrated in FIG. 27, the Sync Predict circuit 502 actually has an ambiguity of +/−M/2 in its location of the wavelet and so two values of "slide," labeled "sld1" and "sld2," are computed.

An alternative method for synchronizing the receiver to the transmitter has already been disclosed in the foregoing through the use of an isolated wavelet and a sliding correlation. One implementation of such a Sync Detection circuit is shown in FIG. 28, and tests a center tap against first neighbor taps multiplied by 2 and second neighbor taps multiplied by 16. The tap weights depend upon the specific choice of wavelet function. If all tests pass, the peak is in the center tap, the receiver is synchronized, and the Sync Detect signal is output by the AND gate for the currently processed sub-band. The Majority Logic 512 requires that more than half of all the sub-bands that issued an isolated wavelet at this symbol be detected.

In an illustrative hardware embodiment, M=256. Any number of sub-bands may be turned on, though 176 is a typical number of active sub-bands. The typical preamble thus consists of sending a symbol simultaneously on every fourth active sub-band with no energy on the others. Then, after N=8 symbol times on no energy, a second group of every fourth symbol is sent, and so on. The preamble is thus composed of seven null symbols, a known symbol value in active sub-bands, seven null symbols, a known symbol value in active sub-bands, etc.

If one of the "sld1" or "sld2" signals from the Sync Predict circuit of FIG. 27 is incorrectly offset by M/2, there will be no coincident Sync Detect output from the Sync Detect circuit 514 of FIG. 28; this characteristic can be used to correctly resolve the M/2 ambiguity of the Sync Predict circuit 502.

Figure 29:
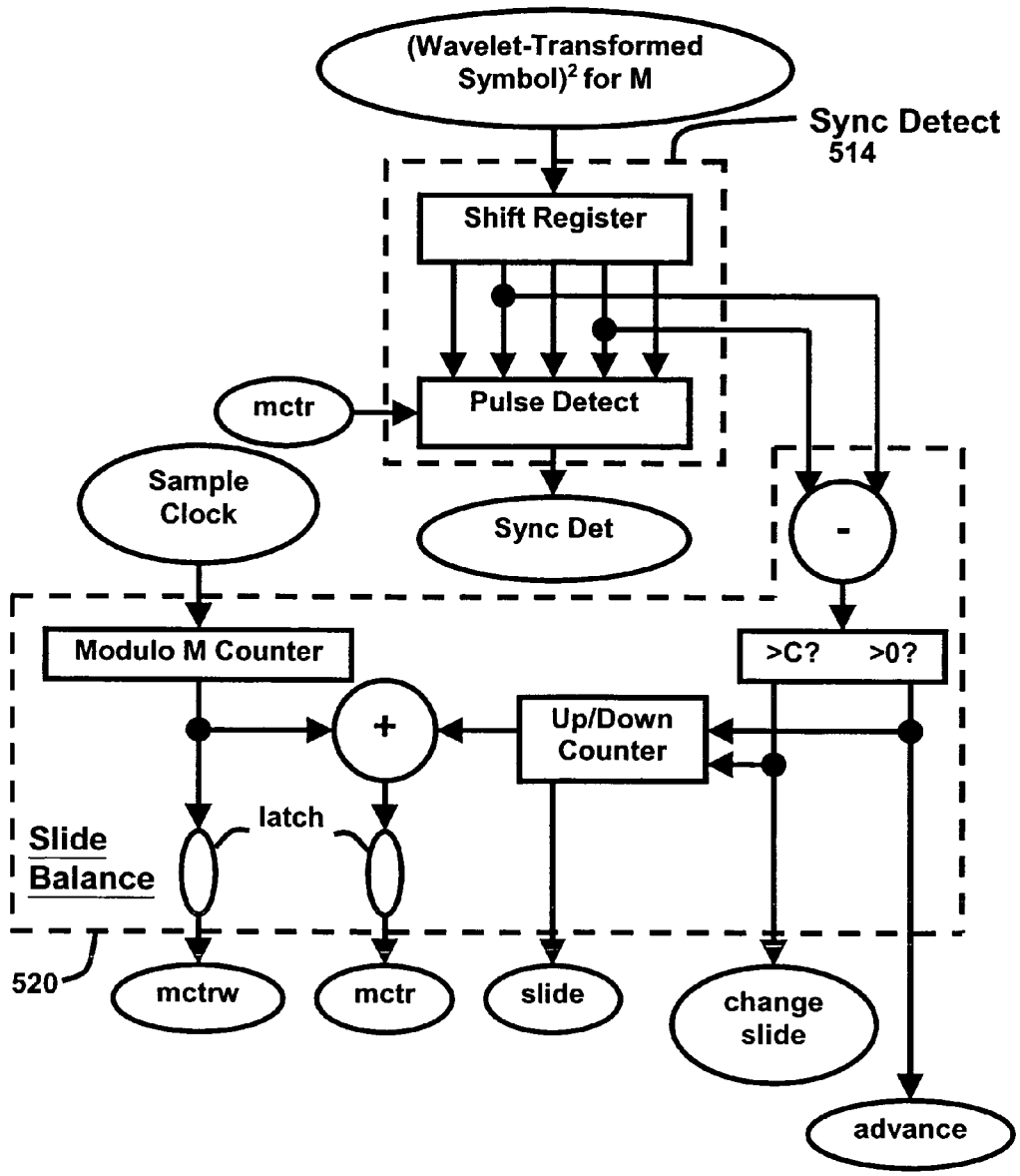
FIG. 29 is a block diagram of the Sync Detect circuit of FIG. 28 and a Slide Balance circuit as used in the timing and phase synchronization circuitry of FIG. 25.

The Sync Predict circuit of FIG. 27 finds candidate "slide" values without the aid of the receiver QMF filter bank, whereas the one symbol time offset tap values from the Sync Detect logic of FIG. 28 are used in the Slide Balance circuit 520 of FIG. 29; the sliding taps in the Shift Register of the Band-Shared Section (see FIG. 17) are then adjusted to the presumed start of a wavelet by trial and error in minimizing the slide balance. When synchronized, the early and late squared energies are equal. When not synchronized, the two signals are not balanced; that difference indicates not only that the slide value is incorrect but also indicates which is the proper direction to make the slide value correct (or more correct).

The "slide" value synchronizes the start of the symbols by requiring the buffers for the A/D input shift register connected to the transform to be moved (or the taps to be moved for addressing the RAM). Thus, the taps are slid by the amount of the computed "slide" which is output from the Slide Balance circuit 520 of FIG. 29. This requires considerable delay to flush all the calculations in the wavelet filters.

When the balance reaches approximately zero, the counter, mctr, which defines the start of wavelets and also the order of the sub-band processing, is in step with the corresponding mcntr in the transmitter. The initial value in mctrw changes when power is applied to the circuit and slide is added to that value to achieve symbol sync. The advance and change signals from FIG. 29 go into the state-machine that control all the logic in the receiver.

While a state-machine for the receiver is not illustrated explicitly, it will be readily apparent to those skilled in the art that some form of control mechanism is necessary for controlling logic elements disclosed in the accompanying drawings.

The preamble of groups of time and frequency isolated wavelets has a distinctive property for the wavelets selected. They appear as an impulse of only a few samples wide even though the wavelet is 2048 samples long (M×N). The preamble appears as a set of several narrow spikes spaced M/2 apart, each spike being five to seven samples wide; everywhere else, the time domain signal is nearly zero.

The spikes are biggest at the center of the wavelet's duration. The A/D 412 (FIG. 17) input to the transform 410 already has eight taps spaced M samples apart. Those taps are used as the input to the Preamble Detect circuit 500 of FIG. 26. The sum of the absolute values results in the comb-like pattern of pulses all about the same height, five to seven samples wide, and spaced M/2 apart. The problem is to find the average center of these pulses, which defines the exact center of the wavelet energy. Because of the M/2 spacing, the slide value or the slide value plus M/2 modulo M is provided; these two values are referred to in FIG. 27 as sld1 and sld2.

Unlike the frequency-domain circuit which finds slide by trial and error in a sliding correlation, the circuit in FIGS. 26 and 27 can find the slide value before the wavelet has even reached its center owing to the spikes spaced every M/2 apart. In practice, the M/2 ambiguity is resolved by the receiver's state machine (not illustrated) by observing that the frequency domain Sync Detect of FIG. 28 only has an output when sync is correct to within less than M/2. The logic is thus capable of picking the correct value between sld1 and sld2.

The bottom half of FIG. 26 is concerned with finding the center of the spikes, which as described are approximately six samples wide. As discussed above, the mctrw value cycles from zero to M−1. Whenever the spike is above a noise threshold, the counter values are saved in the shift register. If the values are in a contiguous, ascending order, then the inside of a spike has been identified. Otherwise, this discontinuity is a left edge (edgeL) or right edge (edgeR) which will be used as a control signal, identified in FIG. 27 by dotted lines. The control signals are used to latch the mcntC value of the left and right edges into the registers rLL and rRR. The counter values are then used to get the count for the center of the spike. All of the centers from all of the spikes are averaged over n spikes to arrive at the slide values sld1 and sld2, typically accurate to +/− one sample.

Note that the Preamble Detect and Sync Predict circuits 500, 502 can only measure "slide" to within one sample, whereas the balance technique associated with the Sync Detect and Slide Balance circuits 514, 520 can measure "slide" to a small fraction of a sample. The measurement of arrival times of the wavelet (i.e., symbol) is also necessary to synchronize a multitude of transmitters in a multiple access system of the type previously disclosed.

The modem must also synchronize the sample clock using a PLL. To acquire sample rate lock, a coarse frequency correction can be made based upon the known interval between transmission of the isolated wavelet in successive preambles. The coarse frequency is corrected if the receiver does not find the known interval. To aid in this, the Slide Balance circuit provides a Preamble Gate (PG) signal, the latter being indicative of when data has stopped and the preamble is present. The right edge control signal, edgeR, is ANDed with PG. Data after the preamble does not have energy gaps and hence no left edges. At poor noise levels, there is a need to make the PG signal robust. It is passed through the logic equivalent of a monostable multivibrator to stretch the pulses (FIG. 27) so they overlap and thereby produce a clean pulse out of PG for the duration of the preamble.

The time, in samples, between Preamble Gates minus the known time interval in the transmitter is the coarse input to a VCXO. Alternatively, a more stable coarse signal can be obtained from the change in the slide value over one or more preambles; four preambles are used in the circuit of FIG. 30 to generate a signal proportional to the coarse frequency error. This signal may have an M/2 ambiguity.

When the receiver power is first applied, the receiver must adjust its oscillator (a VCXO) to have the same frequency as the transmitter. Initially, however, the frequency offset may be so large that the wavelet engine cannot be used. In this case, the interval between the preambles is used as a coarse frequency reference.

The problem for coarse frequency acquisition is to accurately detect the arrival time of the isolated wavelets in the preamble. This is exactly what the time-domain Sync Predict circuit does, so the sld1 and sld2 outputs are used as the input to Capture Freq logic of FIG. 30. Using exemplary numbers, if the preambles are spaced at 2048 symbols apart, then a counter could count 2049 if the local clock is slightly fast or 2040 if very slow. For more accuracy, the measurement can be taken over a longer time. A change in the computed slide over four preambles is used in this logic to generate a signal proportional to the coarse frequency error.

Once the coarse error from the preamble is applied, the VCXO presumably slews to nearly the correct frequency, a condition of frequency lock. To achieve phase lock, the slide must then be applied to move the A/D buffer readout timing and the Equalizer must start to converge on the correct phase by the action of the Phase Measurement Loop and Phase Measurement Unit disclosed above.

Figure 30:
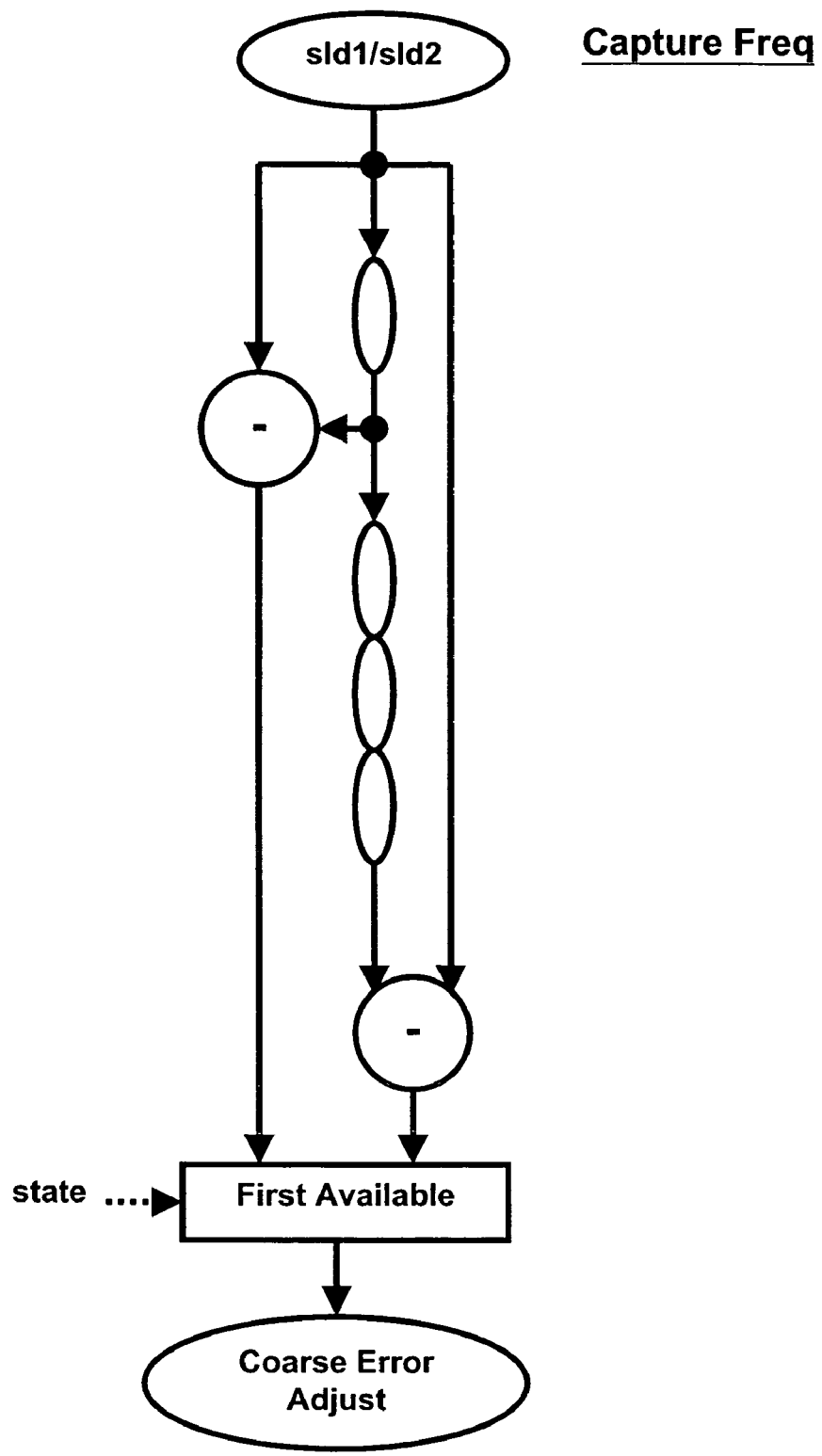
FIG. 30 is a block diagram of a Capture Frequency circuit for use in the receiver of FIG. 17.
Figure 31:
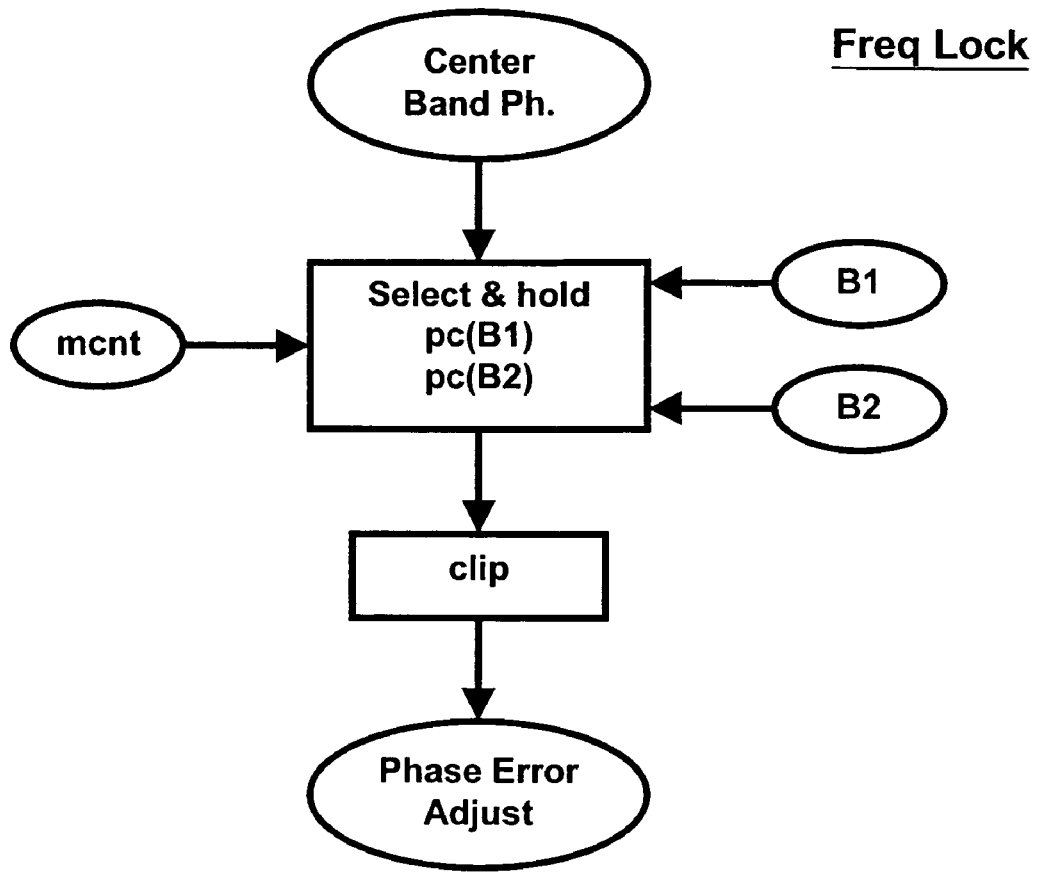
FIG. 31 is a block diagram of a Frequency Lock circuit for use in the receiver of FIG. 17.

A D/A (not shown) supplies control voltage to a conventional VCXO. The changes in phase following the initial measurement of a selected sub-band (or some average of sub-bands especially with the Low Pass Filter 424 present) are then used as the fine correction to the VCXO. In FIG. 30, the Capture Freq circuit connects the most significant bits of a D/A to the coarse frequency correction of the VCXO. The less significant bits from the D/A are connected to the phase correction and are derived from the Freq Lock circuit of FIG. 31. The wavelet receiver then acts as a phase detector. The output from the Phase Meas Loop 430 (FIG. 21) is latched in the Freq Lock circuit of FIG. 31 for a specific sub-band (e.g. B1 or B2). The VCXO is then locked to the selected sub-band. The modem receiver thus uses a wavelet phase detector to achieve phase lock after first getting frequency lock using the interval time for isolated wavelets in a preamble.

The phase detector output is combined with the coarse slide difference signal to achieve the two step acquisition. If the equalizer cannot track phase when the frequency offset is determined by the coarse circuit alone, then a third step may be needed between the first two. This third step uses the wavelet transform but not the equalizer. It relies on the fact that the transform is a filter bank and when the frequency of the receiver is wrong, the sub-bands of the filter bank will be shifted in frequency so that energy from the isolated wavelets in the preamble will leak unequally into the adjacent sub-bands.

This is analogous to a crude frequency discriminator and is identified in FIG. 25 as a Wavelet Discriminator (labeled "W Discriminator" in the figure). This brings the VCXO closer to the correct frequency and thereby allows the equalizer to track phase. In practice, however, step three is usually not needed because the equalizer is capable of tracking a large frequency offset.

During the transition from coarse to fine control of the VCXO, the Equalizer must be able to track a considerable frequency offset (typically ½ part per million) which may require a larger feedback gain than is normally used after phase lock is attained. Thus, a selectable gain factor, not illustrated, is preferably applied to the Proportional Phase Correction input to the Phase Measurement Unit 418 of FIG. 20.

To reiterate, significant features of the timing circuits discussed above include achieving coarse frequency lock of the sample rate by applying to a VCXO (or VCO) the difference, in samples, of the interval between isolated wavelets as measured in the receiver and the known interval at the transmitter. In the foregoing, this difference is referred to as the variable "slide" (or "sld1" or "sld2"). An additional significant feature of the presently described modem receiver is the ability to achieve phase lock by applying the phase from the received wavelets to the VCXO. The coarse and fine signals may overlap in their range of control voltage to the VCXO.

As discussed, the present modem receiver provides the ability to perform preamble detection using the sum of absolute values of A/D samples from equally spaced taps. Cluster processing of sample values for selected values of "tap" is utilized to determine the average position of the wavelet in time as an offset, referred to as the variable "slide," between the transmit and receive sample counters. Multiple groups of isolated wavelets are sent as a cluster in the preamble and the mean locations of the groups are averaged. Such processing finds the edges of the cluster in sample count values and determines the mean value as the location of the wavelet.

Another issue which the presently disclosed modem addresses are multipath echoes which, for multiple sub-bands, are a problem for high speed communications. A method of dealing with this problem in the previously described modem receiver is outlined below. Small random phasing effects like Doppler shift are ignored.

Figure 34:
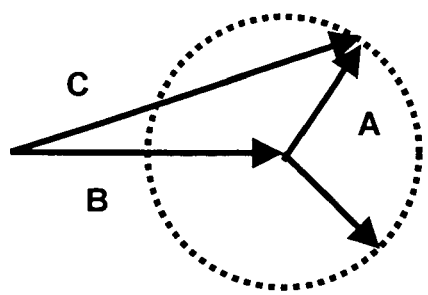
FIG. 34 is a phase diagram useful in characterizing a multipath problem addressable by the modem receiver of FIG. 17.

In the FIG. 34, the horizontal phasor, B, represents the transmitted signal phase for all the sub-bands in a multiband system. They all have the same phase at the transmitter. Here they are shown arriving at the receiver at the same phase assuming that there is no other impairment except for multipath. The receiver has rotated B to zero degrees.

Phasor A is the multipath reflection that arrives at the receiver for a specific sub-band. Each sub-band will have a particular phase angle so that the tips of all these trace out a circle. If the sub-bands b are numbered, so $1 \leq b \leq M$, and the echo delay, measured in samples, is d, then the phase angle P of each echo in a multiband (e.g. wavelet) modem is:

$$P=(2*b-1)*d*90/(M+e)$$

measured in degrees where e is some constant phase, possibly 0, that is common to all and is attributable to the reflection process. The length A of the echo phasors will be a fraction, a, times the length of B $$A=a*B \text{ with } 0<a<1$$

The vector sum resultant phasor, C, is what is actually measured by the receiver. Clearly, the amplitude of C has a quasi-sinusoidal amplitude and phase across all the sub-bands.

When the phase of A is a multiple of 180 degrees then there is destructive interference (fading) in that sub-band and the Signal to Noise Ratio (SNR) suffers, so the Bit Error Rate (BER) is worse. When the phase is a multiple of 90 or 270 degrees then the modem is not aligned to the true signal for those sub-bands and there is Inter-Symbol Interference (ISI) which affects the BER. The wavelet equalizer can use the second derivative of the phase with respect to sub-band frequency to weight the ISI correction for phase error, which is related to group delay or arrival time error, since the ISI is largest when the angle of A passes through peaks near 90 and 270 degrees. While this was determined experimentally to some effects of ISI, it does not help the SNR fading loss that occurs at 180 degrees.

The following discusses a way to track the true signal B rather than the resultant C, thereby eliminating fading. The technique has application for both wireless and wireline (including CATV, powerline, phoneline, etc.) communications.

It is assumed that the modem, at initialization, has measured the phase and amplitude of C for each active sub-band out of the total M sub-bands. From these measurements, the three parameters a, d, e can be found since they are common for all sub-bands. As a result of a fit to the data, through a feedback circuit or simple approximations, a is found from the max/min amplitude; d is found from the frequency of the phase ripple or from zero-crossings of phase ripple across the sub-bands; and e is an additive constant common to all sub-bands for making the phase curve fit the formula given above. For three parameters, more than 3 sub-bands are required if the fading is not flat across frequency.

The measured phase angles of the active sub-bands, Pang, is related to the phase, P, of vector A by the geometry in FIG. 34. P is obtained from a, d, and e by the formula presented above and noting:

Tangent(Pang)=$A$*sin($P$)/($B$+$A$*cos($P$))

and that the length of the true vector B is:

$B$=$C$*cos(Pang)-$A$*cos($P$)

The signal C contains ISI due to vector A that must be subtracted out of the previous calculation. The amount of ISI depends on delay or equivalently the derivative of the angle P with respect to the sub-band and it depends on the length of A (=a*B). The removal of ISI for a wavelet modem follows the prescription given above and summarized here:

Quantizer input=$B$=$C$*cos(Pang)-$A$*cos($P$)-$ISI$

Figure 35:
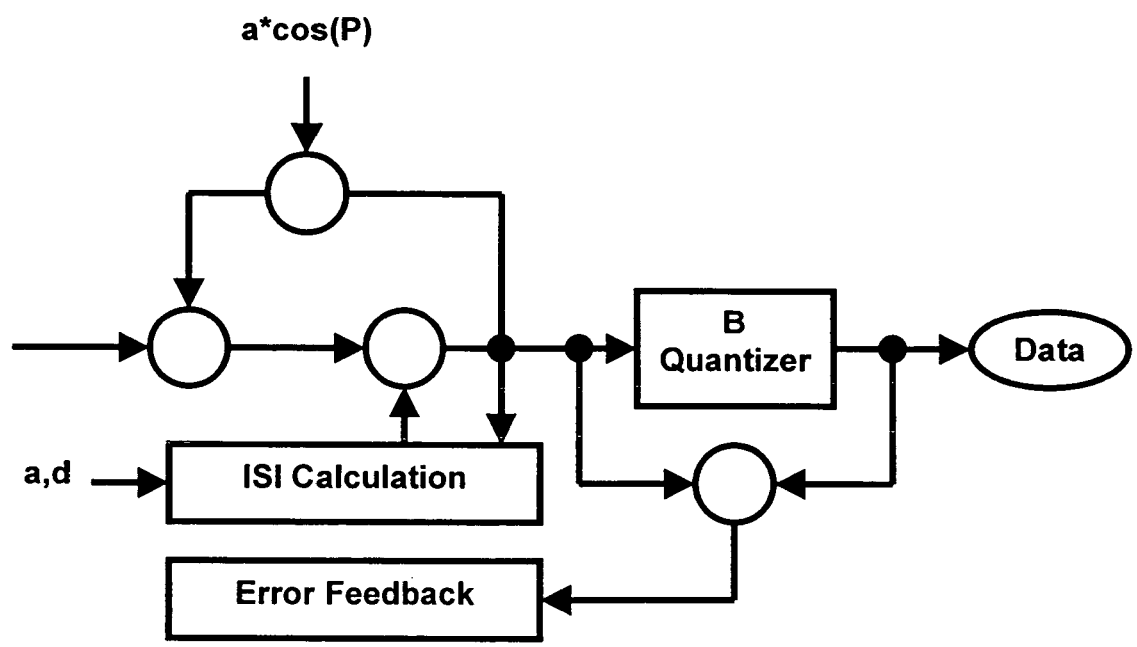
FIG. 35 is a block diagram of a technique used in the modem receiver of FIG. 17 to address multipath effects.

To track the vector B in real time, one method using a circuit such as shown in FIG. 35 is to first initialize to the correct value of B using the formulas just presented. Then, the tracking loop converges to follow the angle of B (which is shown in FIG. 34 as zero for all sub-bands but would in fact have variations due to the transmission link). The amplitude of the wavelet transform is then be C*cos(Pang) rather than C. The transform is projected in the direction of the true signal. So, to obtain B+ISI, the modem feeds back the quantizer input B and subtracts a*B*cos(P) from the projection C*cos(Pang). The modem then computes and subtracts the ISI term prior to input to the quantizer. The quantizer error fed back to the phase and amplitude tracking circuits maintains the tracking of phasor B (rather than C). The quantizer input will not exhibit fading.

The modem can determine all three vectors C, B, and A. Just as the interference due to A was subtracted out to get B, it is also possible to have another, similar circuit solve for A by subtracting out the ISI due to B with a separate phase tracking loop. These circuits can track each sub-band coherently for both A and B. Thus the vector's magnitudes B and A=a*B can then be added together to get constructive interference—a bigger signal by a factor of 1+a than the 'direct path' signal B. Obviously, this processing is not worthwhile for small a.

The technique described above uses an equalizer in a multiband modem to eliminate the destructive interference of multipath communications assuming a single echo path. It also proposes converting the destructive interference into constructive interference so that the SNR and BER may be better than without the echo. It applies to any multiband modem although the wavelet modem of the specific examples is used for clarity because the wavelet modem equalizer easily removes ISI and tracks phase.

If there are multiple reflection paths at different distances, thus resulting in different delays, then the phase versus sub-band information from the phase tracking loops of the modem can be bandpass filtered to distinguish the phase ripple frequency associated with each delay as implied in the formula (2*b-1)*d*90/M. The multiple tracking circuits for each echo path would then be analogous to the multiple arms of a spread-spectrum Rake Receiver. Rather than bandwidth-wasting spreading, a form of redundancy, the method disclosed herein gets diversity through multiple sub-bands to solve the fading problem at far greater throughput.

The modem angle defined in the hardware as Pang is actually the angle between the transmitter and the receiver signal being tracked; in the above Pang is the angle between B and C. Thus, the signal has already been rotated to eliminate the transmitter-to-receiver phase shift in each sub-band.

When there are multiple reflections along paths, i, at angles, Pi, relative to B, and each reflection has a length B*Ai, then with the sums taken over i ("SUM"):

$C$*cos(Pang)=$B$*[1+SUM{$Ai$*cos($Pi$)}]

$C$*sin(Pang)=$B$*SUM{$Ai$*sin($Pi$)}

The SUMs will be different for each sub-band but they can be tracking parameters:

$C$*cos(Pang)=$B$*(1+$Ui$) for $Ui$=SUM{$Ai$*cos($Pi$)}, -1<$Ui$<+1

$C$*sin(Pang)=$B$*$Vi$ and $Vi$=SUM{$Ai$*sin($Pi$)}, -1<$Vi$<+1

By squaring and adding and solving for B:

$B$=$C$/sqrt[$Vi$^2+(1+$Ui$)^2]-$Ki$*$ISI$

The denominator term can be approximated so:

$B$=$C$/(1+$Hi$)-$Ki$*$ISI$

The phase in degrees of each multipath A varies as di*(b-1)*90/M for path delay di. The group delay, which is the derivative with respect to band number b, is proportional to di and so all paths can be additively combined into Ki*ISI where ISI for symbol n is found from the ISI at some reference delay such as t=M/4.

The time shift impairment for group delay was defined in the foregoing as:

$Ym,n,t$=<$W(i+m,j+n*T,t),W(i,j)$>

A modem equalizer would normally have this filter Ym,n,t available to compensate for both positive and negative group delay. For multipath, only the positive delay ISI filter is be multiplied by Ki to compensate for the ISI due to Ai in the above formula for B.

To control the required non-linear feedback loop, a preferred arrangement is to have a reference signal path with a reference quantizer and one or more trial paths with trial quantizers. Each quantizer requires a gain parameter Gi ahead of the quantizer to set the levels to odd integers. Starting with initial values corresponding to no multipath as a reference, the trial paths increase or decrease the values Ui, Vi, Ki and the difference in quantization error from the 3 respective paths determines the size and direction of a modification to the parameters. If a trial yields a better (i.e., lower) quantization error than the reference then those parameters are used as the next reference; otherwise the trials continue using the previous reference.

Having described preferred embodiments of the invention, it will now become apparent to one of ordinary skill in the art that other embodiments incorporating the concepts may be used. It is felt, therefore, that these embodiments should not be limited to disclosed embodiments but rather should be limited only by the spirit and scope of the appended claims.

What is claimed is:

1. A multi-band equalizer for a modem receiver, comprising:
 a self-interference canceling filter for receiving an input signal, for removing from the input signal cross correlation terms resulting from input signal self-interference and for providing a corrected input signal, the self-interference canceling filter comprising
a fixed tap-weight filter bank for filtering the input signal,
a weighting circuit for weighting the filtered input signal with a pre-determined function of a differential phase angle between adjacent subbands of the input signal, and
a subtraction circuit for subtracting the weighted, filtered input signal from the input signal to generate the corrected input signal;
a quantizer for quantizing the corrected input signal and for providing a quantizer error signal based upon a difference between the corrected input signal and the quantized, corrected input signal; and
a feedback circuit for calculating a proportional phase correction metric from the quantizer error signal and for providing phase values for plural subbands, derived from the proportional phase correction metric, to the self-interference canceling filter.

2. The multi-band equalizer of claim 1, wherein the feedback circuit is operative to calculate the differential phase angle from the proportional phase correction metric.

3. The multi-band equalizer of claim 1, wherein the feedback circuit comprises a phase measurement loop for calculating the a difference between values of the quantizer error signal as the proportional phase correction metric.

4. The multi-band equalizer of claim 3, wherein the values of the quantizer error signal are average values each based upon plural input signal values.

5. The multi-band equalizer of claim 1, wherein the feedback circuit comprises a phase measurement unit operative to calculate the differential phase angle between adjacent subbands of the input signal from the proportional phase correction metric.

6. The multi-band equalizer of claim 5, wherein the phase measurement unit comprises a data storage element for storing data representative of a phase value for each subband of the input signal and logic for updating the phase value for each subband on the basis of the proportional phase correction metric.

7. The multi-band equalizer of claim 5, wherein the phase measurement unit comprises a low pass filter for smoothing the proportional phase correction values for successive subbands.

8. The multi-band equalizer of claim 5, wherein the phase measurement unit further comprises temporal delay circuits whereby the phase measurement unit is adapted to provide the phase values for plural subbands at a given time.

9. The multi-band equalizer of claim 1, further comprising a measurement circuit for determining approximate values of phase and amplitude of isolated data units of the input signal and providing the approximate values to the feedback circuit as initial reference values for calculation of the proportional phase correction metric prior to receipt of the quantizer error signal.

10. The multi-band equalizer of claim 1, further comprising an amplitude measurement loop for multiplying the quantizer error signal by a value inversely proportional to the quantized, corrected input signal and providing a product of the multiplication as a gain error offset value.

11. The multi-band equalizer of claim 10, wherein the amplitude measurement loop further comprises a data storage element for accumulating successive multiplicative products of the quantizer error signal and the value inversely proportional to the quantized, corrected input signal and providing the accumulated successive multiplicative products at a predetermined temporal interval as the gain error offset value.

12. The multi-band equalizer of claim 10, wherein the value inversely proportional to the quantized, corrected input signal is the inverse of the quantized, corrected input signal.

13. The multi-band equalizer of claim 10, further comprising an amplitude measurement unit for receiving the gain error offset value from the amplitude measurement loop and for deriving a gain factor therefrom.

14. The multi-band equalizer of claim 13, further comprising a multiplier for multiplying the corrected input signal by the gain factor prior to quantization by the quantizer.

15. The multi-band equalizer of claim 13, wherein the amplitude measurement unit is operative to calculate a new value for the gain factor based upon a multiplicative product of a previous value of the gain factor with the inverse of one plus the product of the gain error offset times a feedback gain constant.

16. The multi-band equalizer of claim 15, wherein the value of the inverse of one plus the product of the gain error times a feedback gain constant is stored in a data storage element in the amplitude measurement unit and is indexed by the gain error offset from the amplitude measurement loop.

17. The multi-band equalizer of claim 15, wherein the amplitude measurement unit further comprises a low-pass filter for smoothing successive new values for the gain factor.

18. The multi-band equalizer of claim 15, wherein the amplitude measurement unit further comprises a data storage element for storing gain scale factors, whereby the amplitude measurement unit receives amplitude data for isolated data units of the input signal and indexes the data storage element with the amplitude data to obtain a gain scale factor.

19. A multi-band equalizer for a modem receiver, comprising:
a quantizer for receiving an input signal, for quantizing the input signal, and for providing a quantizer error signal based upon the difference between the input signal and the quantized input signal; and
an amplitude measurement loop for multiplying the quantizer error signal by a value inversely proportional to the quantized input signal and for providing a product of the multiplication as a gain error offset value;
an amplitude measurement unit for receiving the gain error offset value from the amplitude measurement loop and for deriving a gain factor therefrom; and
a multiplier for multiplying the input signal by the gain factor prior to quantization of the input signal by the quantizer.

20. The multi-band equalizer of claim 19, wherein the amplitude measurement unit is operative to calculate a new value for the gain factor based upon a multiplicative product of a previous value of the gain factor with the inverse of one plus the product of the gain error offset value times a feedback gain constant.

21. The multi-band equalizer of claim 20, wherein the value of the inverse of one plus the product of the gain error offset value times a feedback gain constant is stored in a data storage element in the amplitude measurement unit and is indexed by the gain error offset value from the amplitude measurement loop.

22. The multi-band equalizer of claim 20, wherein the amplitude measurement unit further comprises a low-pass filter for smoothing successive new values of the gain factor.

23. The multi-band equalizer of claim 20, wherein the amplitude measurement unit further comprises a data storage element for storing gain scale factors, whereby the amplitude measurement unit receives amplitude data for isolated data units of the input signal and indexes the data storage element with the amplitude data to obtain a gain scale factor.

24. The multi-band equalizer of claim 19, further comprising:
a self-interference canceling filter for receiving the input signal and for providing a corrected input signal as the input signal into the quantizer; and
a feedback circuit for calculating a proportional phase correction metric from the quantizer error signal and for providing phase values for plural subbands, derived from the proportional phase correction metric, to the self-interference canceling filter.

25. The multi-band equalizer of claim 24, wherein the self-interference canceling filter comprises:
a fixed tap-weight filter bank for filtering the input signal;
a weighting circuit for weighting the filtered input signal with a pre-determined function of a differential phase angle between adjacent subbands of the input signal; and
a subtraction circuit for subtracting the weighted, filtered input signal from the input signal to generate the corrected input signal.

26. The multi-band equalizer of claim 25, wherein the feedback circuit is operative to calculate the differential phase angle from the proportional phase correction metric.

27. The multi-band equalizer of claim 24, wherein the feedback circuit comprises a phase measurement loop for calculating a difference between averaged positive values of the quantizer error signal and averaged negative values of the quantizer error signal as the proportional phase correction metric.

28. The multi-band equalizer of claim 24, wherein the feedback circuit comprises a phase measurement unit operative to calculate the differential phase angle between adjacent subbands of the input signal from the proportional phase correction metric.

29. The multi-band equalizer of claim 28, wherein the phase measurement unit comprises a data storage element for storing data representative of a phase value for each subband of the input signal and logic for updating the phase value for each subband on the basis of the proportional phase correction metric.

30. The multi-band equalizer of claim 28, wherein the phase measurement unit comprises a low pass filter for smoothing the proportional phase correction values for successive subbands.

31. The multi-band equalizer of claim 28, wherein the phase measurement unit further comprises temporal delay circuits whereby the phase measurement unit is adapted to provide the phase values for plural subbands at a given time.

32. The multi-band equalizer of claim 24, further comprising a measurement circuit for determining approximate values of phase and amplitude of isolated data units of the input signal and providing the approximate values to the feedback circuit as initial reference values for the calculation of the proportional phase correction metric prior to receipt of the quantizer error signal.

33. A method of processing input data in a multi-band equalizer to realize recovered data, comprising:
filtering the input data in a filter to remove self-interference cross correlation terms from the input signal resulting from self-interference and to provide phase and time delay corrected input data by
filtering the input data using a fixed tap-weight filter bank,
weighting the filtered data using a predetermined function of a differential phase angle between adjacent subbands of the input data, and
subtracting the weighted, filtered input data from the input data to generate the phase and time delay corrected input data;
quantizing the corrected input data by a quantizer and providing a quantizer error signal as the difference between the corrected input data and the quantized, corrected input data; and
calculating a proportional phase correction metric from the quantizer error signal and providing phase values for plural subbands, derived from the proportional phase correction metric, to the filter for use in removing the self-interference in the input data.

34. The method of claim 33, wherein the phase and time delay corrected input data provided by the step of filtering comprises master and slave correlation values.

35. The method of claim 34, wherein the step of calculating further comprises dividing quantizer error signal values according to a sign of the slave correlation values and calculating a difference between averaged values of the quantizer error signal for positive slave correlation values and averaged values of the quantizer error signal for negative slave correlation values as the proportional phase correction metric.

36. The method of claim 35, wherein the step of calculating further comprises calculating the differential phase angle between adjacent subbands of the input data from the proportional phase correction metric.

37. The method of claim 33, further comprising the step of low-pass filtering the proportional phase correction metric for successive subbands.

38. The method of claim 33, further comprising:
estimating the phase and amplitude of isolated data units of the input data and using the estimated phase and amplitude as initial reference values for the calculation of the proportional phase correction metric prior to the calculation of the quantizer error signal.

39. The method of claim 33, further comprising:
multiplying the quantizer error signal by a value inversely proportional to the quantized, corrected input data to realize a gain error offset value.

40. The method of claim 39, further comprising:
deriving a gain factor from the gain error offset value and multiplying the phase and time corrected input data by the gain factor prior to the step of quantizing.

41. The method of claim 40, further comprising:
low pass filtering successive values of the gain factor prior to multiplying the phase and time corrected input data by the low-pass filtered gain factor.

* * * * *

UNITED STATES PATENT AND TRADEMARK OFFICE
CERTIFICATE OF CORRECTION

PATENT NO.       : 7,173,966 B2
APPLICATION NO.  : 10/842623
DATED            : February 6, 2007
INVENTOR(S)      : William J. Miller It is certified that error appears in the above-identified patent and that said Letters Patent is hereby corrected as shown below:

Column 34, lines 1-9, replace the table with the following:

| i    | 0 | 1 | 2 | 3 | 4 | 5 | 6  | 7 |
|------|---|---|---|---|---|---|----|---|
| bits | 6 | 5 | 4 | 3 | 3 | 3 | 2  | 0 |
| H(i) | 1 | 2 | 4 | 8 | 8 | 8 | 16 | 1 |

Column 45, line 3, "y(2:2:M)=ya.*offset;" should read --y(2:2:M)=-ya.*offset;--; and Column 57, claim 3, line 26, "the a difference" should read --a difference--.

Signed and Sealed this

Twenty-sixth Day of February, 2008

JON W. DUDAS
*Director of the United States Patent and Trademark Office*